United States Patent
Saito et al.

(12) 
(10) Patent No.: US 6,256,063 B1
(45) Date of Patent: Jul. 3, 2001

(54) IMAGE SIGNAL PROCESSING UNIT AND ELECTRONIC STILL CAMERA

(75) Inventors: Osamu Saito; Atsushi Misawa; Takeshi Misawa, all of Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 08/942,366

(22) Filed: Oct. 2, 1997

(30) Foreign Application Priority Data

| Oct. 2, 1996 | (JP) | ................................................... 8-262144 |
| Oct. 15, 1996 | (JP) | ................................................... 8-272208 |
| Oct. 15, 1996 | (JP) | ................................................... 8-272209 |
| Oct. 15, 1996 | (JP) | ................................................... 8-272210 |
| Oct. 17, 1996 | (JP) | ................................................... 8-275035 |
| Nov. 1, 1996 | (JP) | ................................................... 8-291973 |
| Mar. 5, 1997 | (JP) | ................................................... 9-050391 |
| Mar. 5, 1997 | (JP) | ................................................... 9-050392 |
| Mar. 10, 1997 | (JP) | ................................................... 9-055197 |
| Mar. 24, 1997 | (JP) | ................................................... 9-070039 |

(51) Int. Cl.$^7$ .................................................. H04N 5/225
(52) U.S. Cl. ............................ 348/231; 348/552; 348/375
(58) Field of Search ................................... 348/207, 220, 348/221, 222, 231, 232, 233, 239, 552, 373, 374, 375, 376; H04N 5/225

(56) References Cited

U.S. PATENT DOCUMENTS

| 5,438,359 | * | 8/1995 | Aoki ....................................... 348/552 |
| 5,808,672 | * | 9/1998 | Wakabayashi et al. .............. 348/552 |
| 6,046,769 | * | 4/2000 | Ikeda et al. ........................... 348/552 |
| 6,104,430 | * | 8/2000 | Fukuoka ................................ 348/552 |

\* cited by examiner

*Primary Examiner*—Tuan Ho

(57) ABSTRACT

An electronic still camera which is able to substantially lessen the amount of trouble of inserting and drawing a PC card during photographing or when image data are transferred to a host computer such as a laptop computer, and which is able to increase the number of photographing. The electronic still camera has the PC card which is inserted into or drawn out from a camera body, which has the same shape as the PC card. The PC card or the camera body shaped like the PC card is inserted into a PC card slot of the host computer to transmit and receive the image data, etc. A camera casing including a taking lens, etc. is mounted in the camera body shaped like the PC card, and a sheet-like battery is provided in the camera body. The taking lens is capable of projecting from and retracting into the camera body.

9 Claims, 45 Drawing Sheets

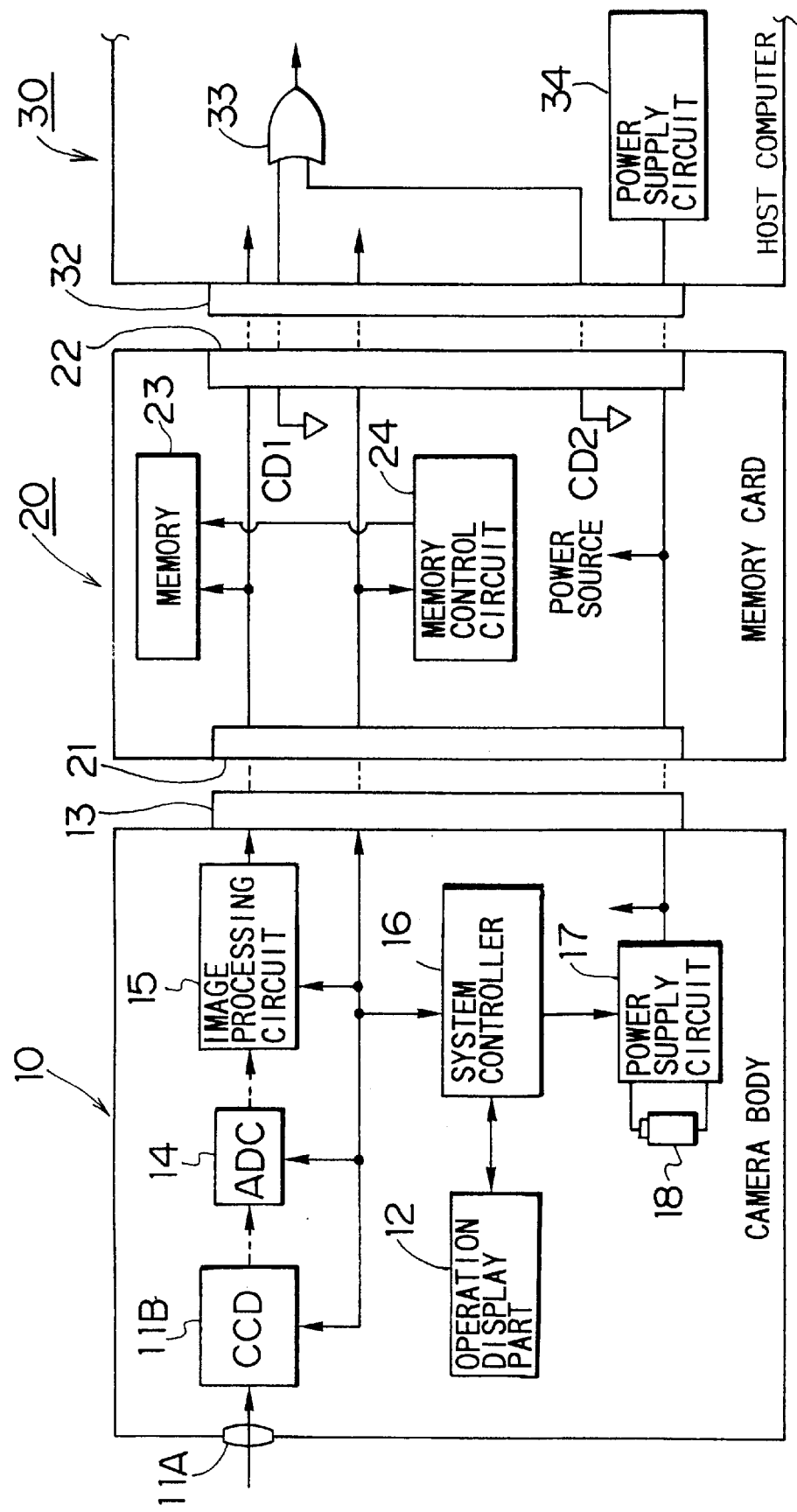

FIG. 3

| PIN | SIGNAL NAME | I/O | PIN | SIGNAL NAME | I/O |
|---|---|---|---|---|---|
| | MEMORY CARD | | | MEMORY CARD | |
| 1 | GND | | 35 | GND | |
| 2 | D3 | I/O | 36 | -CD1 | O |
| 3 | D4 | I/O | 37 | D11 | I/O |
| 4 | D5 | I/O | 38 | D12 | I/O |
| 5 | D6 | I/O | 39 | D13 | I/O |
| 6 | D7 | I/O | 40 | D14 | I/O |
| 7 | -CE1 | I | 41 | D15 | I/O |
| 8 | A10 | I | 42 | -CE2 | I |
| 9 | -OE | I | 43 | RFSH | I |
| 10 | A11 | I | 44 | RFU | |
| 11 | A9 | I | 45 | RFU | |
| 12 | A8 | I | 46 | A17 | I |
| 13 | A13 | I | 47 | A18 | I |
| 14 | A14 | I | 48 | A19 | I |
| 15 | -WE/-PGM | I | 49 | A20 | I |
| 16 | +RDY/-BSY | O | 50 | A21 | I |
| 17 | VCC | | 51 | VCC | |
| 18 | VPP1 | | 52 | VPP2 | |
| 19 | A16 | I | 53 | A22 | I |
| 20 | A15 | I | 54 | A23 | I |
| 21 | A12 | I | 55 | A24 | I |
| 22 | A7 | I | 56 | A25 | I |
| 23 | A6 | I | 57 | RFU | |
| 24 | A5 | I | 58 | +RESET | I |
| 25 | A4 | I | 59 | -WAIT | O |
| 26 | A3 | I | 60 | RFU | |
| 27 | A2 | I | 61 | -REG | I |
| 28 | A1 | I | 62 | BVD2 | O |
| 29 | A0 | I | 63 | BVD1 | O |
| 30 | D0 | I/O | 64 | D8 | I/O |
| 31 | D1 | I/O | 65 | D9 | I/O |
| 32 | D2 | I/O | 66 | D10 | I/O |
| 33 | +WP | O | 67 | -CD2 | O |
| 34 | GND | | 68 | GND | |

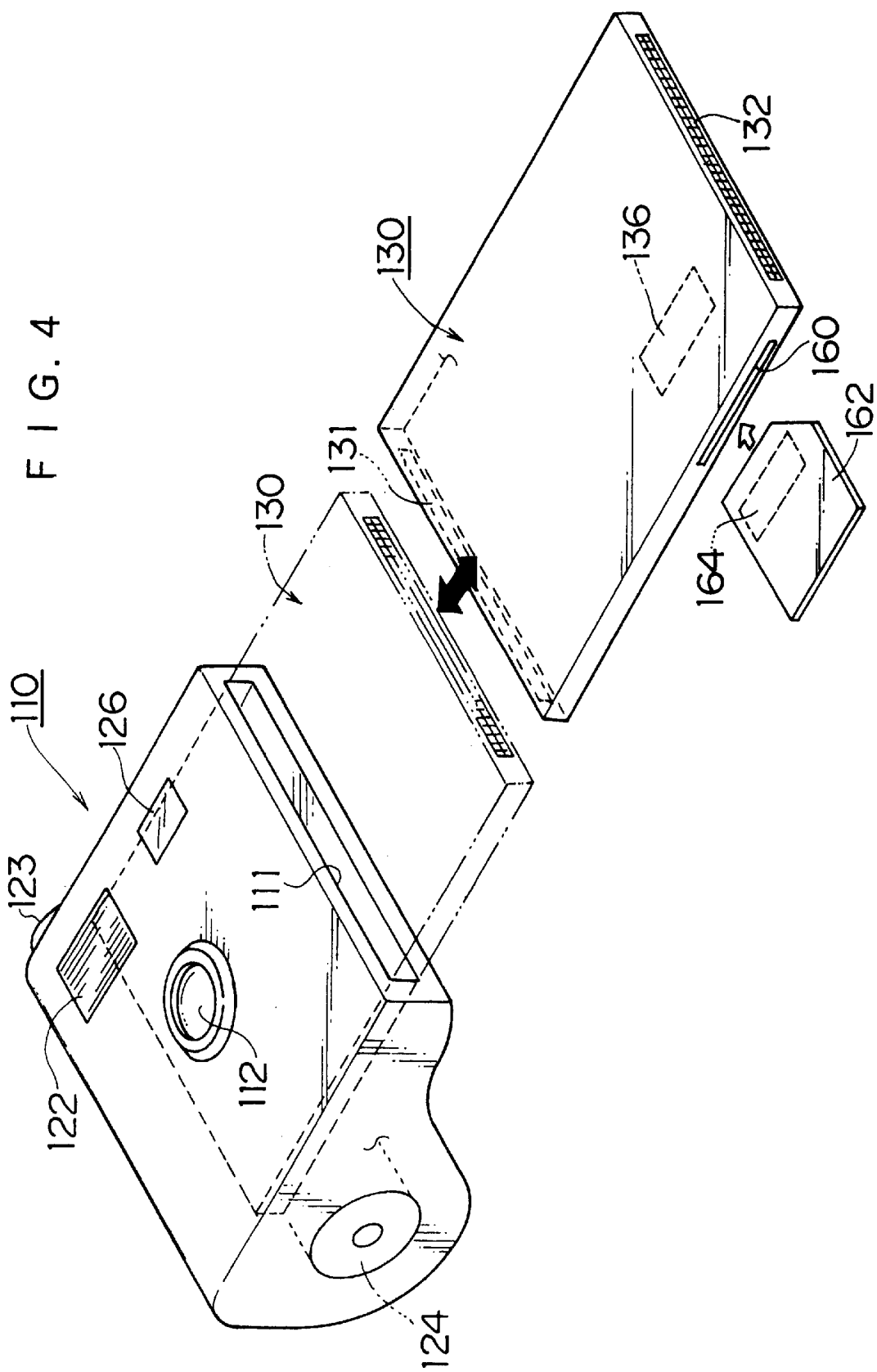

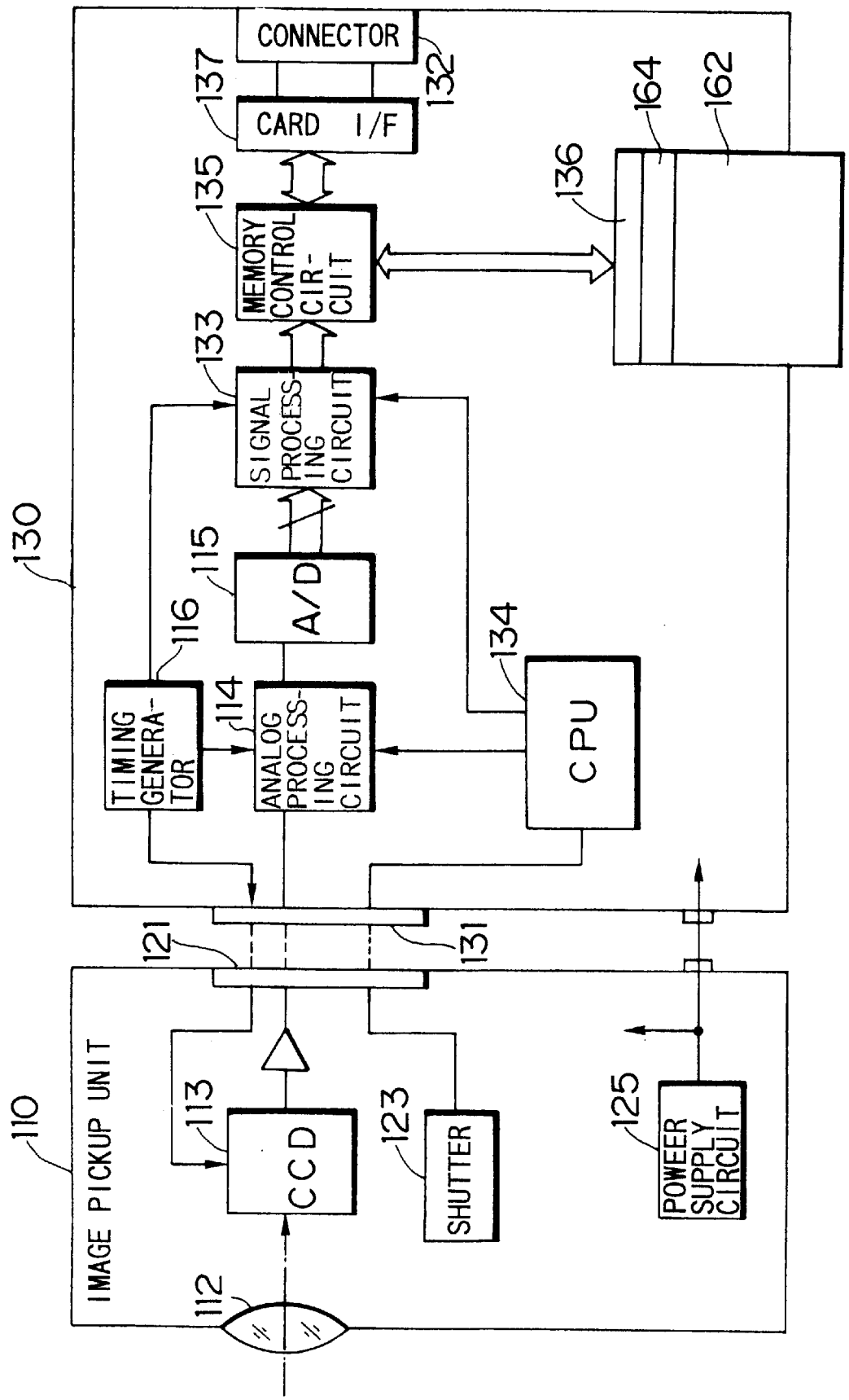

F I G. 7
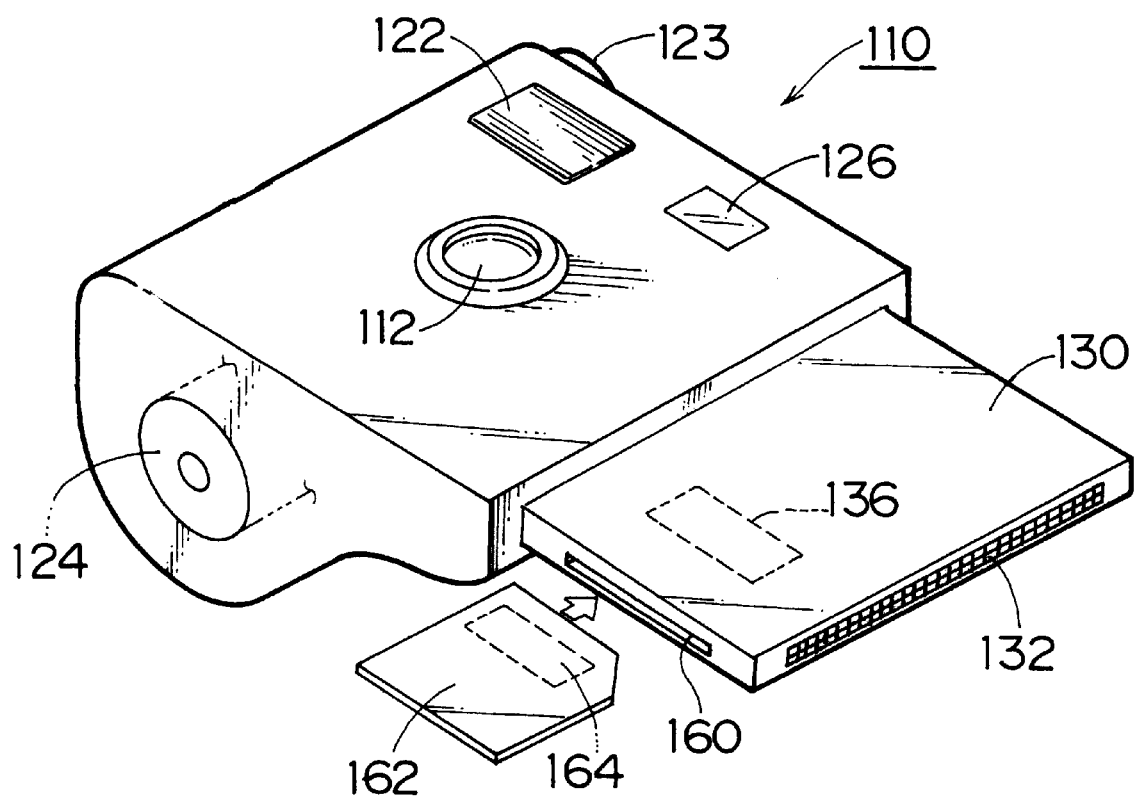

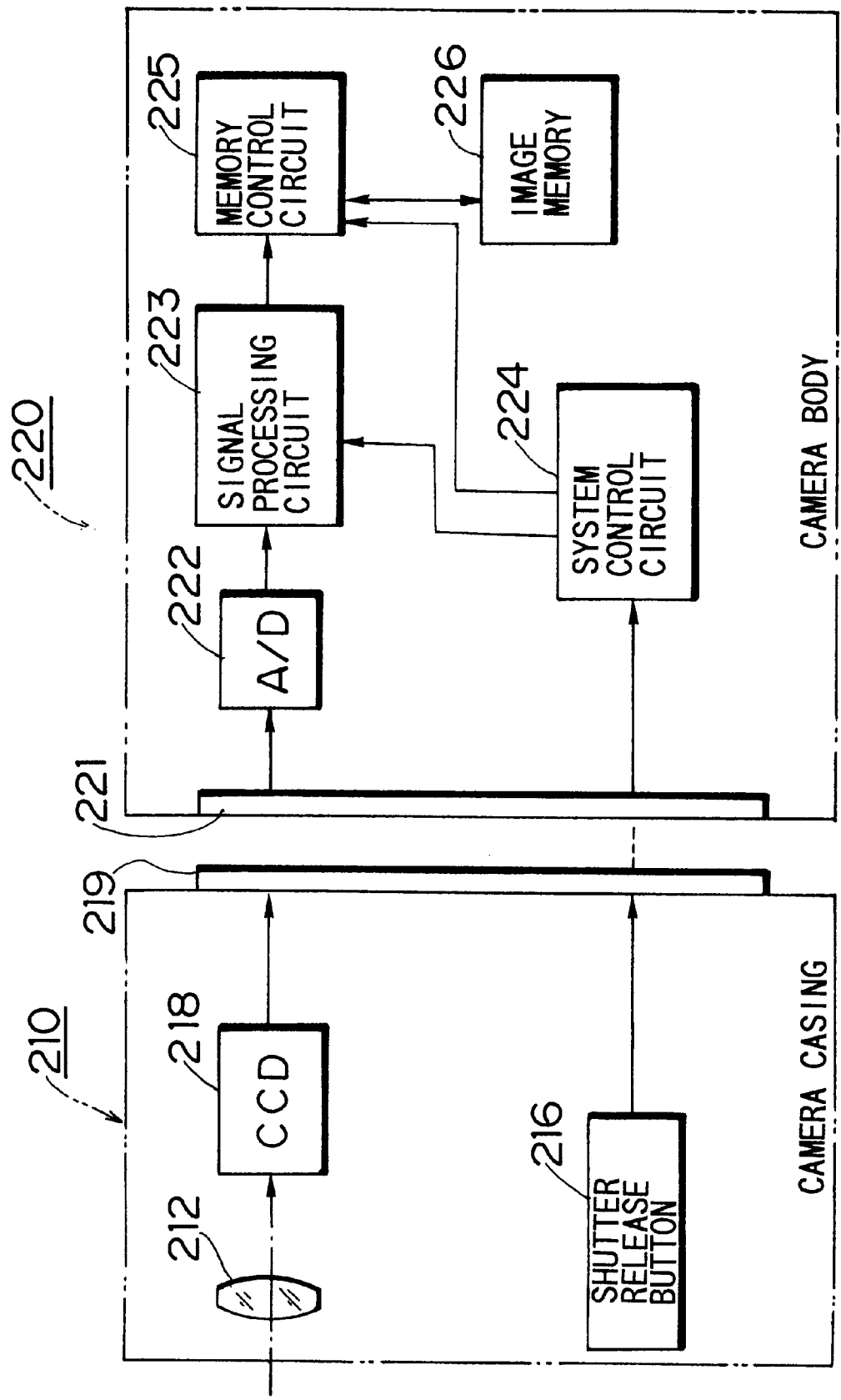

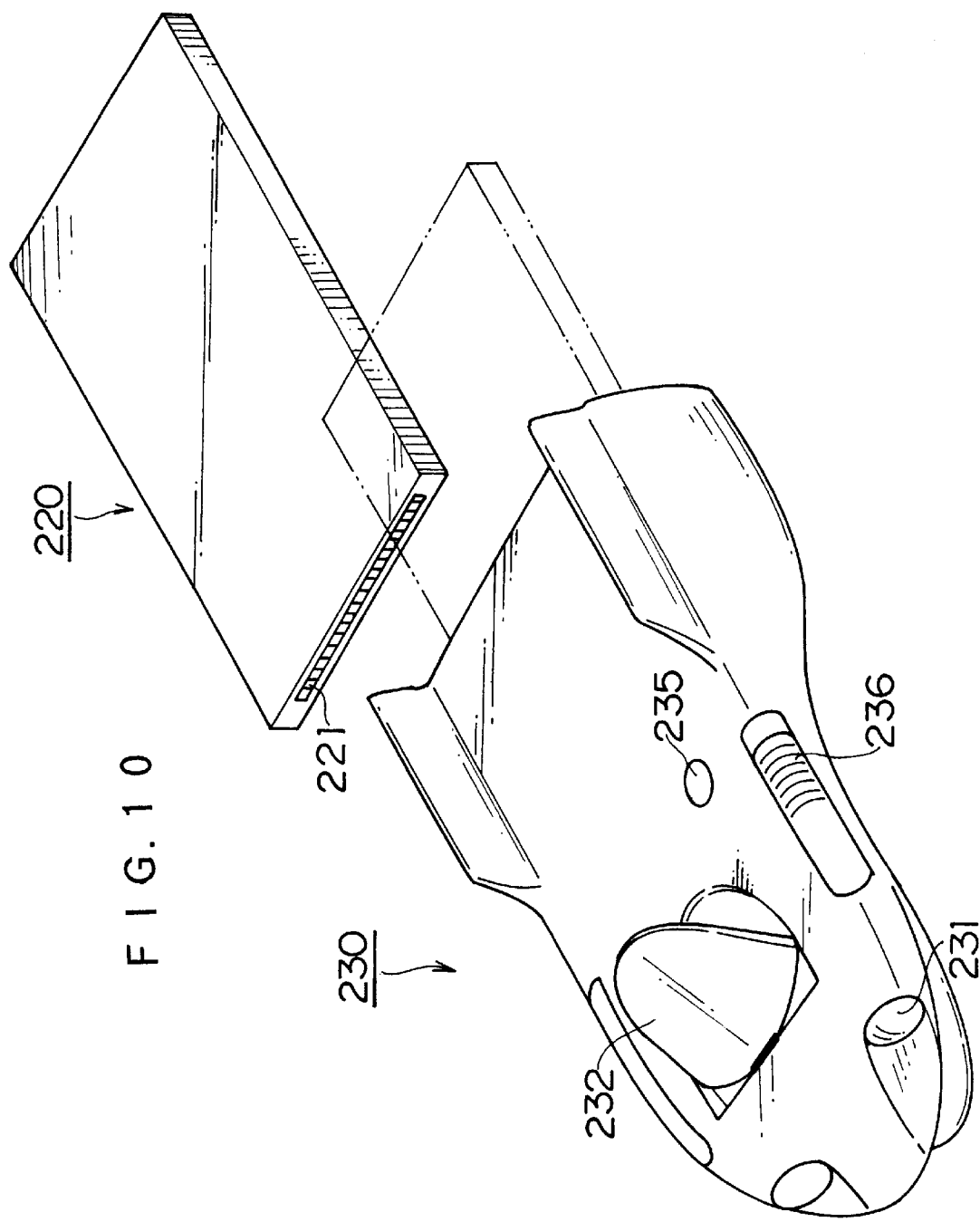

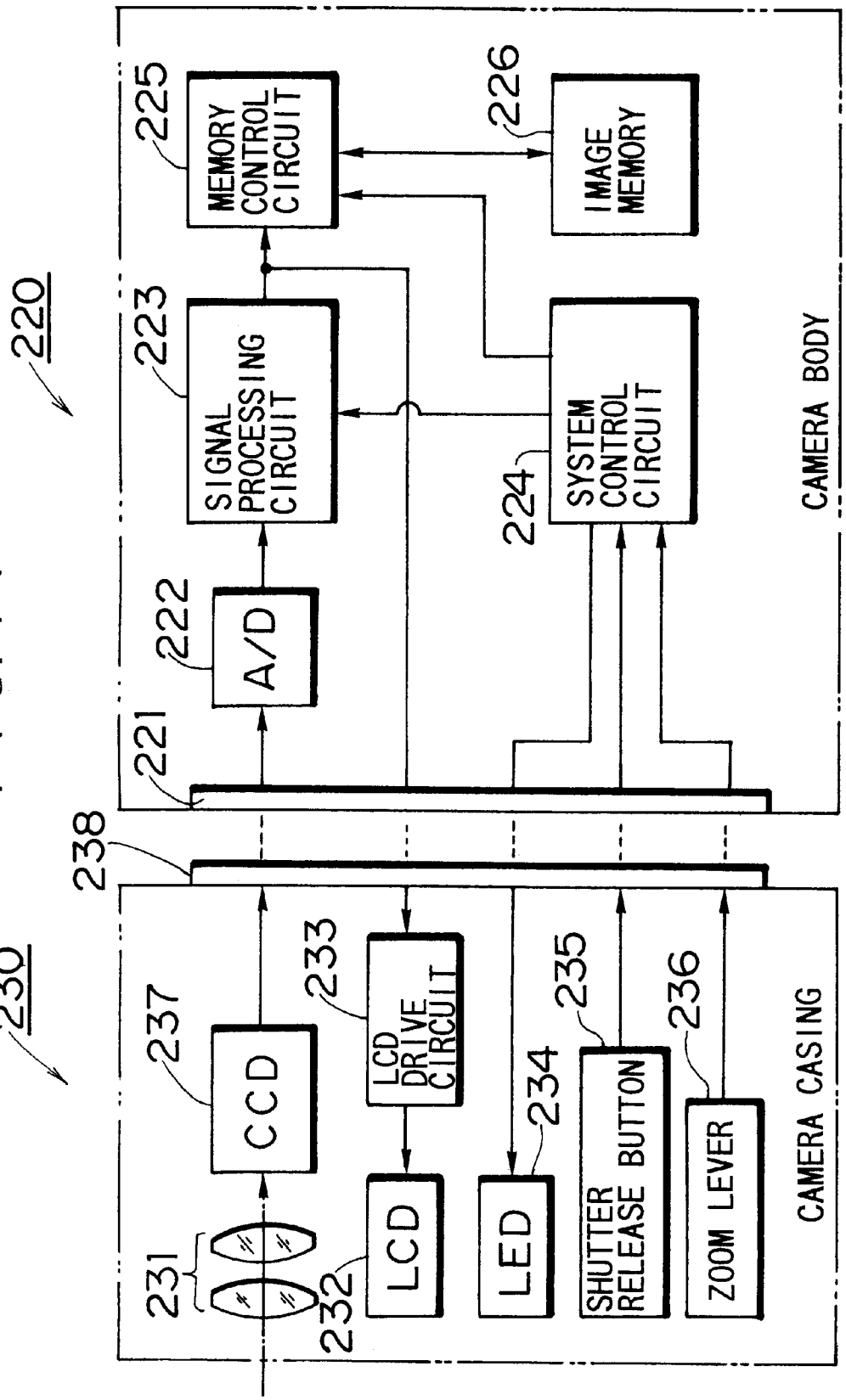

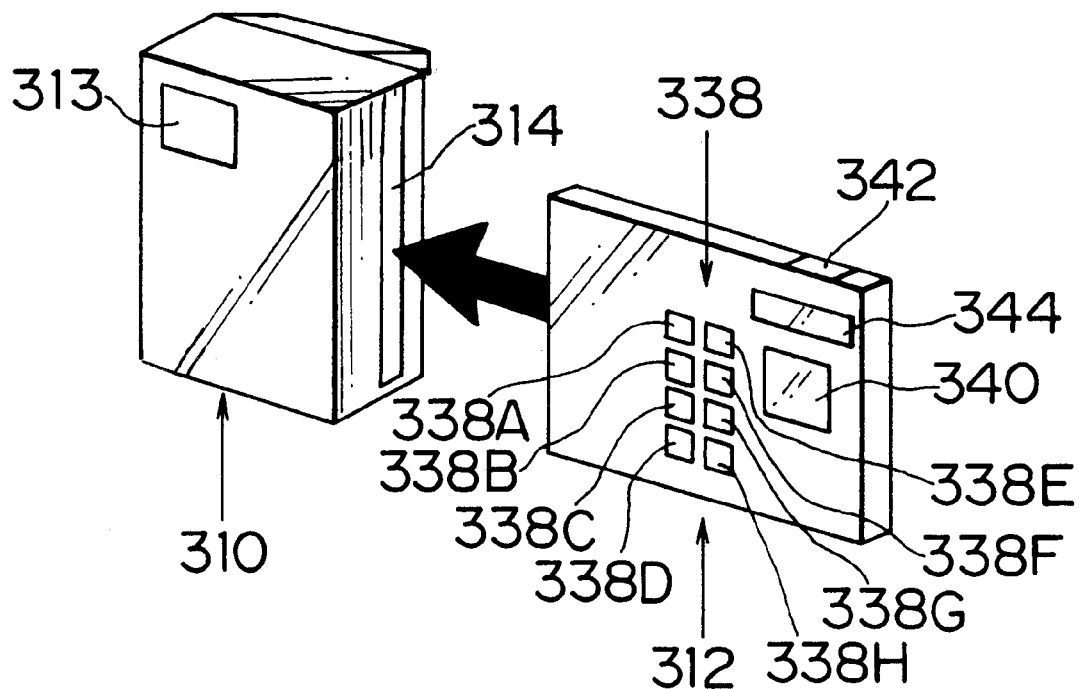
F I G. 1 2

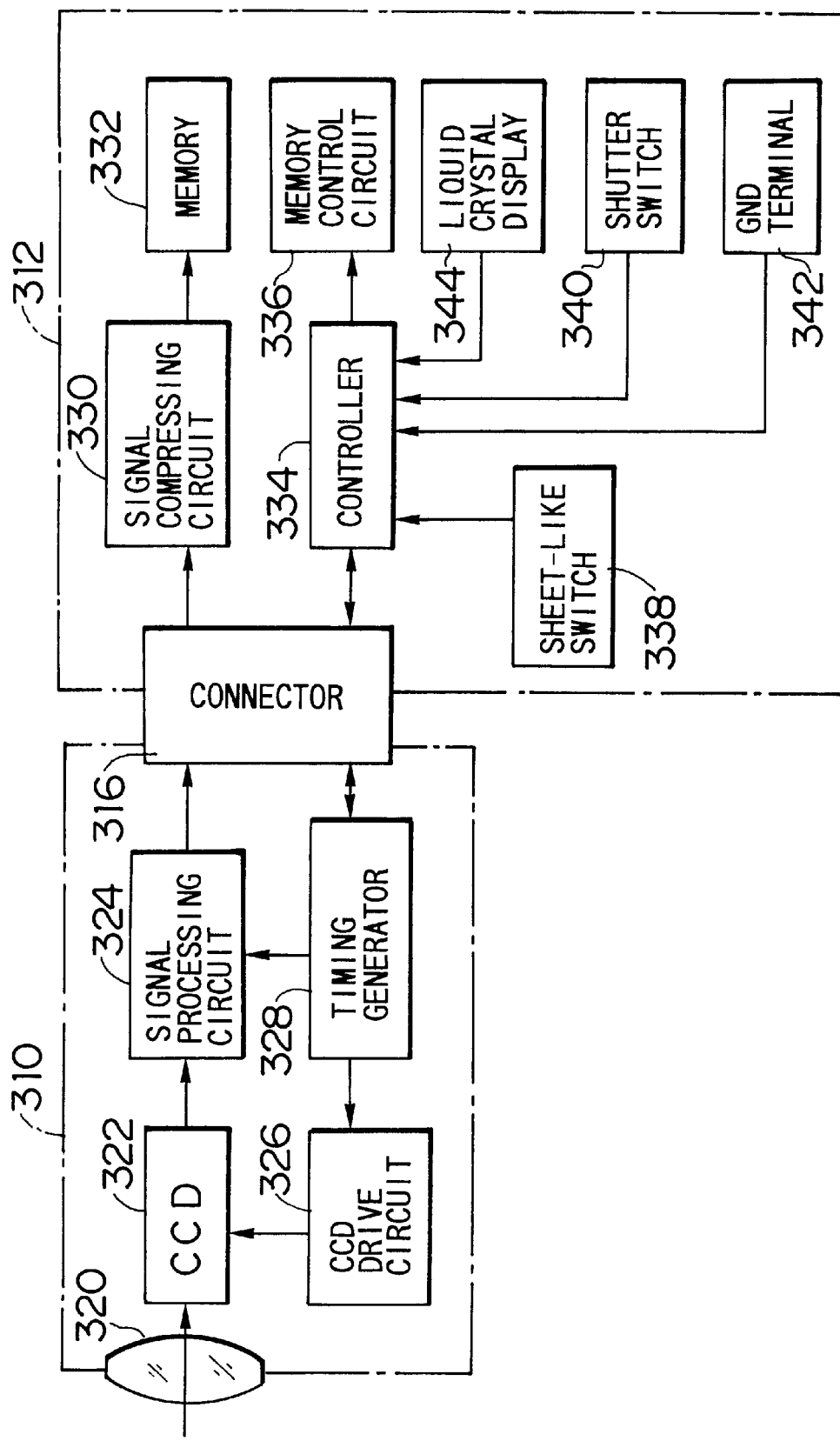

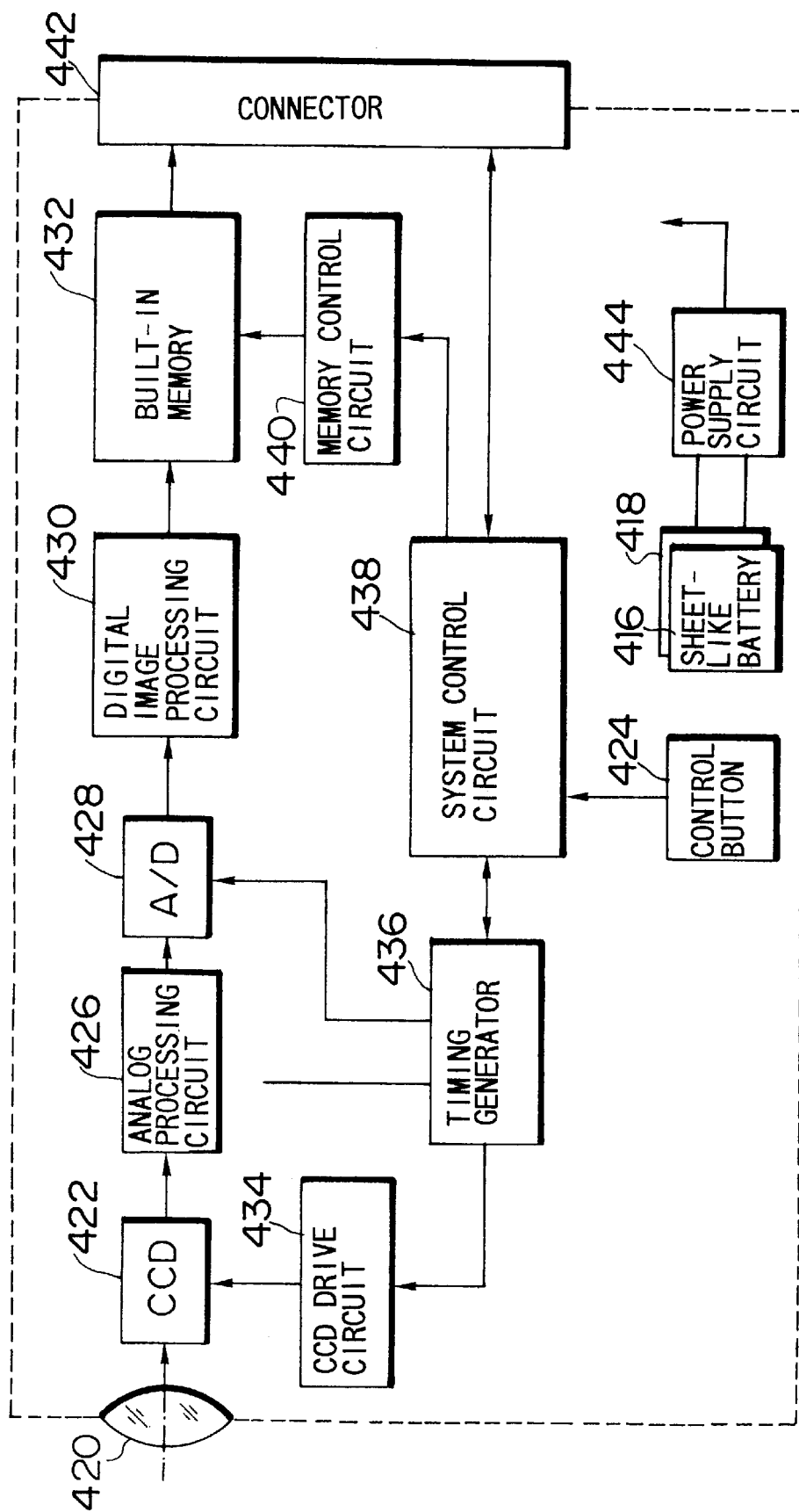

F I G. 1 9
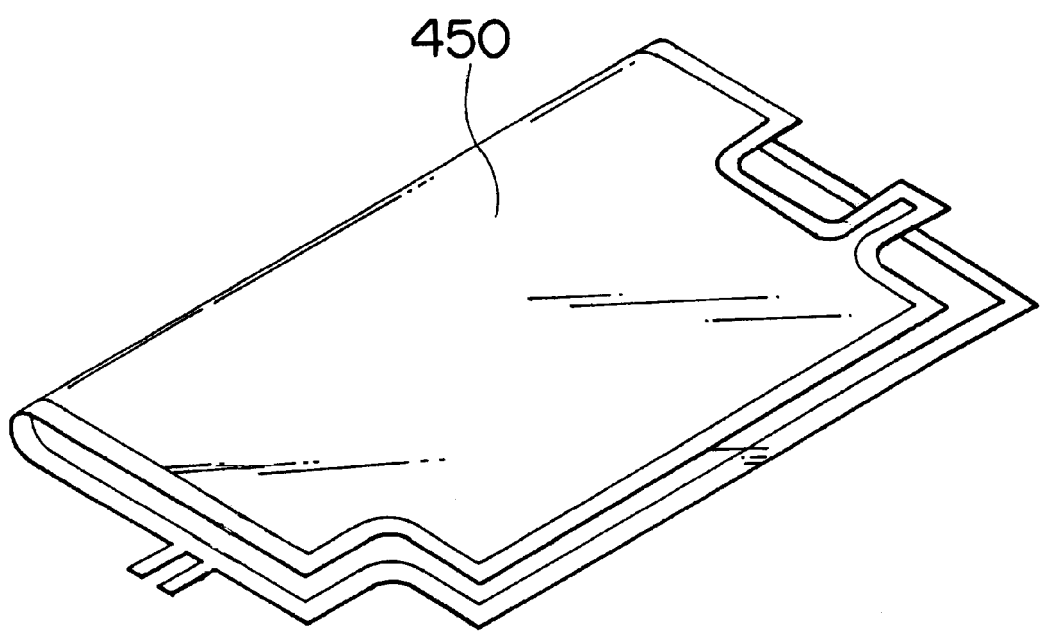

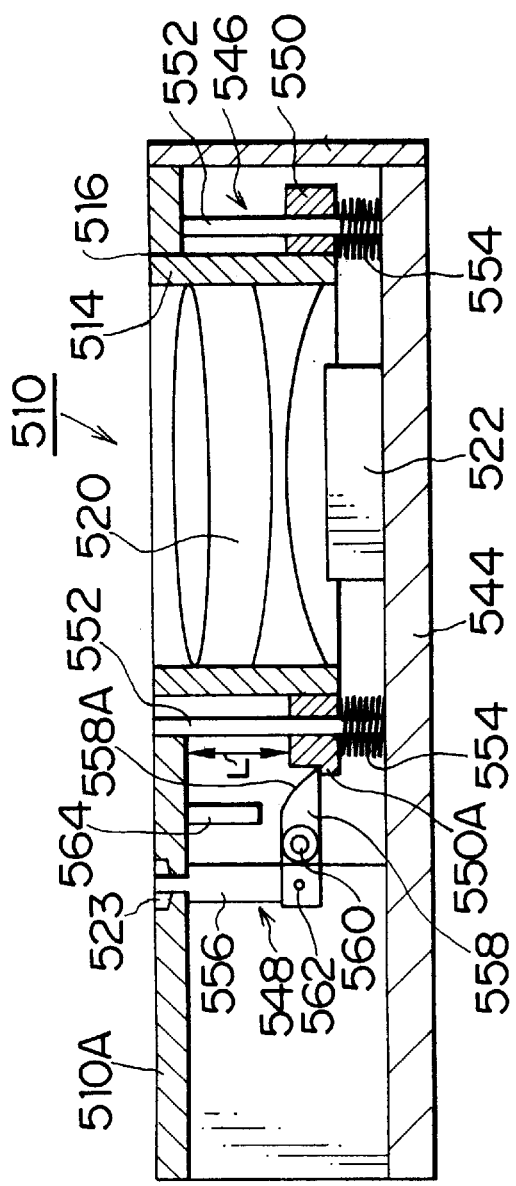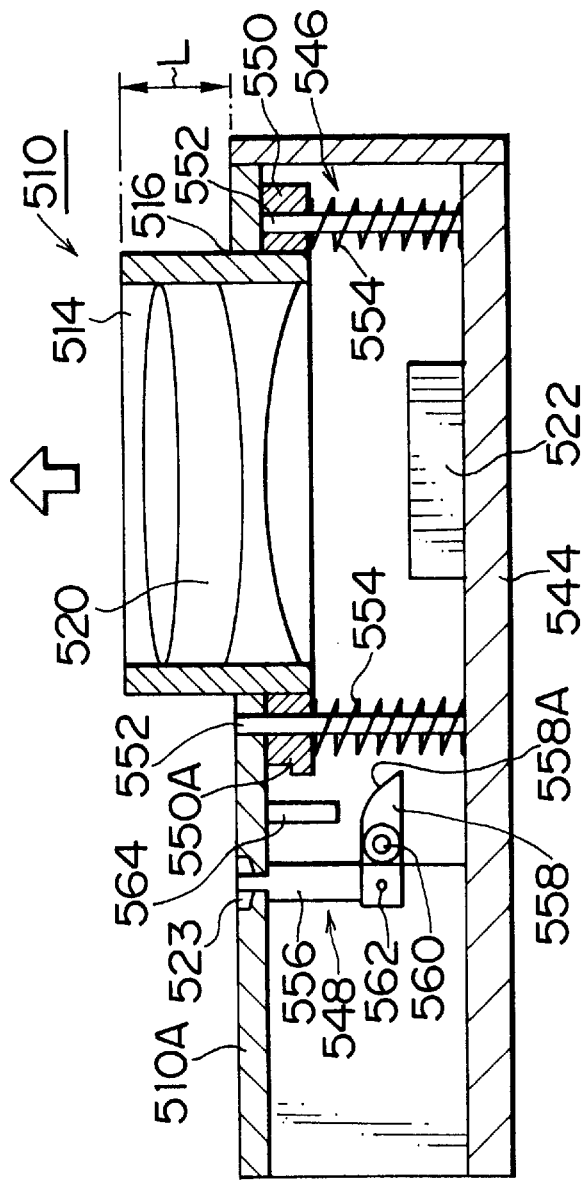
F I G. 2 1 (A)  F I G. 2 1 (B)

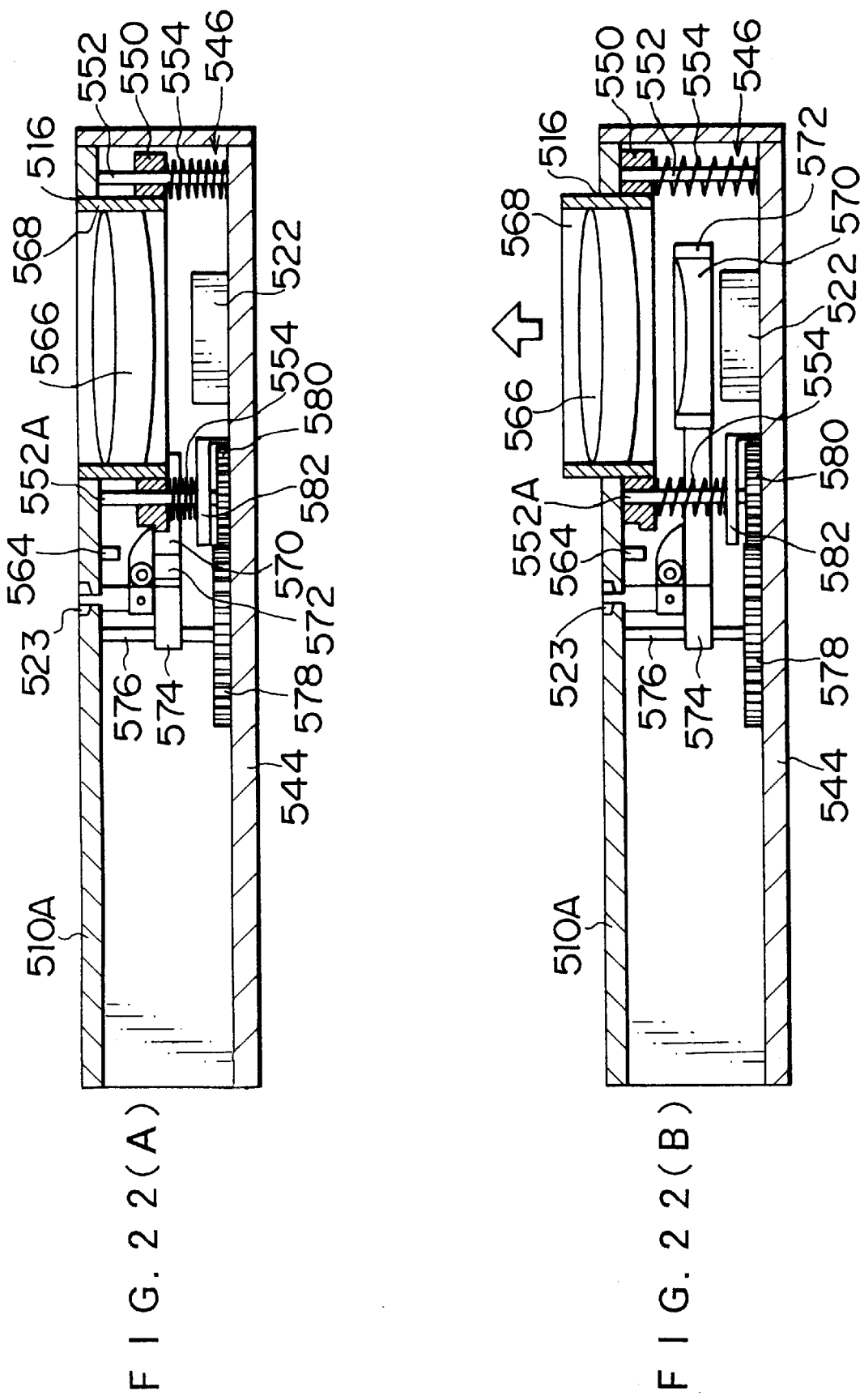
F I G. 2 2 (A)   F I G. 2 2 (B)

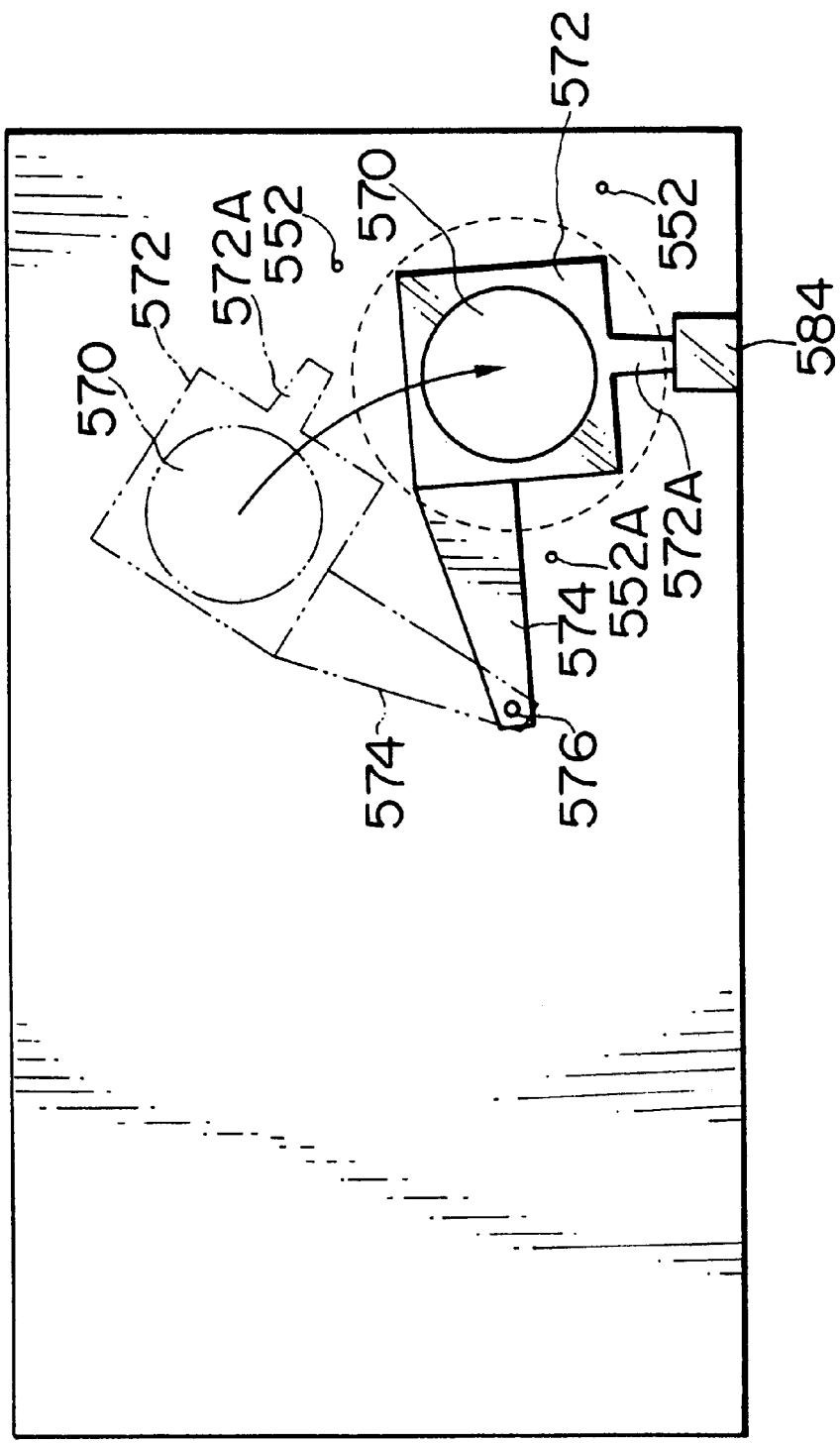

F I G. 2 4
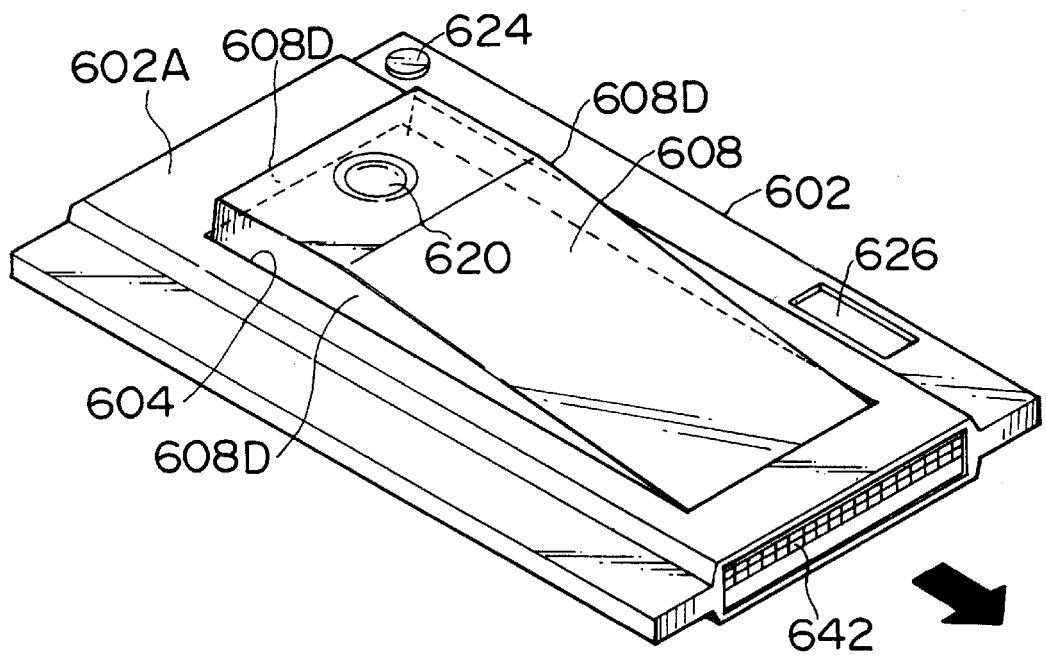
F I G. 2 5
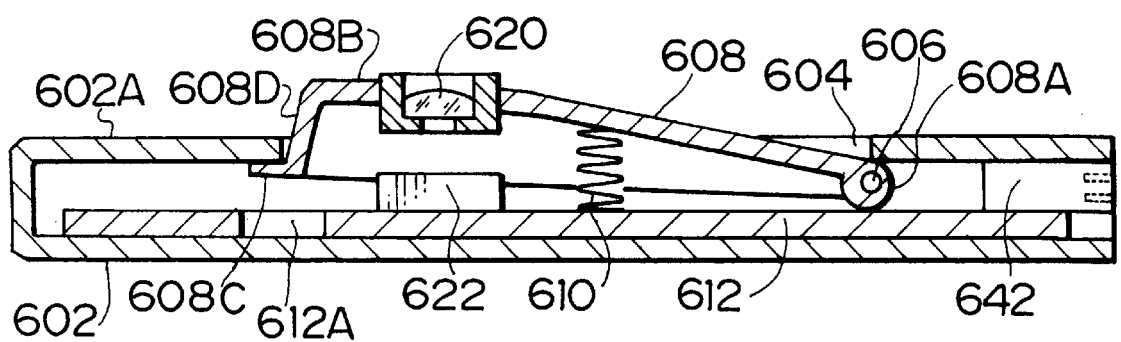

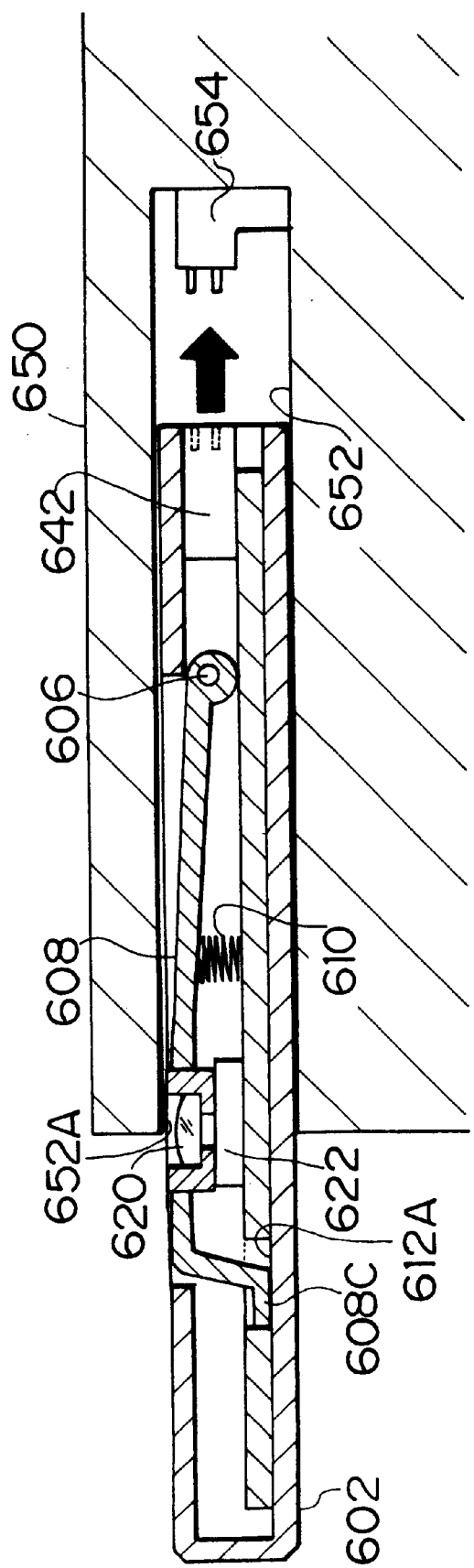

F I G. 3 2
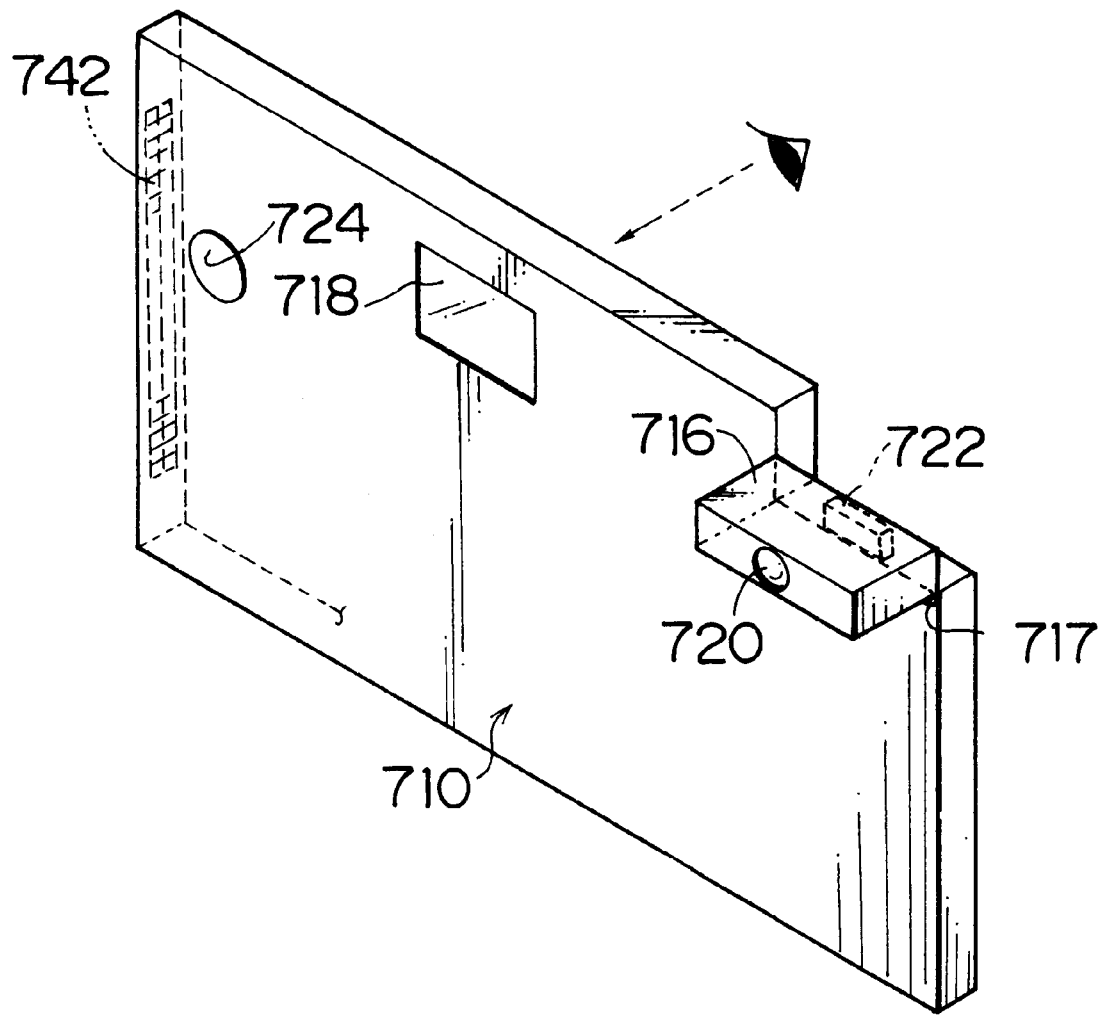

F I G. 33
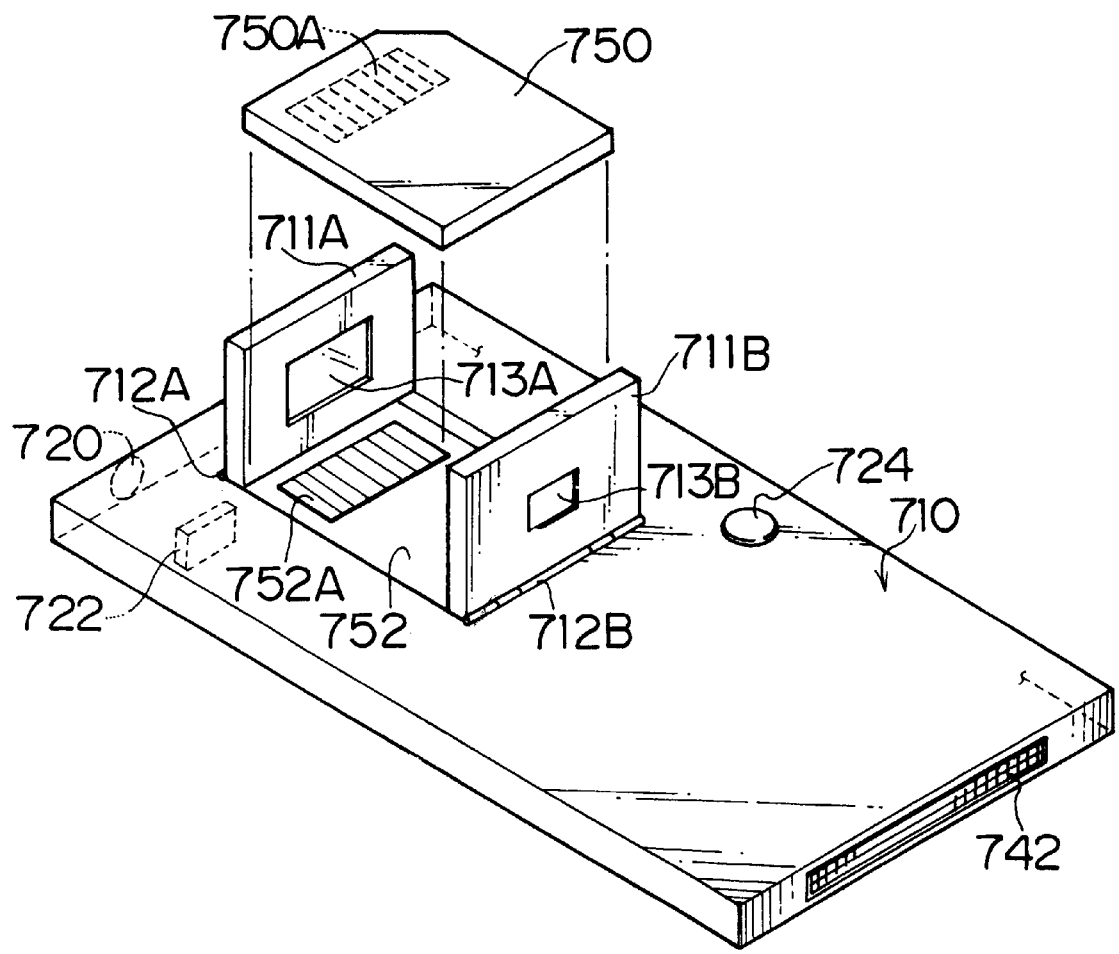

F I G. 3 4 (A)
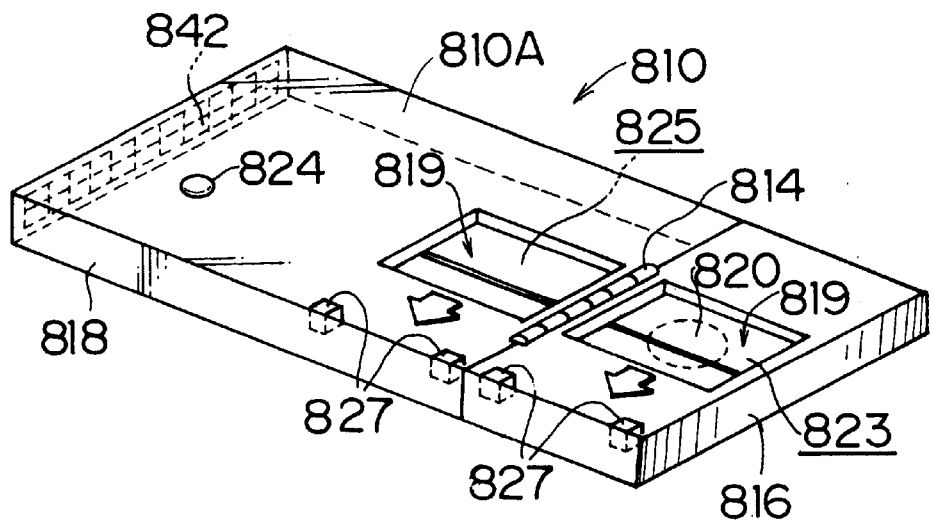
F I G. 3 4 (B)
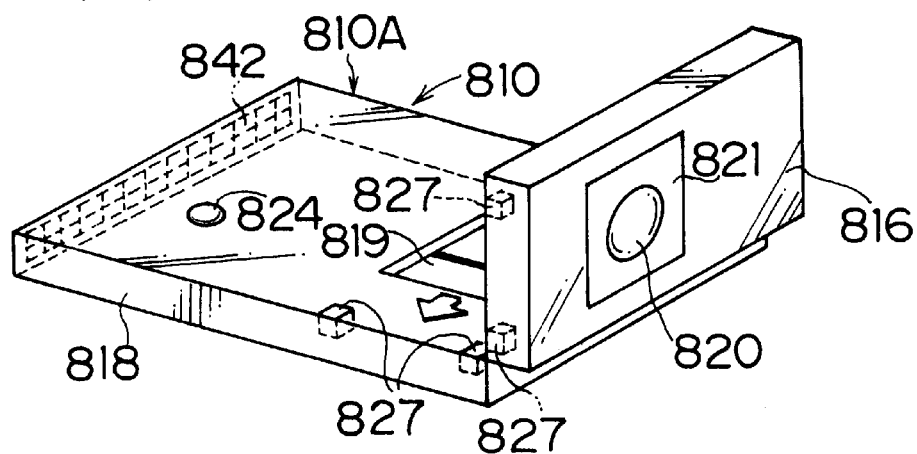
F I G. 3 4 (C)
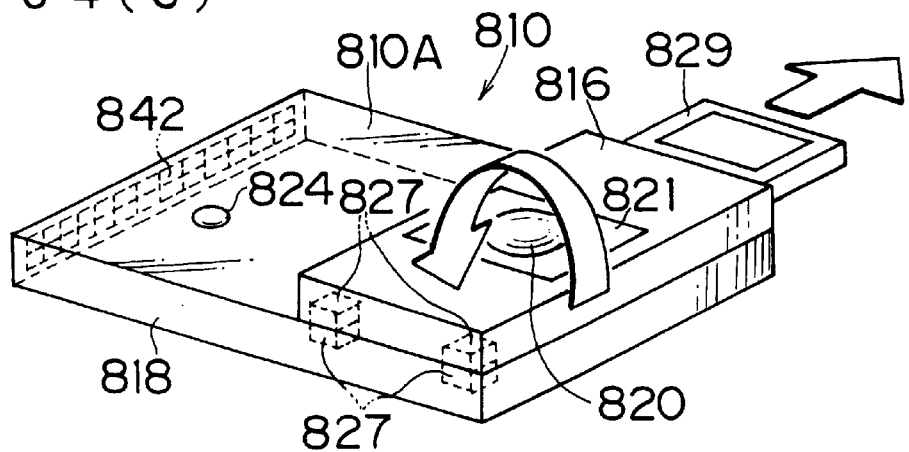

F I G. 3 5
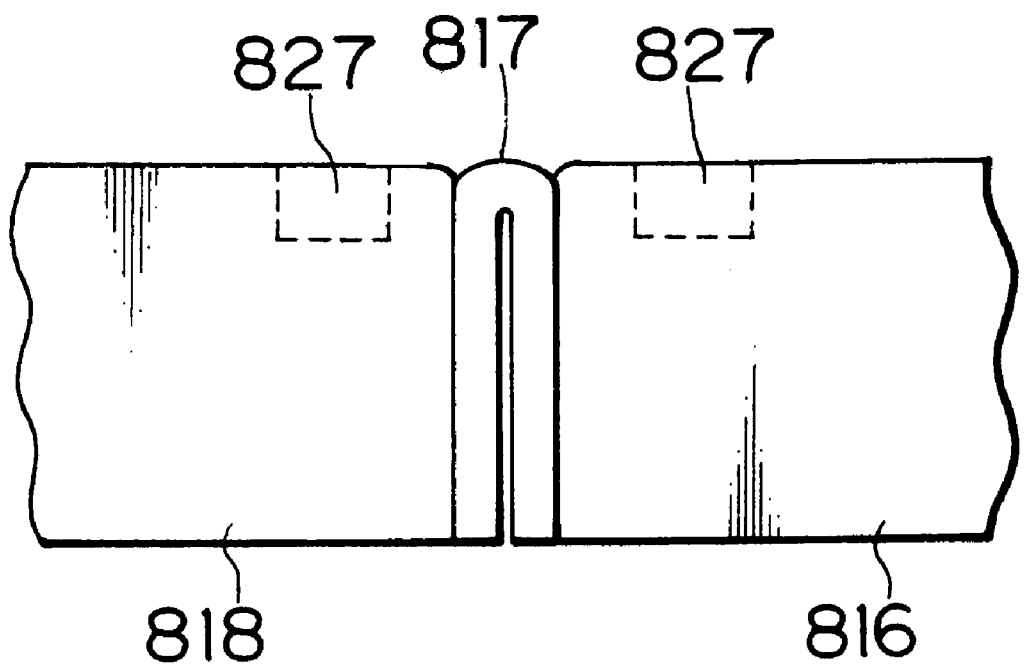

F I G. 4 8
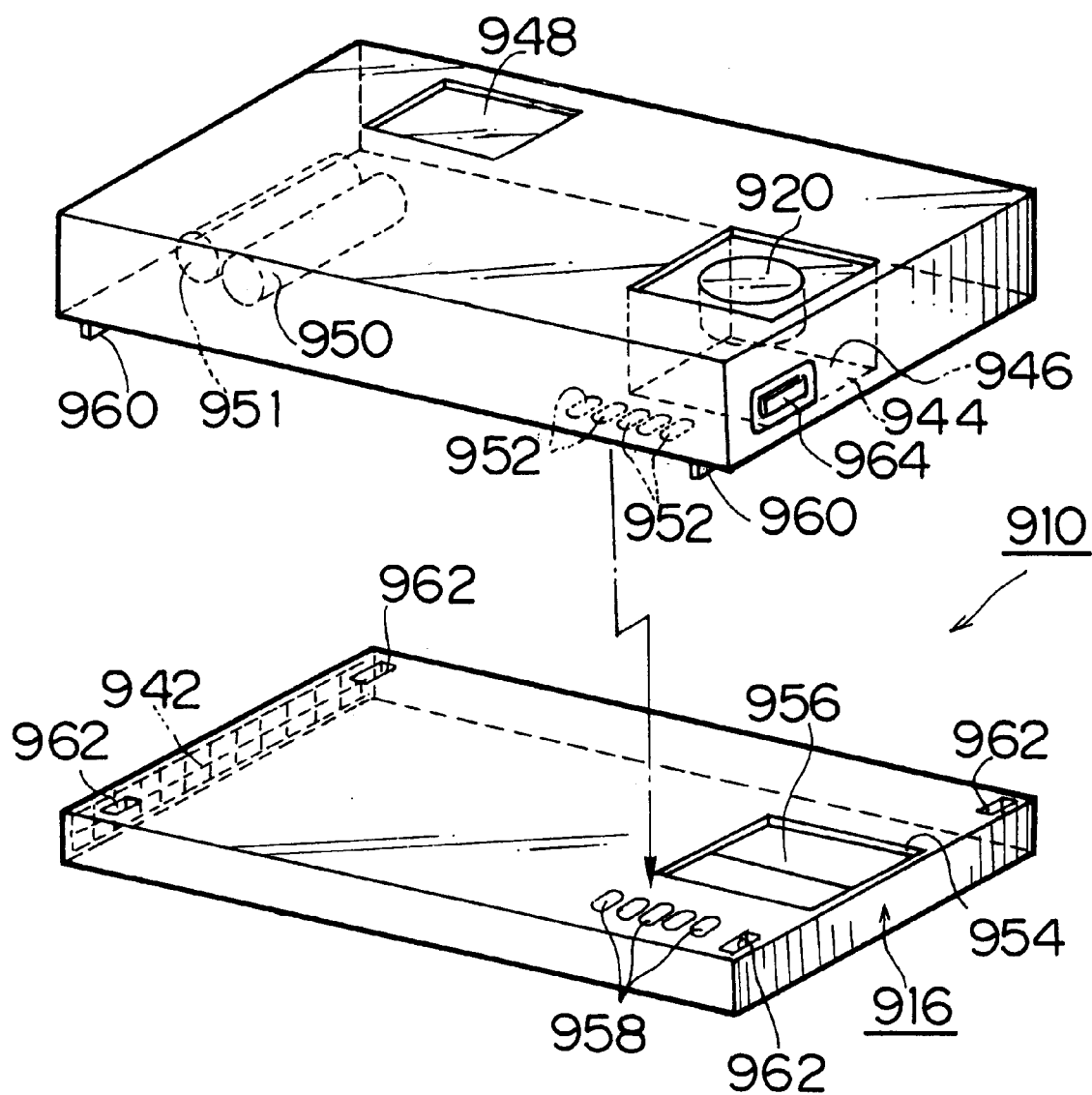

IMAGE SIGNAL PROCESSING UNIT AND ELECTRONIC STILL CAMERA

BACKGROUND OF THE INVENTION

1. Field of the Invention

The present invention relates generally to an electronic still camera and an image signal processing apparatus, and more particularly to an electronic still camera which uses a memory card, and an image signal processing apparatus which comprises a laptop computer which uses the electronic still camera and the memory card, a personal data terminal (PDA), and a host computer such as an electronic notebook.

2. Description of the Related Art

FIG. 49 illustrates an electronic still camera using a conventional memory card, and a laptop computer using the memory card. As shown in FIG. 49, a card slot 2 is formed in the electronic still camera 1. In order to take a picture using the electronic still camera 1, a memory card 3 is inserted into the card slot 2, and image data captured during photographing are recorded in the memory card 3.

In order to store the image data recorded in the memory card in an image file in a laptop computer 4, the memory card 3 is removed from the electronic still camera 1, and the memory card 3 is inserted into the card slot 5 of the laptop computer 4.

In the above-described conventional system, however, the memory card 3 is inserted into the electronic still camera 1 during photographing, and in order to transfer the image data recorded in the memory card 3 to the laptop computer 4, the memory card 3 must be drawn out from the electronic still camera 1 and inserted into the laptop computer 4. During photographing using the electronic still camera 1, the number of photographing is restricted by the capacity of a power source in the camera and the recording capacity of the memory card.

Japanese Patent Provisional Publication Nos. 7-312716, 7-322117 and 8-9215 disclose an electronic still camera which can be used in the same manner as the PC card in which the size and the shape of the connector are standardized. That is, the electronic still camera is composed of a PC card part and image input device. The PC card part is inserted into the card slot of an external information processing unit such as a laptop computer, so that the external information processing equipment can monitor the camera in real time and the external information processing equipment can have access to an image memory in the camera.

The PC card section of the electronic still camera has the same thickness as the PC card, but the image input device including the taking lens is bulky, and the camera as a whole is larger than the PC card.

Thus, the camera is not well-balanced, and it is inconvenient for carrying in a state for being inserted into the external information processing equipment.

SUMMARY OF THE INVENTION

It is an object of the present invention to provide the image signal processing apparatus which is able to alleviate the trouble of inserting and drawing a memory card during photographing or when image data are transferred to a host computer such as a laptop computer, and which is able to supply electricity from the host computer to a camera body and control the system of the camera body.

It is another object of the present invention to provide the electronic still camera which a small memory card is easily attached to and detached from, and which is able to select the appearance of the camera and an operation system such as a shutter release button to a user's desire, and which is able to make the camera body smaller.

It is yet another object of the present invention to provide the electronic still camera which has a power source of a battery in the camera body that is flat and thin, so that the camera as a whole can be the same size as a PC card.

According to the present invention, an image signal processing apparatus which comprises a camera body, a memory card which is inserted into and drawn out from the camera body, and a host computer which transmits and receives image data to and from the memory card, is characterized in that: the memory card has two connectors which are connected to the camera body and the host computer, the memory card being constructed in such a way that the two connectors can be simultaneously mounted in the camera body and the host computer; the camera body has means for detecting the state of the first connection where only the memory card is connected, and the state of the second connection where only the host computer is connected via the memory card; if detecting the first connection, the camera body supplies a power source to the memory card and turns into a normal mode for executing a normal photographing sequence of recording image data captured during photographing in the memory card, and if detecting the second connection, the camera body receives a power source from the host computer via the memory card and a photographing command including a shutter release instruction and enters a host computer remote mode for photographing; and the host has a function of executing an image transfer/regenerate sequence between the host computer and an image memory in the memory card, and a function of supplying a power source from the host computer to the camera body via the memory card and transmitting a photographing command including the shutter release instruction. According to the present invention, if the memory card only is inserted into the camera body, a normal camera sequence is executed, and if the memory card only is inserted into the host computer, a normal image transfer/regenerate sequence is executed. When both the camera body and the host computer are connected via the memory card, the camera body turns into a host computer remote mode to be controlled by the host computer. During the host computer remote mode, the power source can be supplied to the camera body and the memory card from the host computer.

According to the present invention, an electronic still camera which comprises an image pickup unit and an IC card capable of being attached to and detached from the image pickup unit; is characterized in that: the image pickup unit includes a taking lens, an image pickup element, and the first connector which the IC card is attached to and detached from, the image pickup unit transmitting a signal representing an object image obtained through the taking lens and the image pickup element to the IC card attached to the first connector; and the IC card comprises the second connector provided at one short side of the IC card and connected to the first connector, signal processing means for processing a signal representing the object image, the third connector provided at the other short side of the IC card and transferring image data stored in a small memory card to external apparatus to which the IC card is attached, the fourth connector to which the small memory card is attached to and detached from, and a card slot at a long side of the IC card where the second and third connectors are not provided, the small memory card being inserted into said card slot.

According to the present invention, the card slot which has the fourth connector is provided at the long side of the IC card where the third connector is not provided, or there is provided a card housing part which has the fourth connector on the surface of the IC card, so that the small memory card can be easily attached and detached.

According to another mode of the present invention, an electronic still camera which comprises a camera body and a camera casing which is mounted in a manner which partially or fully covers the camera body and is able to change an appearance of a camera, is characterized in that: the camera casing includes at least a taking lens, an image pickup element, a finder, operation means including a shutter release button, and the first connector outputting an image signal captured through the taking lens and the image pickup element and an operation signal from the operation means; and the camera body includes at least the second connector connected to the first connector when being mounted in the camera casing, signal processing means for processing the image signal, and control means for recording an image signal in a recording medium, the signal processing means processing the image signal on receipt of the operation signal from the operation means.

According to the present invention, the camera casing which suits the user's taste is attached to a camera body, thereby modifying the appearance of the camera according to the user's age, taste and feeling. The operation system such as the shutter release button and the grip, etc. can be easily handled by all people of all ages.

According to another mode of the present invention, a digital camera which loads, in an image pickup unit, a card unit corresponding to a PC card standard, converts an object image into image data by image pickup means of the image pickup unit, and records the image data into a memory of the card unit, is characterized in that: when the card unit is loaded in the image pickup unit, the card unit is partially exposed from the image pickup unit, and a switch necessary for photographing is provided at the exposed portion of the card unit.

According to the present invention, a switch necessary for photographing is arranged in order to be seen from the image pickup unit of the card unit, thereby eliminating a necessity to provide a switch in the image pickup unit. Thus, the image pickup unit and the camera as a whole can be small in size.

According to another mode of the present invention, a card-sized electronic still camera which records, in a recording medium in a camera, an image signal representing an object image captured through a taking lens and an image pickup element, is characterized in that: a casing is formed so that an external surface of the camera can be flat and the camera can be thin, a camera board shaped like the casing and a sheet battery are provided in the casing.

According to another mode of the present invention, a card-sized electronic still camera which records, in a recording medium in a camera body, image data representing an object image captured through a taking lens and an image pickup element when shutter is released, is characterized in that: the camera body is shaped like a PC card inserted into a PC card slot of a personal computer, the camera body being inserted into said PC card slot, thereby transmitting image data to the personal computer; and the taking lens is arranged in such a way that an optical axis thereof turns in a direction of depth of the camera body, the taking lens being capable of projecting from and retracting into the camera body in order to secure an optical path length for photographing. According to the present invention, the taking lens is arranged in the camera body shaped like a PC card so that the optical axis thereof can turn in the direction of depth of the camera body. The taking lens can rising from and retract into the camera body to secure the optical path length for photographing. For this reason, if the taking lens is hidden in the camera body, the camera as a whole is the card-sized, and if the taking lens rises from the camera body, the photographing becomes possible.

According to another mode of the present invention, an electronic still camera comprises: a card-sized body formed in a manner to be inserted into a card slot of external information processing apparatus such as a personal computer provided with a connector at a slot thereof, the body being provided with a connector at a case thereof, the connector being capable of connecting to the connector provided at the slot; an electronic circuit board built in said body and provided with an image pickup element, an image processing circuit, an image memory, or the like; and a front board provided with a taking lens and attached to the body in a manner to be folded, the taking lens projecting from the body to enable photographing, the front board being folded into the body so as to house the body in the card slot when the body is inserted into the external information processing apparatus.

According to the present invention, the front plate provided with the taking lens projects from the card-sized body during photographing, thereby enabling photographing. When the camera is inserted into the card slot of the personal computer, etc., the front plate is folded into the body. Thus, the card-sized electronic still camera of the present invention is convenient for carrying even in a state of being inserted into the card slot of the personal computer, etc. Moreover, there is no projection in the camera, and thus the photographing can be performed without any trouble.

According to another mode of the present invention, an electronic still camera comprises: a card-sized body formed in a manner to be inserted into a card slot of external information processing apparatus such as a personal computer provided with a connector at a slot thereof, the body provided with a connector at a case, the connector being capable of connecting to the connector at the slot; and which is characterized in that: a taking lens, a finder and an operation button are provided in the body, and an image pickup unit, an image processing circuit, an image memory, etc. are built in the main body; and the finder or the taking lens composes the card-sized body in a folded state, and projects from the body in the folded state to be used for photographing.

According to the present invention, the finder or the taking lens projects from the body in a state of being folded from the card-sized body, thereby enabling photographing. If, however, the camera is inserted into the card slot of the personal computer, etc. or if the camera is carried, the finder or the taking lens is folded into the body so that the camera can be card-sized. Thus, the card-sized electronic still camera of the present invention is easy to carry even in a state of being inserted into the card slot of the personal computer, etc. Moreover, since the camera has no projection and can be well-balanced, the photographing can be performed without any trouble.

According to another mode of the present invention, an electronic still camera which records, in a recording medium in a camera body, image data indicating an object image obtained through a taking lens and an image pickup element on release of a shutter; is characterized in that: the camera body is composed of the first plate portion provided with the taking lens and the second plate portion provided with the image pickup element, the camera body being shaped like a PC card inserted into a PC card slot of a personal computer, in such a way that an optical axis of the camera body turns in a direction of depth of the camera body, the first plate portion is connected to the second plate portion via a hinge member in a manner to be folded; and the camera body is inserted into a PC card slot, thereby transmitting image data to the personal computer, and the first plate portion and the second plate portion of the camera body are folded so that the taking lens can overlap the image pickup element, thereby enabling photographing and securing an optical path length for photographing.

According to the present invention, the PC card-sized camera body is composed of the first and second plate portions which are connected via a hinge member. When the camera is folded, the taking lens overlaps the image pickup element to form the photographing optical path. When the body is not folded, the camera as a whole is card-sized, and when the first and second plate portions are folded, the body functions as the camera. Since the first plate portion provided with the taking lens overlaps the second plate portion provided with the image pickup element, thereby securing the optical path length for photographing even if the optical axis of the taking lens turns in the direction of depth of the body.

According to another mode of the present invention, an electronic still camera comprises: a lens unit provided with a taking lens, an optical axis of the taking lens being arranged in a direction of depth of the camera; a camera body unit provided with an image pickup element, an image processing circuit, etc. and shaped like a PC card, the lens unit being detachably provided in the camera body unit; and is characterized in that the camera body unit is inserted into external information processing apparatus such as a personal computer, thereby transmitting image data to the external information processing apparatus, and the lens unit is mounted in the camera body unit so as to enable photographing.

According to the present invention, the lens unit, in which the taking lens is arranged in such a way that the optical axis can turn in the direction of depth of the camera, is detachably mounted in the PC card-sized camera body unit which is provided with the image pickup element, the image processing circuit, etc. When the image data are transmitted to the external information processing apparatus, the camera body unit only is inserted into the card slot of the external information processing apparatus. In order to take a picture, the lens unit is mounted in the camera body unit so that the camera can function. During photographing, the lens unit overlaps the surface of the camera body unit, thus securing the long optical path length for photographing. In addition, since the lens unit is detachably provided in the camera body unit, the camera can be convenient for carrying.

Furthermore, the lens unit is shaped like the camera body unit, and thus, the camera can be well-balanced during photographing and can be convenient for carrying.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 2 is a block diagram illustrating the inner construction of the image signal processing apparatus according to the present invention;

FIG. 3 is a view illustrating the arrangement of pins of the connector at the host computer side of the memory card shown in FIG. 1;

FIG. 4 is a view illustrating the first embodiment of the electronic still camera according to the present invention;

FIG. 5 is a block diagram showing the inner construction of the electronic still camera shown in FIG. 4;

FIG. 7 is a view illustrating the third embodiment of the electronic still camera according to the present invention;

FIG. 9 is a block diagram illustrating the inner construction of the electronic still camera shown in FIG. 8;

FIG. 10 is a perspective view illustrating the fifth embodiment of the electronic still camera according to the present invention;

FIG. 11 is a block diagram illustrating the inner construction of the electronic still camera shown in FIG. 10;

FIG. 12 is a view illustrating the sixth embodiment of the electronic still camera according to the present invention;

FIG. 13 is a block diagram illustrating the inner construction of the electronic still camera shown in FIG. 12;

FIG. 18 is a block diagram illustrating the inner construction of the electronic still camera shown in FIG. 17;

FIG. 19 is a perspective view illustrating another embodiment of the sheet-like battery applied to the present invention;

FIG. 21(A) is a sectional view illustrating the first embodiment of FIG. 20(A);

FIG. 21(B) is a sectional view illustrating the first embodiment of FIG. 20(B);

FIG. 22(A) is a sectional view illustrating the second embodiment of FIG. 20(A);

FIG. 22(B) is a sectional view illustrating the second embodiment of FIG. 20(B);

FIG. 23 is a view describing the swing of the second lens portion in FIG. 22;

FIG. 24 is a view illustrating the tenth embodiment of the electronic still camera according to the present invention;

FIG. 25 is a sectional view illustrating the inner construction of the electronic still camera shown in FIG. 24;

FIG. 26 is a view illustrating the insertion state of the electronic still camera shown in FIG. 24 in the card slot;

FIG. 32 is a view illustrating the fourteenth embodiment of the electronic still camera according to the present invention;

FIG. 33 is a view illustrating the fifteenth embodiment of the electronic still camera according to the present invention;

FIG. 34(A) is a view illustrating the sixteenth embodiment of the electronic still camera according to the present invention;

FIG. 34(B) is a view illustrating the sixteenth embodiment of the electronic still camera according to the present invention;

FIG. 34(C) is a view illustrating the sixteenth embodiment of the electronic still camera according to the present invention;

FIG. 35 is a view illustrating another embodiment for the hinge member of the electronic still camera according to the present invention;

FIG. 48 is a perspective view illustrating the state where the lens unit and the camera body unit shown in FIG. 47 are separated.

DETAILED DESCRIPTION OF THE INVENTION

Detailed description will hereunder be given of the preferred embodiment of the electronic still camera and the image signal processing apparatus according to the present invention with reference to the accompanying drawings.

Figure 1:
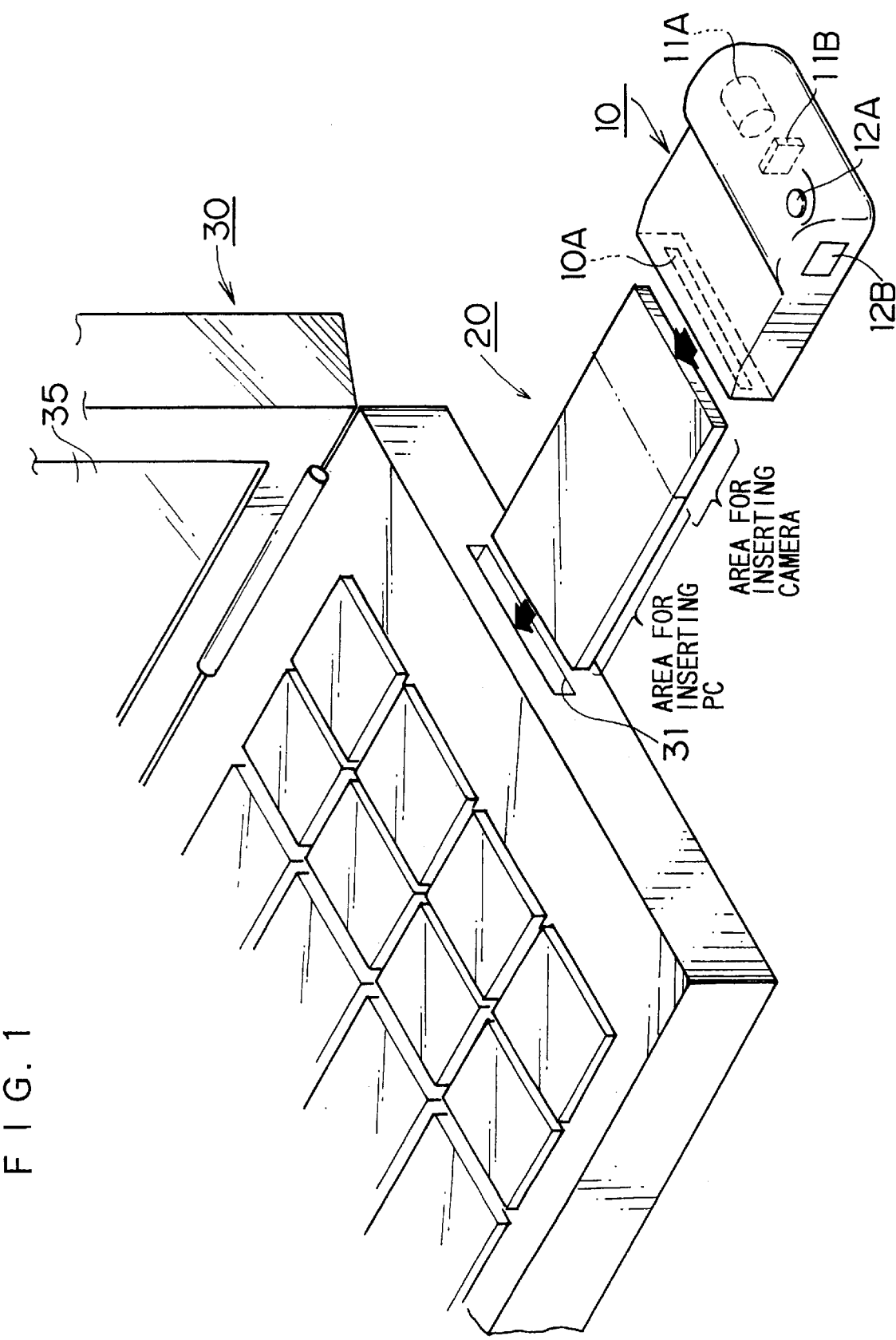
FIG. 1 is a view illustrating the embodiment of the image signal processing apparatus according to the present invention.

FIG. 1 is a view illustrating the embodiment of the image signal processing apparatus according to the present invention; FIG. 2 is a block diagram illustrating the inner construction of the image signal processing apparatus shown in FIG. 1.

As illustrated in FIGS. 1 and 2, the image signal processing apparatus consists of a camera body 10, a memory card 20 which has a partially common function with a memory card such as a PCMCIA (Personal Computer Memory Card International Association) card, and a host computer 30 comprising a laptop computer, PDA, an electronic book, and so on.

As shown in FIG. 1, a card slot 10A is provided on the side surface of the camera body 10. The memory card 20 can be inserted and removed via the card slot 10A. In FIG. 1, 11A is a taking lens, 11B is an image pick-up element such as a CCD, 12A is a shutter release button, and 12B is a liquid crystal finder.

As shown in FIG. 2, the memory card 20 consists of a connector 21 which is connected to a connector 13 of the camera body 10, a connector 22 which is connected to a connector 32 of the host computer 30, a memory 23 in which image data of a plurality of frames are recorded, a memory control part 24, etc. The connector 22 which is connected to the host computer 30 side has a pin 68 for PCMCIA as shown in FIG. 3.

As shown in FIG. 1, the memory card 20 is inserted in the card slot 10A of the camera body 10 or the PC card slot 31 of the host computer 30, and the memory card 20 is formed to be able to be inserted in each card slot of the camera body 10 and the host computer 30 at the same time; thus the camera body 10 can be attached to the host computer 30 via the memory card 20.

In this embodiment, a laptop computer is applied to the host computer 30; moreover, a computer soft program such as one with a function which is related to the present invention is installed to the host computer 30.

In the system which is constructed as described above, when the memory card 20 is connected to the camera body 10, a normal camera sequence, in which the camera body 10 supplies the power to the memory card 20 and at the same time records image data obtained during photographing in the memory card 20, is executed.

In short, when the shutter release button 12A is pressed, an object image which is formed on a light receiving face of the CCD 11B via the taking lens 11A is photoelectrically converted and sequentially read out as a CCD signal. The CCD signal is converted to a digital signal by an A/D converter 14 via an analog processing circuit (not shown), and added to an image processing part 15. The image processing part 15 includes a brightness signal generating circuit, a color difference signal generating circuit, a gamma correction circuit, and a compression circuit. The image processing part 15 outputs the image data processed by the circuits, to the memory card 20 via the connector 13, 21. The memory card 20 records the image data to be input to the memory 23 which is controlled by the memory control part 24.

A system control part 16 of the camera body 10 unifies and controls each circuit of a camera. The control part 16 controls photographing by an input signal from an operation display part 12 which includes the shutter release button 12A, displaying a number of photographing operation at the operation display part 12, a power source circuit 18, and mode switching according to a connecting condition with the memory card 20 and the host computer 30 which will be described later, and so on. A battery 18 is a rechargeable battery. To execute a normal camera sequence, the battery 18 supplies the power via a power source circuit 17 to each circuit of the camera and also supplies the power to the memory card 20.

On the other hand, if only the memory card 20 is connected to the host computer 30, the host computer 30 reads out image data from the memory 23 of the memory card 20 and also execute a normal image transfer/ regeneration sequence which records image data to the memory 23. At this state, the insertion/pulling-out detection of the memory card 20 is performed according to whether a signal CD1 or CD2 (the signal of the pin #36 and the pin #67 in FIG. 3) is detected via an OR circuit 33. In addition, the camera body 10 can detect the insertion/pulling out of the memory card 20 in the same manner as described above.

Next, the case in which the camera body 10, the memory card 20, and the host computer 30 are all connected will be described.

The camera body 10 records in the specified area of the memory 23 of the memory card 20 a flag for indicating that the camera body 10 is connected to the memory card 20. The host computer 30, too, records in the specified area of the memory 23 a flag for indicating that the host computer 30 is connected to the memory card 20. Thus the camera body 10 can recognize that the memory card 20 is connected to the host computer 30 side as well, by reading the flag. The host computer 30, too, can recognize that the memory card 20 is connected to the camera body 10 by reading the flag. Although in the embodiment connection of the other end of the memory 20 to another apparatus is detected by reading the flag, the present invention is not limited to that. Another signal conductor may be provided to the memory card 20 in order to detect the connection from a signal level of the signal conductor.

Now, the camera body 10 switches from the normal mode which execute a normal camera sequence to a host computer-remote mode as detecting that the memory card 20 is connected to the host computer 30. In the host computer-remote mode, the camera body 10 receives a remote command (such as a shutter release command, zoom command, exposure control command) from the host computer 30 side via the memory card 20, and acts by the remote command. Moreover, in the case of the host computer-remote mode, a predetermined power source from the power source circuit 34 of the host computer 30 is supplied to the camera body 10 and the memory card 20. Further, the camera body 10 can be switched to a recharging mode and recharges the battery 18 by the power source circuit 17 which has a recharging function.

On the other hand, the host computer 30 is enabled to transmit the remote command to the camera body 10 via the memory card 20 as detecting that the memory card 20 is connected to the camera body 10. Moreover, the host computer 30 can display an image in real-time to a liquid crystal monitor 35 (refer to FIG. 1) according to image data which is added from the camera body 10 via the memory card 20. The host computer 30 can also display a still image to the liquid crystal monitor 35 according to image data taken in at the time of photographing for confirming the photographing. Further, the host computer 30 can directly store image data taken in during photographing to an image file (not shown) in the host computer 30.

FIG. 4 is a view illustrating the first embodiment of the electronic still camera according to the present invention, and FIG. 5 is a block diagram illustrating the inner construction of the electronic still camera shown in FIG. 3.

As shown in FIGS. 4 and 5, the electronic still camera consists of an image pick-up unit 110 and an IC card portion 130 which is in the same form as a memory card such as, for example, a PCMCIA card.

The image pick-up unit 110 is provided at its side with a card slot 111 as shown in FIG. 4; the IC card portion 130 can be detachable via the card slot 111. As shown in FIG. 5, the image pick-up unit 110 consists of a taking lens 112, a CCD 113, a connector 121 in the card slot 111, a shutter button 123, and a battery 124. The reference numeral 126 in FIG. 4 is a finder.

On the other hand, as shown in FIG. 5, the IC card portion 130 consists of a connector 131 (the second connector) which is connected to a connector 121 (the first connector) of the image pick-up unit 110, a connector 132 (the third connector) which is connected to a connector (not shown) such as a connector of a laptop computer, an analog processing circuit 114, an A/D converter 115, a timing generating circuit 116, a signal processing circuit 133, a central processing unit (CPU) 134, a memory controller 135, a connector (an armature) 136 (the fourth connector) with a small-sized memory card, and a card interface 137.

A slot 160 for a small-sized memory card is formed at a side end of the IC card portion 130. The small-sized memory card (for example, a Solid State Floppy Disk Card (SSFDC)) 162 is attached to or detached from the slot 160. The size of the small-sized memory card 162 is slightly larger than a postage stamp and 0.7 mm thick. The small-sized memory card 162 is used as a memory card for an electronic still camera to record image data. The small-sized memory card 162 does not include a controller portion, and records image data of more than ten frames. When the small-sized memory card 162 is inserted to the slot 160, the connector 164 (an armature) is conducted to the connector 136 (an armature).

The IC card portion 130 is used as attached to the image pick-up unit 10 and also used as attached to a laptop computer, and so on, which has a PC card slot. An explanation will be given about the case when the IC card portion 130 is attached to the image pick-up unit 110.

In that case, the IC card 130 is activated after it is supplied the power, via the connectors 121, 131, from a power circuit 125 which is at the image pick-up unit 110 side.

Now, when the shutter release button 123 is pressed, an object image, formed on the light-receiving face of the CCD 113 via the taking lens 112, is photoelectrically converted; then the object image is sequentially read out as a CCD signal by the timing generating circuit 116 of the IC card portion 130 and driving pulses added from a CCD driving circuit. The CCD signal is added via the connectors 121, 131, to the analog processing unit 114 which has a CDS clamping circuit, a gain adjusting circuit, and a color balance adjusting circuit. The CCD signal is then converted to a digital signal by the A/D converter 115 after being analogically processed, and output to the signal processing circuit 133. It is noted that the analog processing circuit 114, the A/D converter 115, the signal processing circuit 133 become synchronized when the driving pulses are output from the CCD driving circuit according to a timing signal output from the timing generating circuit 116.

The signal processing circuit 133 includes a brightness signal generating circuit, a color difference generating circuit, a gamma correction circuit, a compression circuit, and so forth, and stores the image data processed by these circuits in the small-sized memory card 162 via the memory controller 135 and the connectors (armatures) 136, 164. The CPU 134 unifies and controls each circuit of the camera, and controls photographing according to an input signal from the shutter release button 123, the strobe 122, and the memory controller 135.

Next, an explanation will be given about a case when the IC card portion 130 is taken out of the image pick-up unit 110 and used as attached to external apparatus such as a laptop computer which has a PC card slot.

In that case, the IC card portion 130 is inserted into a card slot (not shown) of the external apparatus so that the connector 132 of the IC card portion 130 is connected to a connector of the external apparatus. Thus, the memory controller 135 reads out the requested image data from the small-sized memory card 162 by a data request from the external apparatus; and the read-out image data is transferred to the external apparatus via the card interface 137 and the connector 132.

In the above-described operation, the IC card portion 130 functions as a card adaptor for transferring an image, stored in the small-sized memory card 162, to a personal computer, and so on. Moreover, when the limited numbers of photographing to be stored are photographed, the memory card 162 allows the numbers of photographing more than the limited numbers of photographing to be stored in itself by exchanging the finished memory card 162 with a new one.

Figure 6:
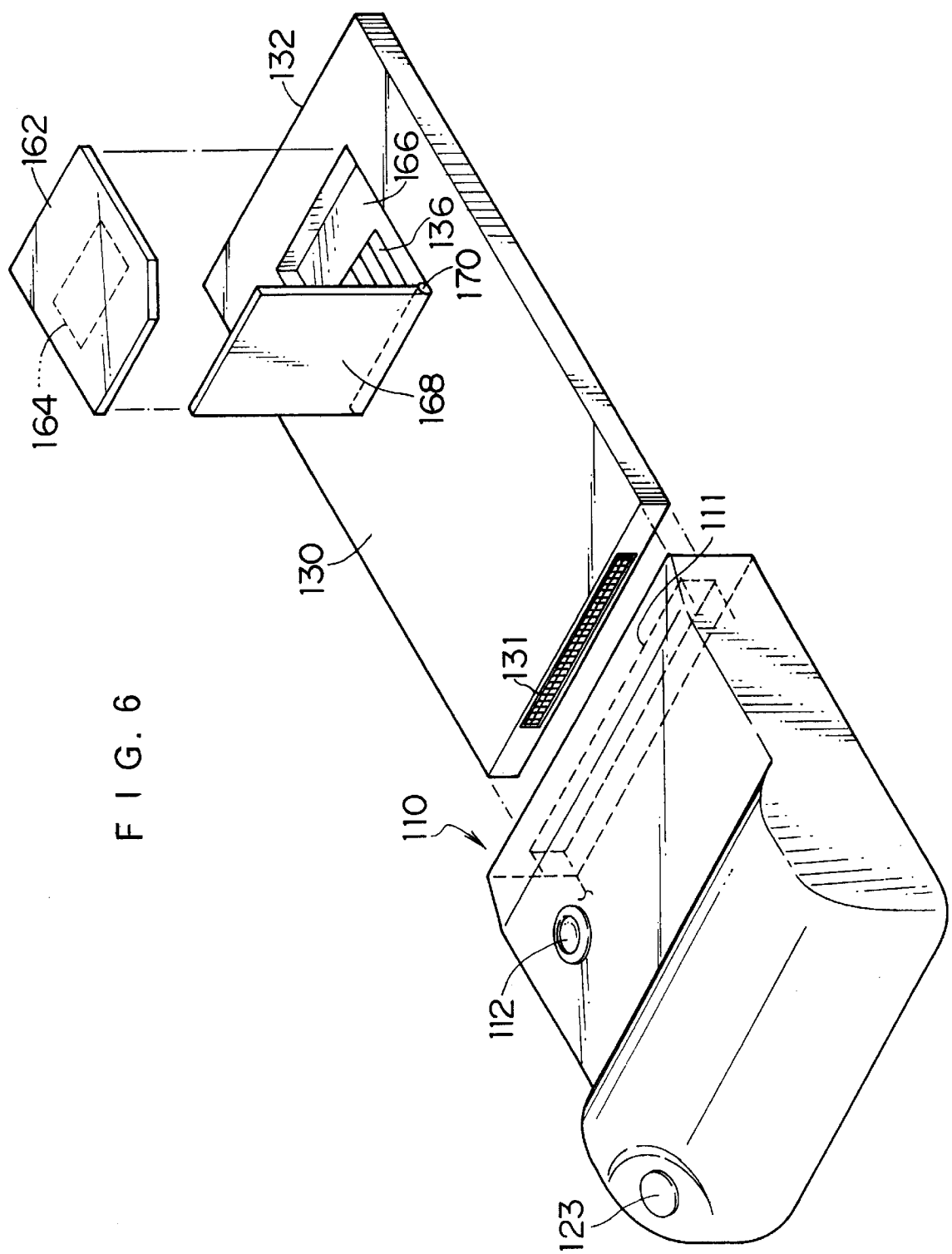
FIG. 6 is a view illustrating the second embodiment of the electronic still camera according to the present invention.

FIG. 6 is a view illustrating the second embodiment of the electronic still camera according to the present invention. The similar parts as shown in FIGS. 4 and 5 have the same reference numerals and alphabets, and the detailed explanation for them is omitted. The electronic still camera in FIG. 6 has the same circuit construction as the one in FIG. 5.

In the second embodiment shown in FIG. 6, a recessed portion 166 for containing the small-sized memory card 162 instead of the slot 160 provided on the diagonal side of the IC card portion 130 is formed on the surface side of the IC card portion 130. A cover 168 of the recessed portion 166 can be freely opened and closed via a hinge 170. When the cover 168 is closed the memory card 162 can be contained in the recessed portion 166. The recessed portion 166 can contain the small-sized memory card 162 which is 0.78 mm thick, and is provided a connector (an armature; the fourth connector) 136.

Therefore, when the small-sized memory card 162 is contained into the recessed portion 166, a connector 164 (an armature) of the small-sized memory card 162 and the connector (an armature) 136 are conducted, and image data can be recorded on the small-sized memory card 162.

FIG. 7 is a view illustrating the third embodiment of the electronic still camera according to the present invention. The similar parts shown in FIGS. 4 and 5 have the same reference numerals, and a detailed explanation for them is omitted.

In the embodiments in FIGS. 4 and 6, the IC card portion 130 is constructed as being freely detachable with the image pick-up part 110; however, in the embodiment in FIG. 7, the IC card portion 130 is integrally constructed with the image pick-up part 110, and the connectors 121, 131 are not required. Like the embodiment in FIG. 4, in the embodiment in FIG. 7, the small-sized memory card 162 is inserted to be freely detachable into the slot 160 formed on the diagonal side of the IC card portion 130. Moreover, in the embodiment in FIG. 7, the recessed portion 166 which has the connector 136 at the surface side of the IC card portion 130 may be provided like the embodiment in FIG. 6.

Figure 8:
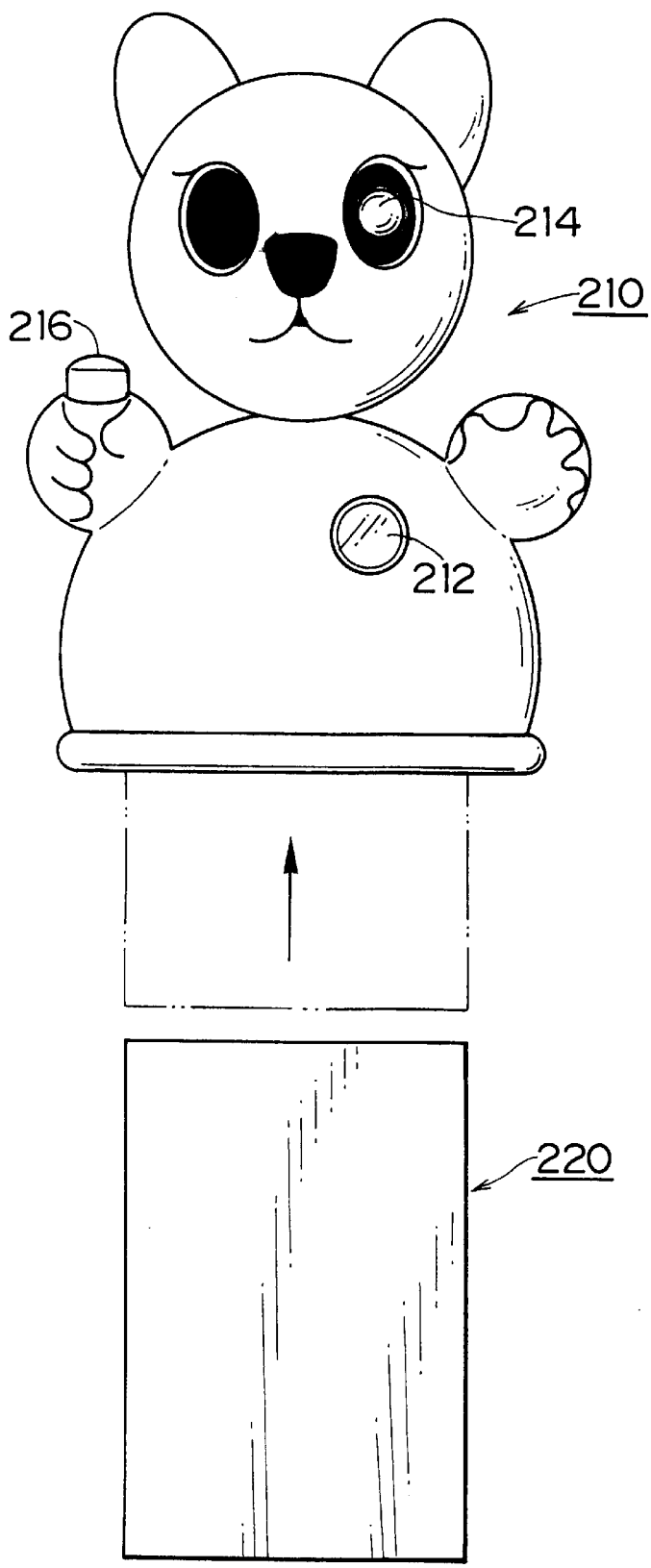
FIG. 8 is a view illustrating the forth embodiment of the electronic still camera according to the present invention.

FIG. 8 is a view illustrating the fourth embodiment of the electronic still camera according to the present invention; FIG. 9 is a view illustrating the inner construction of the electronic still camera shown in FIG. 8. As shown in FIGS. 8 and 9, the casing 210 is attached so as to cover a camera body 220, and allows an appearance of the camera to be modified. The casing 210 is provided with a single focusing lens 212, an optical finder 214, a shutter release button 216, a CCD 218, and a connector 219 (refer to FIG. 9) for receiving signals from the camera body 220. The casing 210 in FIG. 8 is designed to be preferred by children, is simplified its operation system to be operatable for children, and is made of fabric material to be easily gripped by children.

On the other hand, the casing 210 is attached to the camera body 220, but can be attached to another casing 230 (refer to FIG. 10). As shown in FIG. 9, the camera body 220 mainly consists of a connector 221 which is connected to a connector 219 of the casing 210, an A/D converter 222, a signal processing circuit 223, a system control circuit 224, a memory control circuit 225, and an image memory 226, such as a flash memory, which stores image data of a plurality of images.

Next, the case where the casing 210 is attached to the camera body 220 will be described.

In that case, an object is determined by the optical finder 214. Then object image, formed on the light receiving face of the CCD 218 via the lens 212, is photoelectrically converted and sequentially read out as a CCD signal when the shutter release button 216 is pressed. The CCD signal is analogically processed in the analog processing circuit (not shown), and added to the A/D converter 222 at the camera body 220 side via the connectors 219, 221. The A/D converter 222 converts an analog CCD signal to be input to a digital signal, and adds the signal to the signal processing circuit 223.

The signal processing circuit 223 includes a brightness signal generating circuit, a color difference signal generating circuit, a gamma correction circuit, a compression circuit, and so forth. The signal processing circuit 223 outputs image data, processed by the circuits, to the memory control circuit 225; and the memory control circuit 225 records image data, input according to a writing command from the system control circuit 224, to the image memory 226. The system control circuit 224 unifies and controls each circuit of the camera. The system control circuit 224 controls recording the image data to the memory 226 with an input signal generated by the operation of the shutter release button 216, and controls transferring the image data to an external file apparatus (not shown) and a printer.

FIG. 10 is a view illustrating the fifth embodiment of the electronic still camera according to the present invention; FIG. 11 is a block diagram illustrating the inner construction of the electronic still camera shown in FIG. 10. As shown in FIGS. 10 and 11, the electronic still camera is the same as the one in FIG. 8 except a casing 230.

The casing 230 is attached so as to cover the camera body 220, and allows an appearance of the camera to be modified. The casing 230 is provided with a zoom lens 231, a liquid crystal display (LCD) 232 which can be opened and closed, an LCD driving circuit 233, a light emitting diode for display 234, a shutter release button 235, a zoom lever 236, a CCD 237, and a connector 238 to transmit and receive a signal from the camera body 220.

Next, an explanation will be given about the operation of the electronic still camera by referring to FIG. 11; however, an explanation for the similar members with those in FIG. 9 are omitted.

The LCD driving circuit 233 can receive image data output from the signal processing circuit 223 or from the image memory 226 via the memory control circuit 225. Thus the LCD 232 can display the real-time image (the movie image) and can also display the still images which are recorded in the image memory 226 to confirm a photographing.

Moreover, the zoom lever 236 optically zooms the zoom lens 231, in a low-magnification range, for example; if the zoom lever 236 is operated to the side of a high-magnification range beyond the low-magnification range, the zoom lever 236 outputs a zoom signal to perform an electronic zoom to the camera body 220 side. When the zoom signal is input by the operation of the zoom lever 236, the system control circuit 224 processes an electronic zoom process at the signal processing circuit 223. Moreover, the system control circuit 224 controls lighting of a display LED 232 when necessary.

In addition, although a power source was not described in the fourth and fifth embodiments, a power source may be provided to only the camera body side so as to supply the power to the camera body side; in contrast, a power source may be provided to only the casing portion side only so as to supply the power to the camera body side. Moreover, the camera body may be the same form as a PC card such as a PCMCIA card so as to directly insert into a card slot such as a laptop computer.

FIG. 12 is a view illustrating the sixth embodiment of the electronic still camera according to the present invention; FIG. 13 is a block diagram illustrating the inner construction of the electronic still camera shown in FIG. 12.

As shown in FIGS. 12 and 13, the electronic still camera consists of a camera image pick-up unit 310, and a card unit 312 which is the PC card standard. When photographing, the camera card unit 312 is loaded into a card loading portion 314 of the camera image pick-up unit 310, and is used after the connector 316 connects the card loading portion 314 and the camera card unit 312 as shown in FIG. 13.

The camera card unit 312 is equipped with a memory 332 which can record a plurality of photographed images. The photographed images which is imaged by the camera image pick-up unit 310 is recorded in the memory 332. Then the photographed images recorded in the memory 332 can be read out by a computer and regenerated, by inserting the camera card unit 312 into a PC card slot of the computer. Moreover, in a case that the camera image pick-up unit 310 is provided with image regenerating apparatus such as a liquid crystal monitor, the photographed images recorded in the memory 332 of the camera card unit 312 can be regenerated at the time of photographing.

The image pick-up unit 310 is provided with an optical finder which observes an object to be photographed. The optical finder 313 can be an electronic view finder with a liquid crystal or other elements; in that case, a photographed image recorded in the memory 332 of the camera card unit 310 can be regenerated by the electronic view finder.

Further, the image pick-up unit 310 is provided with a taking lens 320 and a CCD 322 as shown in FIG. 13. An object light, formed on the forming face of the CCD 322 via the taking lens 310, is photoelectrically converted and sequentially read out as a CCD output signal by driving pulses which are applied from a CCD driving circuit 326.

Then, the CCD output signal is input to a signal processing circuit 324 in the camera image pick-up unit 310, and is processed according to each sort of signal by the signal processing circuit 324 (including an analog processing circuit such as a CDS circuit, a gain adjusting circuit, and a color balance adjusting circuit, and a digital processing circuit such as a brightness signal generating circuit, a color difference signal generating circuit, a gamma correction circuit). Thereby, digital image data are generated and the generated image data are output to the camera card unit 312. The driving pulses are output from the CCD driving circuit 326 according to a timing signal output from a timing generator 328, and at the same time the signal processing circuit 324 and so on are synchronized.

As shown in FIG. 13, the camera card unit 310 is equipped with the memory 332. Image data generated by the camera image pick-up unit 310 as described above are input to a signal compression circuit 330 of the camera card unit 312 via the connector 316; the generated image data are compressed and recorded in the memory 332. The memory 332 has a memory capacity to record a plurality of image data.

The camera card unit 312 is also equipped with a control circuit 334. The control circuit 334 unifies and controls each circuit of the camera image pick-up unit 310 and each circuit of the camera card unit 312. At the time of photographing, the control circuit 334 controls driving the timing generator 328 of the camera image pick-up unit 310, reading out image data from the CCD 322, and writing of image data to the memory 332 by controlling a memory control circuit 336 of the camera card unit 312, and so on.

Furthermore, the camera card unit 312 is provided with a sheet switch 338, a shutter switch 340, a GND terminal 342, and a liquid crystal display 344, as shown in FIG. 12. The sheet switch 338 controls the memory 332 and sets a photographing condition at a time of photographing. The shutter switch 340 and GND terminal 342 is a switch for a shutter release. The liquid crystal display 344 displays information such as remaining numbers of images which are recordable in the memory 332, dates, and times.

Hereunder an explanation will be given about the sheet switch 338, the shutter switch 340, and the GND terminal 342.

The sheet switch 338 is comprised of a plurality of membrane switches (8 switches, for example) 338A, 338B, 338C, 338D, 338E, 338F, 338G, and 338H which are arranged to form two lines, and are provided flat so as not to project on the plane of the camera card unit 312. When the camera card unit 312 is loaded to the card loading portion 314 of the camera image pick-up unit 310, the switches 338A, 338B, 338C, and 338D in one line (the left line in FIG. 12) at the connector side, to be inserted into the card loading portion 314 of the camera card unit 312, are contained into the card loading portion 314; and the switches 338E, 338F, 338G, and 338H in the other line (the right line in FIG. 12) are exposed from the card loading portion.

Functions, such as date and time setting, card formatting, and formatting, which are unused at the time of photographing, are assigned to the switches 338A, 338B, 338C, and 338D which are contained into the card loading portion 314. Those functions are, for example, date setting, card formatting, other formatting, and so on. When the power switch which is provided to the camera card unit 312 is activated in a state where the camera card unit 312 is not loaded to the card loading portion 314, date and time setting, formatting the memory 332, and formatting can be performed. The control circuit 334 controls the memory control circuit 336 and performs formatting the memory 332 and other formattings when the switches 338A, 338B, 338C, and 338D are operated in a state where the camera card unit 312 is not loaded to the card loading portion 314.

On the other hand, functions, such as controlling a function of a camera, perform ON/OFF of strobe, setting a self-timer, setting sequential photographing, setting an image quality mode, and setting other photographing options, which are used at the time of photographing, are assigned to the switches 338E, 338F, 338G, and 338H which are exposed from the card loading portion. The camera function can be set when the power source is activated in a state where the camera card unit 312 is loaded to the card loading portion 314. The control circuit 334 controls each circuit according to the designated photographing condition by the switches 338E, 338F, 338G, and 338H when the switches 338E, 338F, 338G, and 338H are operated in a case the power source is activated in a state where the camera card unit 312 is loaded to the card loading portion 314.

As described above, the switches 338A, 338B, 338C, and 338D, which are not necessary for photographing in a case that the camera card unit 312 is loaded to the card loading portion 314, are contained in the card loading portion 314. An operation error which would be mistakenly operating an unnecessary switch at the time of photographing can be prevented because only the switches 338E, 338F, 338G, and 338H which are necessary for photographing are exposed which can be operatable.

Figure 14A:
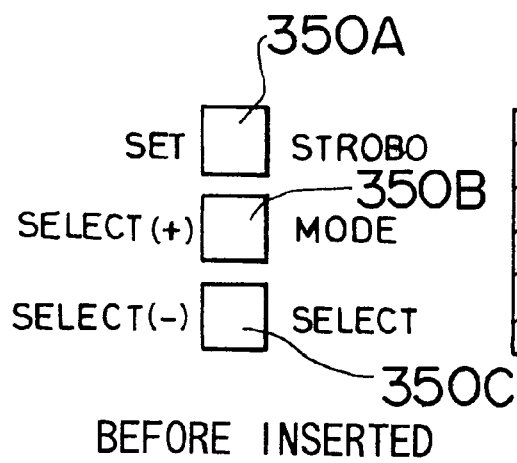
FIG. 14(A) is a view illustrating the first embodiment for the sheet switch.
Figure 14B:
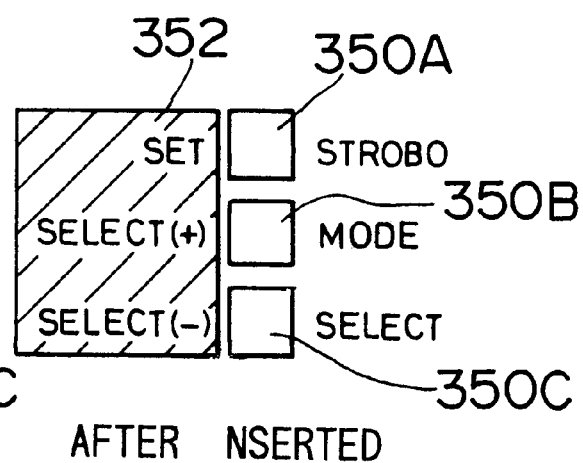
FIG. 14(B) is a view illustrating the first embodiment for the sheet switch.

In order to decrease the number of the sheet switches 338s, the apparatus of the embodiment may electrically detect that the camera card unit 312 is loaded to the card loading portion 314 so that the function of the switches is switched according to a case that the camera card unit 312 is loaded to the card loading portion 314 and a case that the camera card unit 312 is not loaded to the card loading portion 314. FIGS. 14(A) and 14(B) shows one example of the arrangement and function of the switches in the above-described case. In the example shown in FIGS. 14(A) and 14(B), sheet switches 350A, 350B, 350C are arranged in one line, and a switch function is displayed at the both sides of each of the switches 350A, 350B, 350C. In a state where the camera card unit 312 is not loaded to the card loading portion 314, the display of the switch functions at the connector side (the left side) to insert into the card loading portion 314 of the camera card unit 312 is valid among the displays of the switch functions. At that time, the switch function which is displayed at the left side of the switches is executed when each of the switches 350A, 350B, 350C, is pressed. The switch functions displayed at the left side of the switches are not used at the time of photographing.

On the other hand, the display of the switch function at the right side of each of the switches 350A, 350B, 350C, is valid in a state where the camera card unit 312 is loaded to the card loading portion 314. At that time the switch function which is displayed at the right side of the switches is executed when each of the switches 350A, 350B, 350C are pressed. The switch functions displayed at the right side of the switches are the functions to be used at the time of photographing.

A valid switch function can be easily determined by making the part 352 indicated by diagonal lines, which is shown in FIG. 14(B), to be contained in the card loading portion 314 in a state where the camera card unit 312 is loaded to the card loading portion 314, and by making the display of the switch function at the left side to be masked so that the display of the switch function at the right side is exposed. Moreover, the display of the left and right switch functions are exposed at the state where the camera card unit 312 is not loaded to the loading portion 314. Thus, the display of the right and left switch functions is distinguished by contrast and colors. If the display of the left and right functions is exposed, the display of the switch function at the left side may be made to be clearly determined to be valid.

Figure 15A:
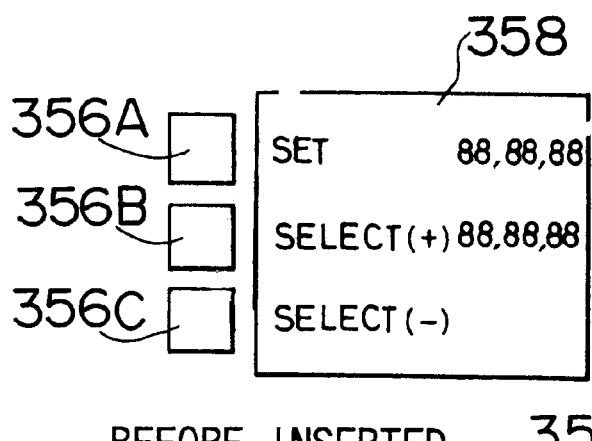
FIG. 15(A) is a view illustrating the second embodiment for the sheet switch.
Figure 15B:
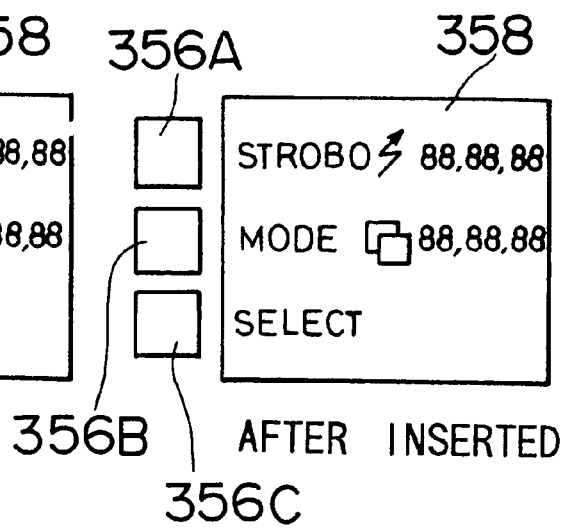
FIG. 15(B) is a view illustrating the second embodiment for the sheet switch.

The switch function may be displayed on a liquid crystal screen instead of displaying the switch function shown in FIG. 14. For example, as shown in FIG. 15, a liquid crystal screen 358 is provided at the right side of sheet switches 356A, 356B, 356C. In a state where the camera card unit is loaded to the card loading portion as shown in FIG. 15(A), the liquid crystal screen 358 displays a switch function which is not used at the time of photographing. In a state where the camera card unit is loaded to the card loading portion, the liquid crystal screen 358 displays a switch function which is used at the time of photographing. In FIGS. 15(A) and 15(B), the switch function is displayed by letters, but the switch function may be displayed by a pictorial symbol (an icon).

The camera card unit 312 is provided with a shutter switch 340 at the front. The camera card unit 312 is also provided with a GND terminal 342, regulated in the PC card standard, at the periphery of the camera card unit 312. The shutter switch 340 is a touch switch such as a capacitance switch. The control circuit 334 detects touching of a finger. Because the shutter switch 340 is a touch switch which has more durability and can be pressed more times than a standard switch, the life of the switch improves.

A shutter release for photographing is executed when the shutter switch and the GND terminal 342 are touched by fingers. The control circuit 334 shown in FIG. 13 detects conditions of the shutter switch 340 and the GND terminal 342. When the control circuit 334 detects that the shutter switch 340 and the GND terminal 342 are "ON" (touched by fingers), it photographs the object by the CCD 322 of the image pick-up unit 310, and records the image data in the memory 332 via the signal processing circuit 324, the connector 316, and the signal compression circuit 330.

As described above, the shutter release is prevented from mistakenly being touched by a finger to the shutter switch 340 because the shutter release is executed when the shutter switch 340 and the GND terminal 342 are touched.

In that case, the shutter switch 340 and the GND terminal 342 are combined so that a half-pressing and a completepressing, like the shutter switch 340 of a camera in general, can function. For example, focusing, photometry, and AWB (Auto White Balance) are executed in the same manner as a half-pressing of a shutter switch by a camera in general when only the shutter switch 340 is pressed. If the GND terminal 342 is pressed in that state, a shutter release is executed.

Since a shutter release by only a touch is difficult for a photographer to notice, a sound or sounds such as an electronic sound may be made to be generated when a shutter release is performed, so that it is noticed when the shutter switch 340 and the GND terminal are "ON". Moreover, a shutter release may be indicated with an emission of a light emitting element, by providing a light emitting element such as an LED adjacent to the optical finder 313.

Further, when a shutter release is performed, the number of remaining frame of a counter, displaying remaining frames is reduced by 1 (if the number of shutter releases, the number is increased by 1), and a number may be made to be flashing during a few seconds after changing the number of the counter of the liquid crystal display 344 immediately after the photographing, or while the photographed image is being recorded.

In the embodiment described above, the image pick-up unit 310 is equipped with circuits such as the signal processing circuit 324, the pulse generator 328. However the camera card unit 312 may be equipped with those circuits, or the image pick-up unit 310 may be equipped with those circuits such as the signal compression circuit 330.

In addition, the action may be continued (if such an action is after photographing, recording of the image data to the memory 332 is continued) even in a case that the camera card unit 312 is pulled out of the image pick-up unit 310 after photographing.

Figure 16:
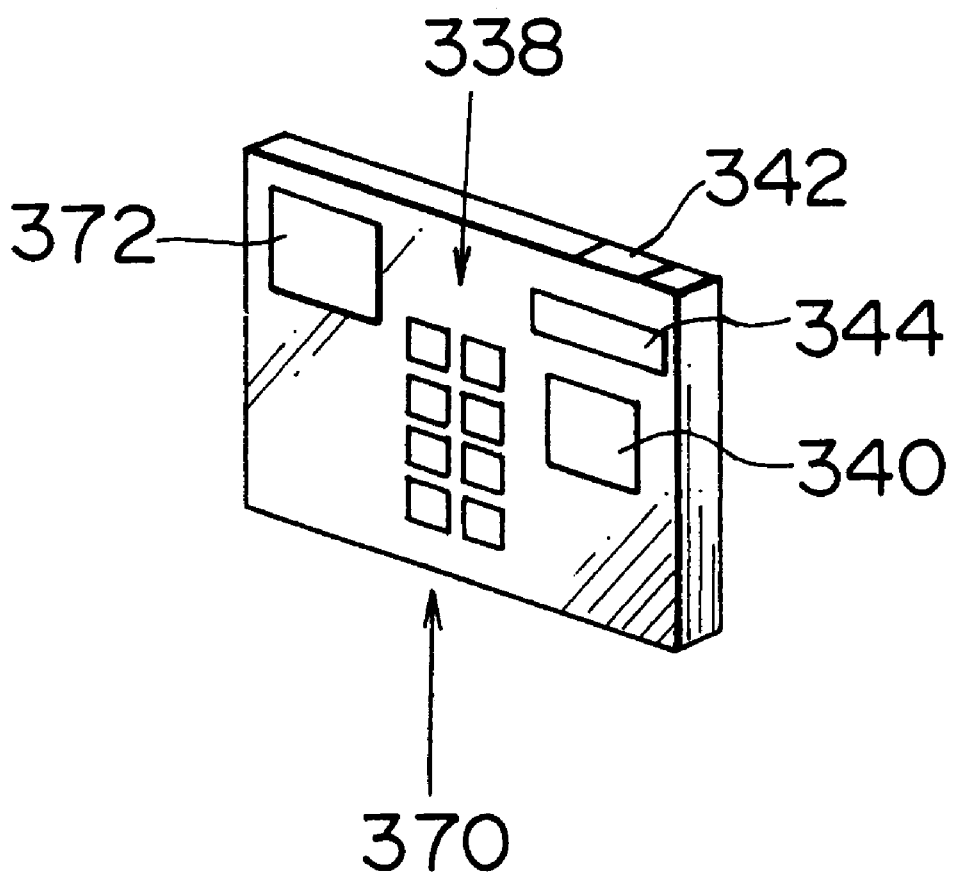
FIG. 16 is a perspective view illustrating the seventh embodiment of the electronic still camera according to the present invention.

FIG. 16 is a perspective view illustrating the seventh embodiment of the electronic still camera according to the present invention.

In the sixth embodiment, photographing is performed by combining the image pick-up unit 310 and the camera card unit 312. However, in the seventh embodiment shown in FIG. 16, photographing can be performed by just a camera card unit 370. In other words, the camera card unit 370 is equipped with a sheet switch 338, a shutter switch 340, a GND terminal 342, a liquid crystal display 344 as shown in FIG. 12, an optical finder 372, a taking lens, a CCD, and circuits of the image pick-up unit.

In the sixth embodiment, the shutter release is performed by the shutter switch 340 and the GND terminal 342. However, another touch switch may be used instead of the GND terminal 342, in the same manner as the shutter switch 340.

The construction to perform the ON/OFF of the switches with the two touch switches can be applied to other uses. For example, the construction can be used as a switch for an IC-type recording apparatus. The two faces of the construction must come into contact at the same time; thus a reliable action can be performed without mistakenly touching the ON/OFF switch. In addition, the IC-typed recording apparatus and the electronic still camera in the above-described card-shape can be contained in the same case.

Figure 17:
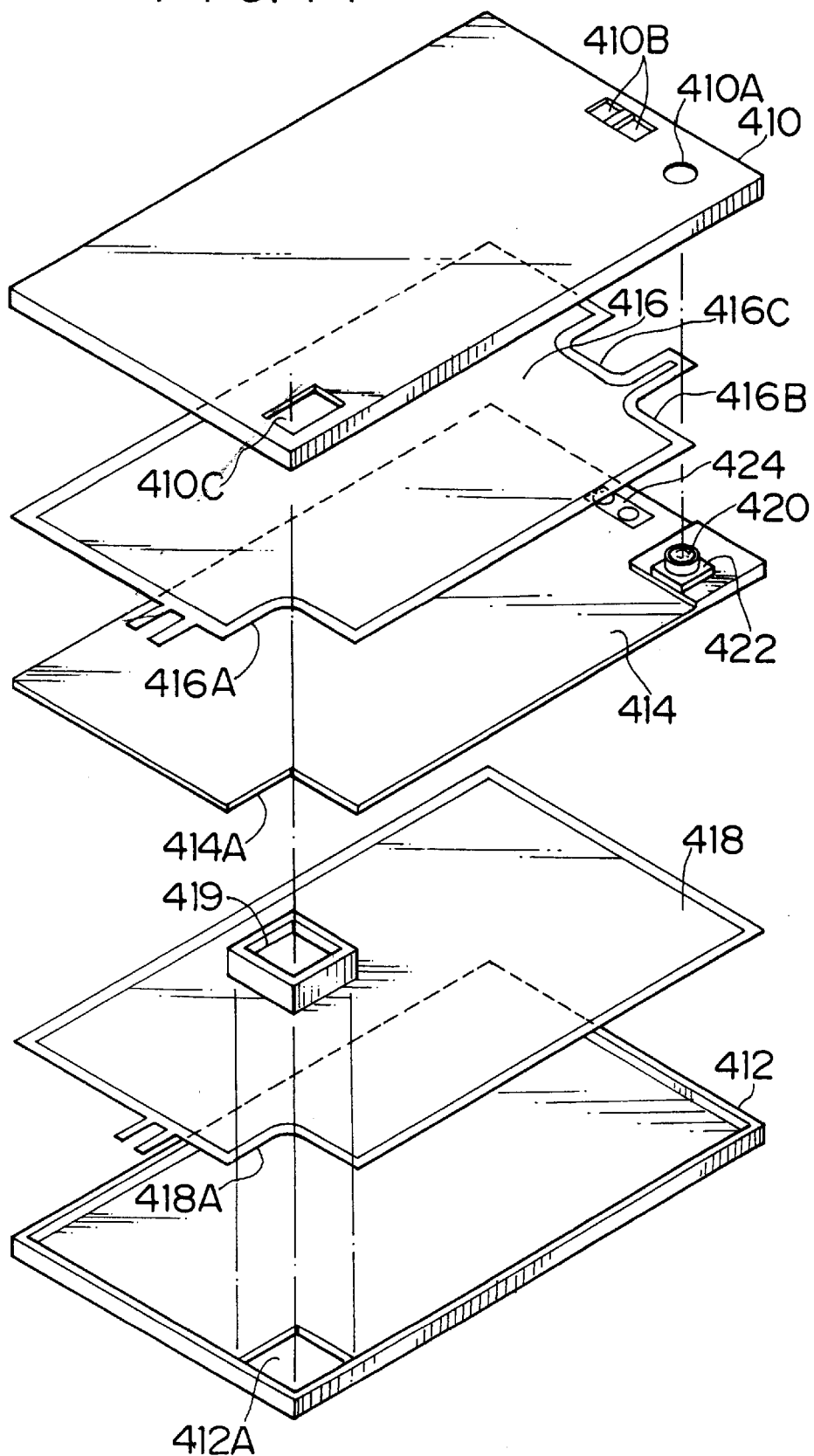
FIG. 17 is a exploded perspective view illustrating the eighth embodiment of the electronic still camera according to the present invention.

FIG. 17 is an exploded perspective view showing the eighth embodiment of the electronic still camera according to the present invention.

As shown in FIG. 17, the electronic still camera consists mainly of a casing 410, 412 which is divided into the front face and the back face, a board 414, and two sheet-like rechargeable batteries 416, 418.

The casing 410, 412, are formed for the form of the camera to be flat and thin like a card. A taking lens 420, apertures 410A, 410B, and 410C, at which an operation button 424 and a finder 419 are positioned, are formed on the front casing 410; an aperture 412A at which the finder 419 is positioned, is formed on the back casing 412.

The board 414 is equipped with a taking lens 420, a CCD 422, a power switch, an operation button 424 such as a shutter release button, and several kinds of circuits. The board 414 is arranged between the two sheets of batteries 416 and 418.

The form of the board 414 and the sheet-like batteries 416, 418, are formed to be substantially the same with the form of the casing 410, 412. The board 414 and the sheet-like batteries 416, 418, are contained in between the front casing 410 and the back casing 412. The board 414 and the sheet batteries 418 have notches 414A, 418A, to avoid to interfere with the finder 419, and the sheet batteries 416 have notches 416B, 416C, to avoid to interfere with the taking lens 410 and the operation button 424.

FIG. 18 is a block diagram showing the inner construction of the electronic still camera according to the present invention shown in FIG. 17. In FIG. 18, when the operation button 424 which includes the shutter release button is operated, the object image, formed on the light receiving face of the CCD 422 via the taking lens 420, is photoelectrically converted, and sequentially read out as a CCD output signal by the driving pulses which are added from the CCD driving circuit 434.

The CCD output signal is added to an analog processing circuit 426 which has a CDS circuit, a gain adjusting circuit, a color balance adjusting circuit, and so on, and analogically processed. Then the CCD output signal is converted to a digital signal by an A/D converter 428, and output to a digital image processing circuit 430. The driving pulses are output from the CCD driving circuit 434 according to the timing signal output from a timing generator 436. At the same time, the analog processing circuit 426, the A/D converter 428, and so on, are synchronized.

The digital image processing circuit 430 includes a brightness signal generating circuit, a color difference signal generating circuit, a gamma correction circuit, a compression circuit, and so on. The image data processed by the circuits 430 are output to a built-in memory (a flash memory which is built in a camera, for example) 432. The image data are recorded in the built-in memory 432 by the control of the memory control circuit 440. The built-in memory 432 has a capacity to record the data of a plural sheets of images (for example, 10~90).

The system control circuit 438 unifies and controls each circuit of the camera. The system control circuit 438 controls photographing by an input signal generated by the operation button 424 which includes the shutter release button, writing image data to the built-in memory 432 via the memory control circuit 440, image transfer via a connector 442, to an external apparatus such as a personal computer and a printer.

The power is supplied from the two sheets of batteries 416, 418, to each of the circuits with which the board 414 is equipped via the power source circuit 444.

FIG. 19 is a perspective view showing another embodiment of the sheet-like battery which is applied to the present invention. As shown in FIG. 19, the sheet-like battery 450 is one sheet of battery which center is folded, and the board 414 (refer to FIG. 17) can be fastened in the sheet-like battery.

In the eighth embodiment, the taking lens 420 is provided for its optical axis to correspond to the direction of depth; however, the present invention is not limited to that. The taking lens may be provided to the side face of the camera body. The taking lens 420 is preferably provided to be the same face as the casing, but also may be provided to project slightly. Moreover, the connector 442 may be provided to the back face or the side face of the electronic still camera; the connector which is the same standard as a card connector of the memory card is preferred to be provided on the side face especially if the thin electronic still camera is formed the same as a memory card such as a PCMCIA.

Figure 20A:
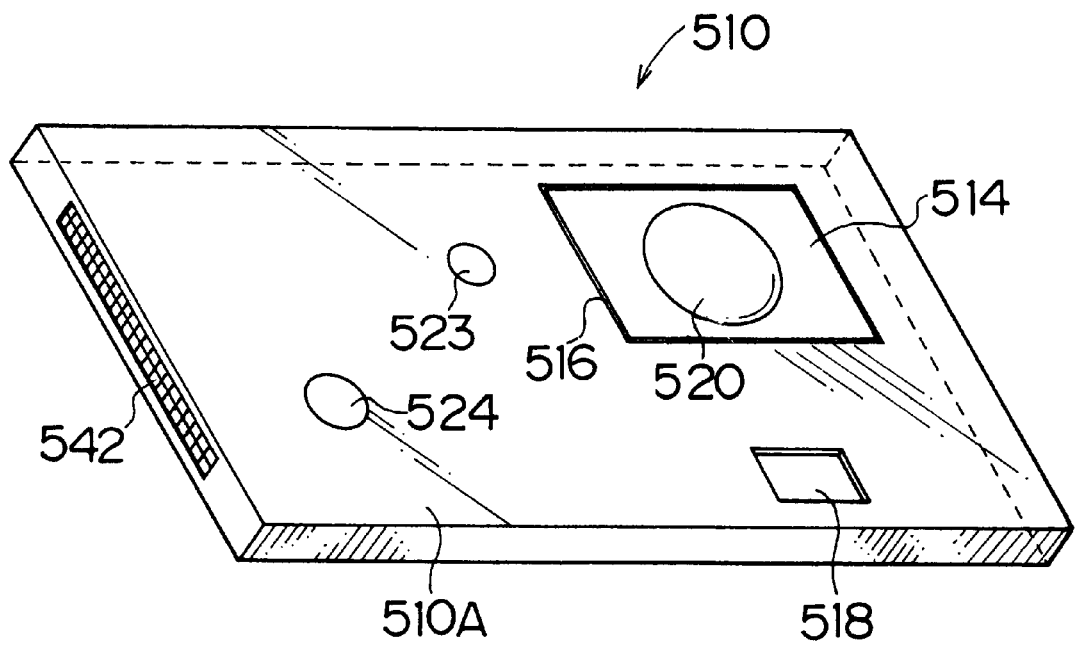
FIG. 20(A) is a view illustrating the ninth embodiment of the electronic still camera according to the present invention.
Figure 20B:
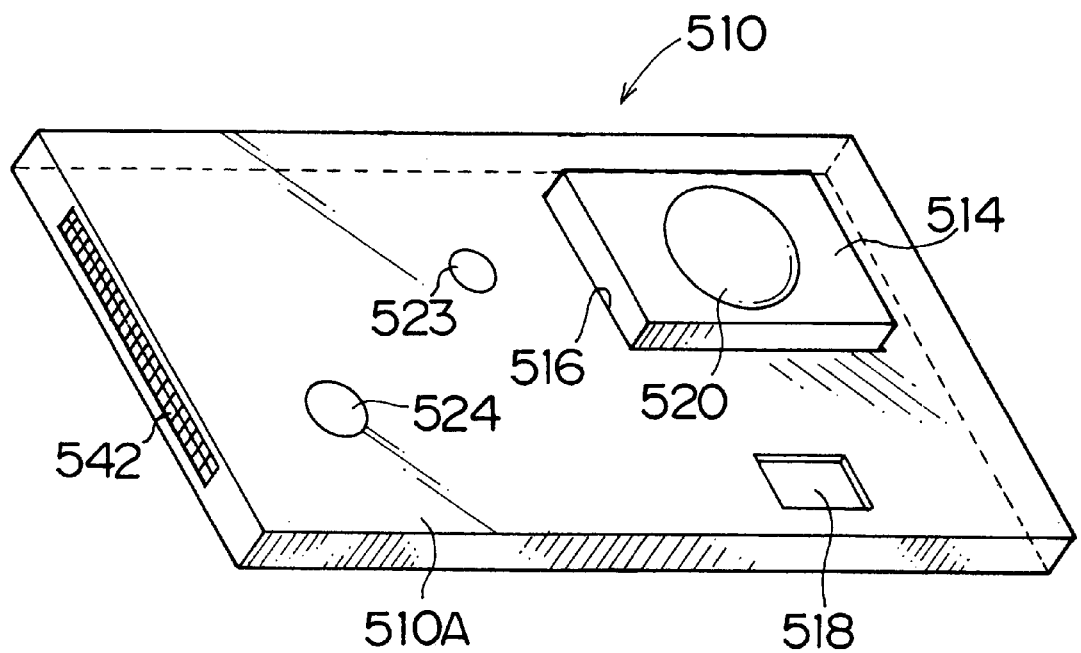
FIG. 20(B) is a view illustrating the ninth embodiment of the electronic still camera according to the present invention.

FIGS. 20(A) and 20(B) are views illustrating the ninth embodiment of the electronic still camera according to the present invention: FIG. 20(A) is a view illustrating the state where the taking lens portion is contained in the camera body; FIG. 20(B) is a view illustrating the state where the taking lens portion is projected at the time of photographing.

As shown in FIGS. 20(A) and 20(B), a camera body 510 of the electronic still camera is formed like a PC card which is known. The thickness of the camera body 510 is correspondingly selected from the Type 1 (3.3 mm), Type 2 (5.0 mm), Type 3 (10.5 mm), or Type 4 (16.0 mm) of the PC card standards.

An aperture 516 is formed at a corner portion of a camera upper board 510A (the face to an object). A lens frame 514 which has a taking lens 520 which is contained in the aperture 516 for the length of the optical axis to be corresponding to the thickness of the camera body 510. The lens frame 514 projects from the aperture 516 by the projecting mechanism which will be described later.

A finder frame 518, an operation button 524 which includes the shutter release button, and a lock release button 523 to project the lens frame 514 which is contained in the camera body 510, are provided to the camera upper board 510A. A connector 542 at the camera side is provided to one side of the camera body 510. The connector 542 at the camera side is connectable to a card slot of an external information processing apparatus such as a personal computer which is provided with a connector at the slot side.

The inner construction of the electronic still camera shown in FIGS. 20(A) and 20(B) is the same as the one shown in FIG. 18; thus a detailed explanation for that is omitted. However types of a battery are not limited to a sheet-like battery shown in FIG. 18.

FIGS. 21(A) and 21(B) are sectional views illustrating the first embodiment of the electronic still camera shown in FIGS. 20(A) and 20(B).

As shown in FIGS. 21(A) and 21(B), an electronic circuit board 544, provided with a CCD 522, a digital image processing circuit, a built-in memory, and so on, is provided. The CCD 522 is arranged at the position corresponding to the aperture 516 which is formed in the camera upper board 510A. A lens frame 514 is provided on an optical path between the aperture 516 and the CCD 522 in a state where the lens frame 514 is adjacent to the CCD 522. The lens frame 514 projects from the aperture 516 by the projecting mechanism when the lock release button 523 is pressed at the time of photographing.

The projecting mechanism is comprised of a guide unit 546 which movably supports the lens frame 514 along the optical path, and a lock means 548 which locks the lens frame 514 to prevent it from projecting.

Regarding the guide unit 546, a guide frame 550 is attached around the bottom of the lens frame 514, and the guide frame 550 is supported to be freely slidable by a plurality of columns 552 which are provided in the same direction as the optical path. Moreover, coil springs 554 are placed between the guide frame 550 and the electronic circuit board 544. Therefore the guide frame 550 receives a force by the springs 554 in the direction of the aperture, and the lens frame 514 is affected to project out of the camera body 510 from the aperture 516.

Regarding a lock means 548 on the other hand, a vertical motion arm 556 is fixed to a lock release button 523, and the engaging plate 558 is arranged in the direction to cross the vertical motion arm 556. The center of the engaging plate 558 is supported by a rotating axis 560 to be freely rotatable. The base end of the engaging plate 558 is connected to the bottom end of the vertical motion arm 556 to be freely rotatable via a pin 562. The tip of the engaging plate 558 engages with a staired portion (an engaging portion) 550A which is formed in a guide frame 550 in the direction to press the staired portion (an engaging portion) 550A from the top to the bottom. Moreover, a flat spiral spring (not shown), applying a force against the engaging plate 558 when the engaging plate 558 is rotated counter-clockwise in FIG. 21, is provided to the rotation axis 560. Thus, in a state where the engaging plate 558 is engaged with the stained portion 550A of the guide frame 550, the force of the flat spiral spring of the lock means takes over the force of the spring 554 of the guide unit 546, and locks the guide frame 550; so that the guide frame 550 is prevented from sliding. Thereby the lens frame 514 is maintained in a state that it is contained in the camera body 510. Moreover, the lens frame 514 projects from the aperture 516 by the force from the spring 554 when the engaging plate 558 is separated from the guide frame 550. The projecting amount (L) is a distance which can secure an appropriate length of the optical path between the taking lens 520 and the CCD 522 for photographing. As shown in FIGS. 21(A) and 21(B), the projecting amount (L) is the distance between the upper face of the guide frame 550 and the bottom face of the camera upper board 510A; the distance can be adjusted according to an attaching position of the guide frame 550 which is attached to the lens frame 514.

A taper 558A is formed on the upper face of the tip of the engaging plate 558. The engaging plate 558 and the staired portion 558A of the guide frame 550 is smoothly engaged by the taper 558A, when the guide frame 550 is slid from the top to the bottom of the engaging plate 558 to house the projected lens frame 514 in the camera body 510. Further, A stopper member 564 is provided to the upper part of the engaging plate 558. The stopper member 564 is provided to stop the engaging plate 558 at a constant rotating position when the engaging plate 558 rotates counter clockwise. Thereby the stroke of the lock release button 523 to activate the lock means is determined.

Next, the explanation will be given about an operation of the electronic still camera constructed as described above according to the present invention.

To carry or to use the electronic still camera by inserting a card slot of an external information processing apparatus such as a laptop computer, the guide frame 550 is locked by the lock means 548, and the lens frame 514 is contained in the camera main body 510. However, at the state where the lens frame 514 is contained, photographing is not possible because the CCD 522 and the taking lens 520 are too close to each other.

Therefore, a photographer presses the lock release button 523 to photograph. Thereby the engaging plate 558 rotates counterclockwise in FIG. 21(A), the engagement of the engaging plate 558 and the guide frame 550 is released. Then, the guide frame 550 slide a column 552 as shown in FIG. 21(B) by the force of the spring 554, and contacts the bottom face of the camera upper board 510A. Consequently, the lens frame 514 projects out of the camera body 510 from the aperture 516. Since the length of the optical path which enables photographing is secured, photographing is performed.

To contain the projected lens frame 514 in the camera body 510, the photographer pushes in the lens frame 514 into the camera body 510. Thus the guide frame 550 take over the force of the spring 554, slides downward as shown in FIG. 21(A), and then contacts the taper 558A portion of the tip of the engaging plate 558. If the guide frame further moves downward, the top and the bottom positions of the engaging plate 558 and the frame 550 are switched by the rotation of the engaging plate 558 slightly rotating clockwise in FIG. 21. Then the engaging plate 558 engages with the staired face 550A of the guide frame 550. Thereby, the lens frame 514 is maintained to be housed in the camera body 510 because the guide frame 550 is locked by the force of the flat spiral spring of the engaging plate 558.

As described above, the electronic still camera according to the present invention is constructed for the lens frame 514 to project; thus, an optical system, functioning as the camera at the time of photographing, can be formed, despite that the optical system can be fit to a size of a PC card when housing the lens frame 514. Moreover, a long optical path between the lens frame 514 and the CCD 522 can be taken by the above-described construction; so the size of the taking lens 520 can be larger and the CCD 522 with many pixels can be applied. Therefore, the quality of a photographed image can be improved compared with a conventional electronic still camera.

FIGS. 22(A) and 22(B) are sectional views illustrating the second embodiment of the electronic still camera shown in FIGS. 20(A) and 20(B). Parts and apparatus same as the first embodiment shown in FIGS. 21(A) and 21(B) have the same reference numerals and alphabets, and an explanation for them is omitted.

As shown in FIGS. 22(A) and 22(B), a first lens portion (lens frame) 568 in which a lens 566 is contained, is housed on an optical path of the camera body 510 when the taking lens, consists of a lens unit, is comprised of two lenses. The first lens portion 568 is constructed to project from the aperture 516 which is formed on the camera upper plate 510A, by the projecting mechanism.

As shown in FIGS. 22(A), 22(B), and 23, a second lens portion 572, holding a lens (or an optical LPF) at the object image side, is housed at a position other than an optical path in the camera body 510. The second lens portion 572 is fixed to the tip of a swinging arm 574; and at the same time, the base end portion of the swinging arm 574 is fixed to a column 576 for swinging which is provided in the camera body 510. The both ends of the column 576 for swinging are supported to be freely rotatable with respect to the camera body 510.

A first gear 578 engages with the bottom end of the column 576 for swinging. A second gear 580 is provided at the bottom end of the column 552A among the columns 552 of the guide unit 546. The gears 578, 580, are engaged with each other. The both ends of the column 550A are supported to be freely rotatable with respect to the camera body 510; and at the same time, a male screw is formed to the column 550A, and a female screw is formed at the guide frame 550 side which engages with the column 552A. The reference numeral 582 is a spring supporting plate.

By constructing the second embodiment to be the same as described above, when a photographer presses the lock release button 523, the lock of the projecting mechanism is released, and the guide frame 550 moves upward by the force of the spring 554 as shown in FIG. 22(B). At that time, the the projecting mechanism is released, and the guide frame 550 moves upward by the force of the spring 554 as shown in FIG. 22(B). At that time, the column 552A and the guide frame 550 are screwed, so that the column 552A rotates, and the second lens portion 572 swings via the second gear 580, the first gear 578, and the column 576 for swinging in a direction indicated by an arrow in FIG. 23.

The length of the swinging arm 574 is formed for the second lens portion 572 to run on the optical path when the second swinging arm 574 swings. The second lens portion 572 has a protruding portion 572A which protrudes in a direction of swinging. When the second lens portion 572 swings, the protruding portion 572A contacts the stopper member 584 which is arranged adjacent to the optical path. Thereby the second lens portion 572 which is swung, is positioned accurately on the light path, and a photographing system is formed.

In order to house the first lens portion which projected from the aperture 516 in the camera body after photographing, and swing the second lens portion 572 to its original position, the photographer can push in the first lens portion 568 in the direction to house it in the camera body 510. By such a reverse action, the second lens portion 572 at first swings and retracts from the optical path, and then the first lens portion 568 is housed.

In the second embodiment, the columns 552 of a guide unit 546 are constructed to be three columns as shown in FIG. 23. The columns 552 must be arranged to avoid interrupting the swinging trajectory of the swinging arm.

Therefore, the second embodiment can obtain the same result as the first embodiment. Moreover, in the second embodiment, since the photographing system is formed in a space of the optical path by moving the second lens portion 572 after the first lens portion 568 projected from the first embodiment, the camera is suitable for an optical system for a thin PC card of the types such as Type1 (3.3 mm) and Type2 (5.0 mm).

FIG. 24 is a view illustrating the tenth embodiment of the electronic still camera according to the present invention; and FIG. 25 is a sectional view illustrating the inner construction of the electronic still camera shown in FIG. 24.

As shown in FIGS. 24 and 25, an entire formation of a case (a body) 602 of the electronic still camera is like a PC card which is well-known. The thickness of the case of the electronic still camera 602 is correspondingly selected from Type1 (3.3 mm), Type2 (5.0 mm), Type3 (10.5 mm), Type4 (16.0 mm), and so on, which are the standards for a PC card.

A rectangle aperture 604 is formed at a front 602A of the case 602. An end portion 608A of a front plate 608 is attached to the aperture 604 via an pivot 606. The front plate 608 is a gently-sloped face from the end portion 608A which is provided with the pivot 606 as shown in FIGS. 24 and 25 towards a top portion 608B which is provided with a taking lens 620. The tip of the front plate 608 is folded and a stopper 608C is formed. At the time of photographing, the stopper 608C contacts a periphery of the aperture 604 of the case 602, and controls an amount of opening of the front plate 608 by taking over the force of the spring 610. Moreover, side plates 608D, 608D, 608D, are provided in the three directions of the front plate 608 so as to shield inside of the case 602 from the light. A light-shielding member (not shown) may be provided between the side plate 608D and the aperture 604.

A print board 612 is provided to the bottom of the case 602. A CCD 622, a digital image processing circuit, built-in memory, a connector 642, and so on, which will be described later, are arranged on the print board 612. An aperture 612A in which the stopper 608C is contained when the front plate 608 is closed, is formed on the print board 612.

As shown in FIG. 25, the taking lens 620 forms an image on an image pick-up face on the CCD 622 at a position where the stopper 608C of the front plate 608 is engaged with a periphery of the aperture 604.

In FIG. 24, the reference numerals 624 and 626 are an operation button which includes a shutter release button, and a finder, respectively. The inner construction of the electronic still camera shown in FIG. 24 is the same as the one in FIG. 18; so a detailed explanation for it is omitted.

Next, an explanation will be given about an operation of the electronic still camera.

FIGS. 24 and 25 are views illustrating the state before the electronic still camera is inserted into a card slot of an external information processing apparatus such as a personal computer. In that state, the front plate 608 projects by the effect of a spring 610, and the stopper 608C contacts a periphery of the aperture 604 of the case 602. The taking lens 620 is secured a distance to form an image on the image forming face on the CCD 622 at the position where the front plate projects; thus, photographing can be performed. In that state, the electronic still camera has a good balance in order to be a good camera body, and is suitable to operate.

On the other hand, as shown in FIG. 26, when the electronic still camera according to the present invention is inserted into a card slot 652 of an external information processing apparatus such as a personal computer, the front plate 608 contacts a periphery 652A of the aperture of the card slot 652, is folded against the force of the spring 610, and contained in the case 602. Thus according to the electronic still camera of the present invention, the front plate 608 can be folded only by being inserted into the card slot 652, and the connector 642 is connected to a connector 654 of the card slot 652. The electronic still camera of the present invention can be completely contained into the card slot 652 in that state, so the electronic still camera is handy to be carried with the external information processing apparatus.

Figure 27:
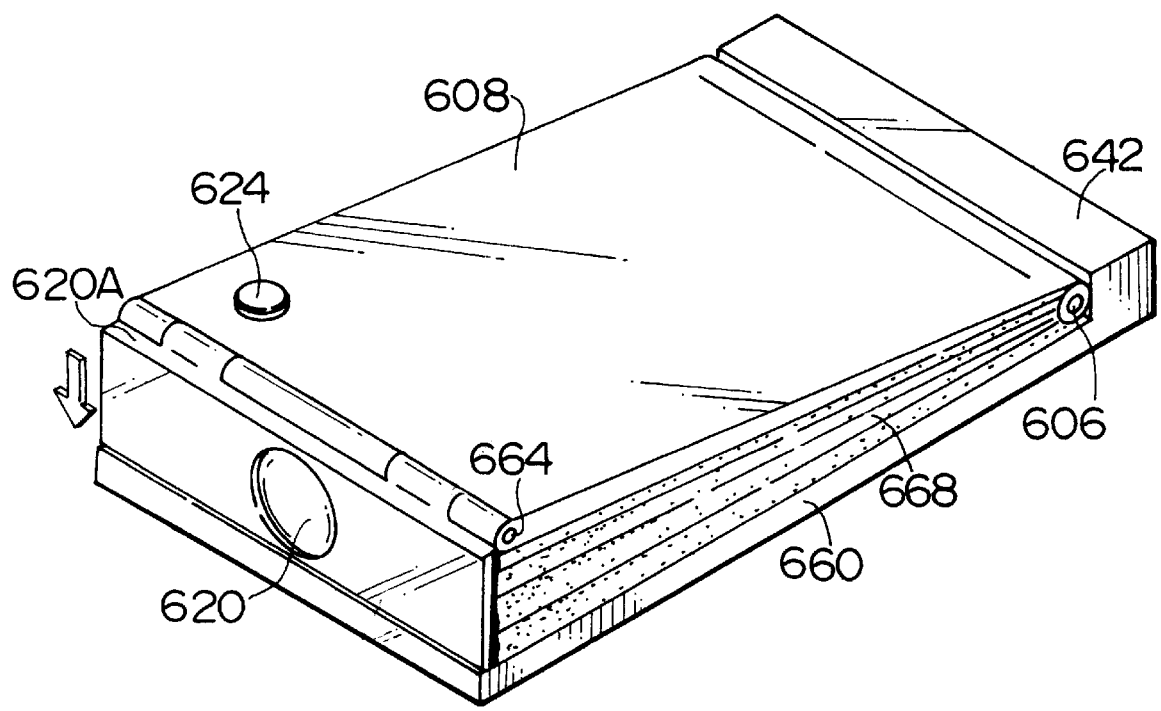
FIG. 27 is a perspective view illustrating the eleventh embodiment of the electronic still camera according to the present invention.
Figure 28:
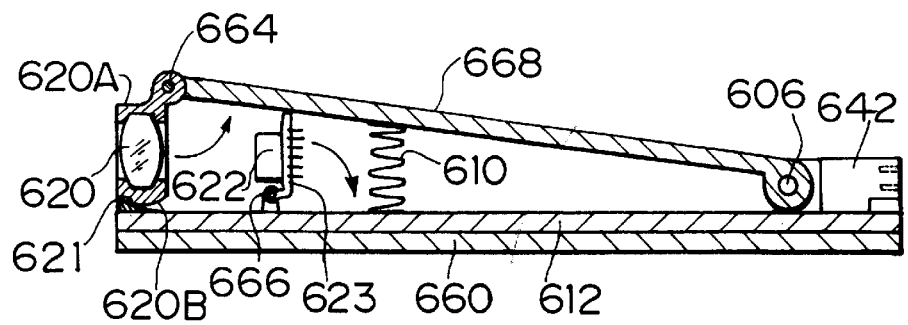
FIG. 28 is a sectional view illustrating the inner construction of the electronic still camera shown in FIG. 27.

FIG. 27 is a perspective view illustrating the eleventh embodiment of the electronic still camera according to the present invention; FIG. 28 is a sectional view illustrating the inner construction of the electronic still camera shown in FIG. 27. The similar parts of FIGS. 24 and 25 have the same reference numerals, and a detailed explanation for them is omitted.

As shown in FIGS. 27 and 28, the printing plate 612 is integrally constructed to a base plate (a body) 660. The front plate 608 is supported on the base plate 660 to be freely rotatable via the pivot 606. A lens supporting frame 620A of the taking lens 620 is provided to the tip of the front plate 608 via a pivot 664. The pivot 664 is provided with a screw (not shown). When the front plate 608 is opening, the taking lens 620 is positioned to be provided facing the front by the force of the spring as shown in FIG. 28. In contrast, an arched portion 620B is formed at the bottom of the lens supporting frame 620A; on the other hand, the taper portion 621 is formed at a tip of the base plate 612 which contacts with the arched portion 620B. When the front plate 608 is pushed-in against the force of the spring 610, the lens 620 is rotated counterclockwise and folded as the pivot 664 to be the center, by the effect of the arched portion 620B and the taper portion 621.

On the other hand, the supporting plate 623 to which the CCD 622 is attached, is attached to the printing plate 612 to be freely rotatable via a pivot 666. The pivot 666 is provided with a spring (not shown) in the same manner as the pivot 664. When the front plate 608 is opening, the CCD 622 is positioned to be provided facing the front by the force of the spring as shown in FIG. 28. The rotation center of the supporting plate 623 is shifted to the lens 620 side. When the front plate 608 is pushed-in against the force of the spring 610, the CCD 622 is rotated clockwise and folded by the pivot 666.

In addition, the side between the front plate 608 and the body 660 is shielded by the light-shielding member 668 such as rubber and bellows as shown in FIG. 27.

Next, an operation of the electronic still camera will be described.

FIGS. 27 and 28 are views illustrating a state before the electronic still camera is inserted into a card slot of an external information processing apparatus such as a personal computer. The taking lens 620 is secured the distance to form an image on the image forming face of the CCD 622; thus photographing can be performed. The electronic still camera in that state has a good balance as a camera body, and is suitable to operate.

Figure 29:
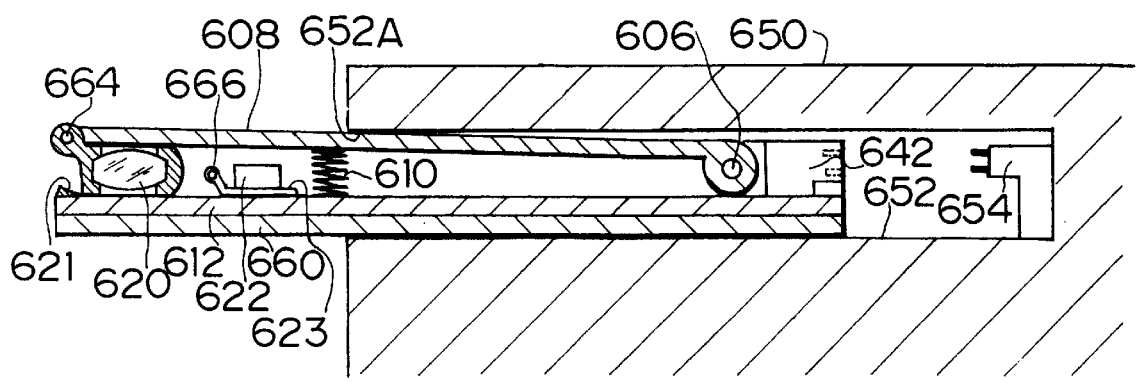
FIG. 29 is a view illustrating the insertion state of the electronic still camera shown in FIG. 28 in the card slot.

On the other hand, as shown in FIG. 29, when the electronic still camera of the present invention is inserted into a card slot 652 of the external information processing apparatus 650, the front plate 608 contacts the periphery 652A of the aperture of the card slot 652, and is folded against the force of the screw 610.

Figure 30:
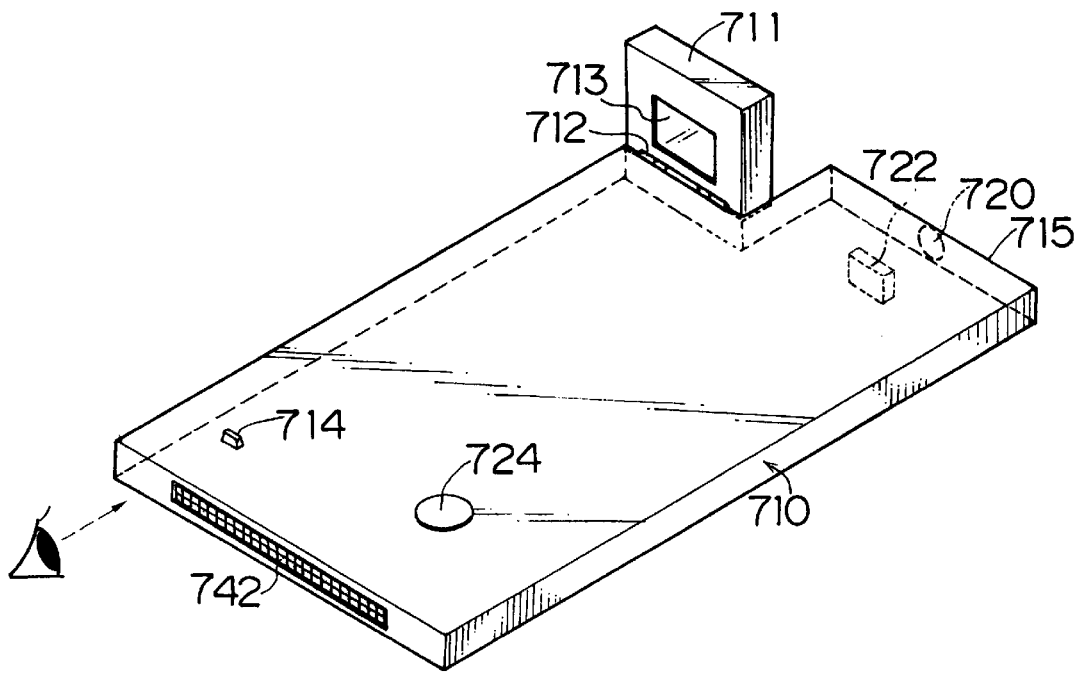
FIG. 30 is a view illustrating the twelfth embodiment of the electronic still camera according to the present invention.

FIG. 30 is a view illustrating the twelfth embodiment of the electronic still camera according to the present invention.

As shown in FIG. 30, the entire form of a camera body 710 of the electronic still camera is like a PC card, and its thickness is correspondingly selected from, for example, standards of the PC card that are Type1 (3.3 mm), Type2 (5.0 mm), Type3 (10.5 mm), and Type4 (16.0 mm).

A finder frame 711 is formed at one corner portion of the camera body 710. The finder frame 711 is constructed to be foldable via a hinge 712. When the finder frame 711 is bent as shown in FIG. 30, the finder frame 711 stands from the camera body 710 and an aperture 713 can be used as a finder. In that case, an optical axis and a taking axis can be parallel by adjusting the protruding portion 714 to position at the center of the aperture 713.

A side peripheral portion 715 of the camera body 710 is provided with a taking lens 720 which forms an image on a CCD 722 which will be described later. An operation button 724, including a shutter release button, is provided to an upper face of the camera body 710. The inner construction of the electronic still camera shown in FIG. 30 is the same as the one shown in FIG. 18; so a detailed explanation for it is omitted.

Next, an operation of the electronic still camera will be described.

FIG. 30 is a view illustrating a state where the finder frame 711 is bent via the hinge portion 712. In that state, the finder frame stands from the body, and photographing can be performed. The electronic still camera in that state has a good balance as a camera body, and is suitable to operate.

On the other hand, according to the electronic still camera of the present invention, the finder part 711 is folded to be a part of a card, and a connector 742 is connected to a connector 754 of the card slot 752 when the electronic still camera is inserted to the card slot 752 such as a personal computer. The electronic still camera of the present invention in that state is card-shaped; so it is handy to carry with the external information processing apparatus. The electronic still camera in card-shape is also handy to carry alone.

Figure 31:
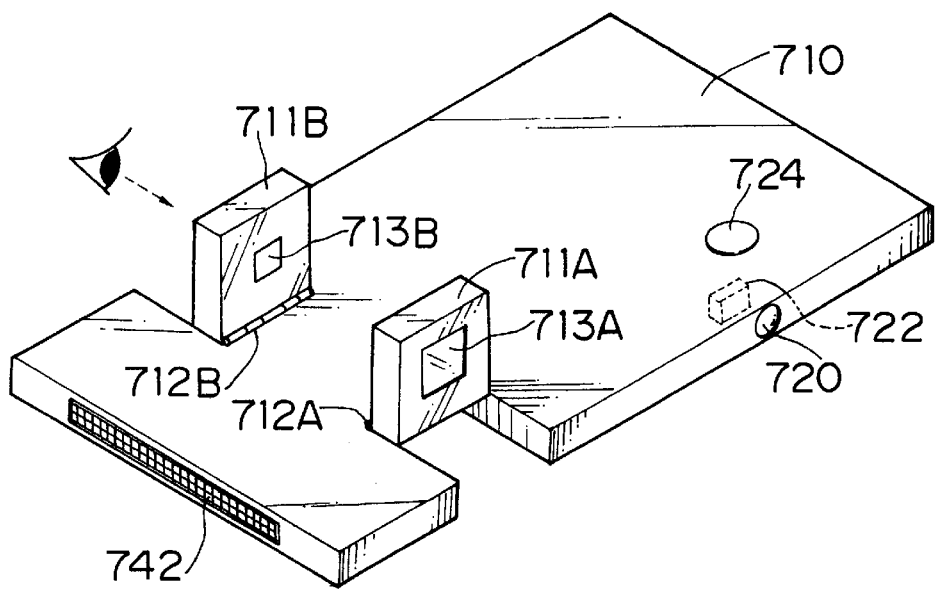
FIG. 31 is a view illustrating the thirteenth embodiment of the electronic still camera according to the present invention.

FIG. 31 is a view illustrating the thirteenth embodiment of the electronic still camera according to the present invention. The similar parts as that shown in FIG. 30 have the same reference numerals; so a detailed explanation for them is omitted.

According to the thirteenth embodiment shown in FIG. 31, a finder portion is comprised of the two frames that are finder frames 711A and 711B. The finder frames 711A, 711B, are foldable via hinge portions 712A, 712B. When the finder frames 711A, 711B, are folded, the finder frames 711A, 711B, stand from the camera body 710, and can be used as a finder at the time of photographing by looking in apertures 713B, 713A, as shown in FIG. 31. When the camera body 710 is card-shaped by folding the finder frames 711A, 711B, the camera body 710 is handy to carry like the twelfth embodiment shown in FIG. 30.

FIG. 32 is a view illustrating the fourteenth embodiment of the electronic still camera according to the present invention. The similar parts as the one in FIG. 30 have the same reference numerals; so a detailed explanation for them is omitted.

In the fourteenth embodiment shown in FIG. 32, a front plate 716, provided with the taking lens 720, is foldable via a hinge portion 717. The front plate 716 stands from the camera body 710 to photograph by being bent as shown in FIG. 32. When the front plate 716 is folded, the camera body 710 can be card-shaped, and can be easily carried. The reference numeral 718 is a finder aperture.

FIG. 33 is a view illustrating the fifteenth embodiment of the electronic still camera according to the present invention. The similar parts as that in FIGS. 30 and 31 have the same reference numerals; and a detailed explanation for them is omitted.

In the fifteenth embodiment shown in FIG. 33, a micro image memory (SSFDC) 750 is used instead of a built-in memory 732. The finder frames 711A, 711B, are freely foldable via the hinges 712A, 712B. The finder frames 711A, 711B, are contained in a recessed portion 752 in a state of being folded. The recessed portion 752 can contain the micro image memory 750 which is 0.78 mm thick, and an armature 752A is provided.

Thus, when the micro image memory 750 is contained in the recessed portion 752, an armature 750A of the image memory 750 and an armature 752A of the recessed portion 752 are conducted, so that image data can be recorded in the image memory 750.

As described above, the micro image memory 750 is contained in the recessed portion 752 at the time of photographing, and photographing can be performed by folding and standing out the finder frames 711A, 711B, from the camera body 710. Then the image data are recorded in the image memory 750. To carry the electronic still camera, the finder frames 711A, 711B, are folded from the contained image memory 750 and contain in the recessed portion 752, so that the camera can be card-shaped.

FIGS. 34(A), 34(B), and 34(C) are views describing the sixteenth embodiment of the electronic still camera according to the present invention.

As shown in FIG. 34(A), a camera body 810 of the electronic still camera is like a PC card which is known. The thickness is correspondingly selected from the PC card standards Type1 (3.3 mm), Type2 (5.0 mm), Type3 (10.5 mm), and Type4 (16.0 mm).

The camera body 810 consists of a first plate portion 816 and a second plate portion 818 which are connected with a hinge 814, and the first and the second plate portions 816 and 818 are formed to be foldable as shown in FIGS. 34(B) and 34(C). A hinge member is not restricted to the hinge 814. As shown in FIG. 35, a high-elastic film 817 can be used.

A first aperture 823 and a second aperture 825 are formed in the first and the second plate portion 816, 818, respectively. At the same time, a shutter 819 is provided to each of the apertures 823, 825. A taking lens 820 is provided in the first plate portion 816 at a position to overlook the first aperture 823 and a window 821. A CCD is provided in the second plate portion 818 at a position to overlook the second aperture 825. In short, the taking lens 820 and CCD and their optical axes are arranged to correspond to the direction of thickness of the camera body 810.

A permanent magnet 827 is built in the first and the second plate portions 816, 818. When the camera body 810 is folded, the permanent magnets 827 of the first and the second plate portions 816, 818, hold each other as shown in FIG. 34(C). Thereby the first aperture 823 and the second aperture 825 can be held to be accurately matched with each other. Moreover, the shutter 819 opens and closes by interlocking with a folding motion to fold the camera body 810 and a developing motion to develop the camera body 810 to be the original PC card-shape.

An upper face 810A of the camera body 810 is provided with an operation button 824 which includes a shutter release button. At the same time, one side of a side peripheral portion of the camera body 810 is provided with a connector 42 at the camera side which is connectable to a card slot of an external information processing apparatus such as a personal computer which has a connector at the slot side. As shown in FIG. 34(C), a finder frame 829 is provided to the first plate portion 816 which has the ability to be pulled. The finder frame 829 is pulled by a photographer from a slot (not shown) of the first plate portion 816 and used at the time of photographing, and is contained when not in use. The inner construction of the electronic still camera shown in FIG. 34(A) is the same as the one in FIG. 18; so a detailed explanation for it is omitted.

Figure 36A:
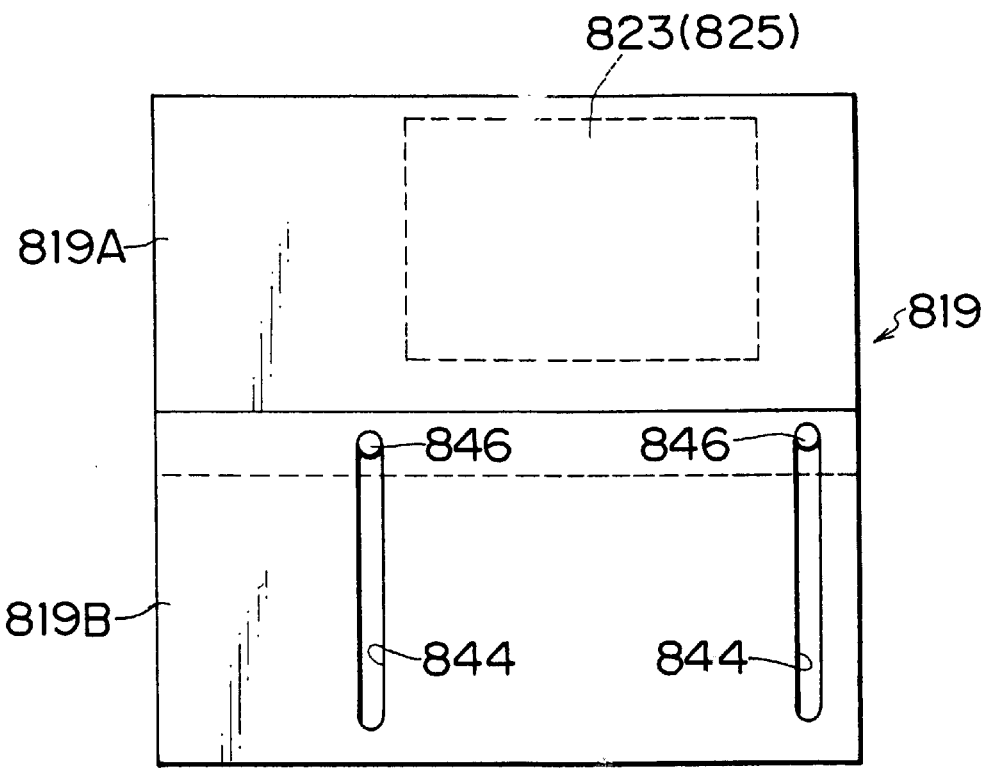
FIG. 36(A) is a view describing the shutter mechanism shown in FIG. 34(A)
Figure 36B:
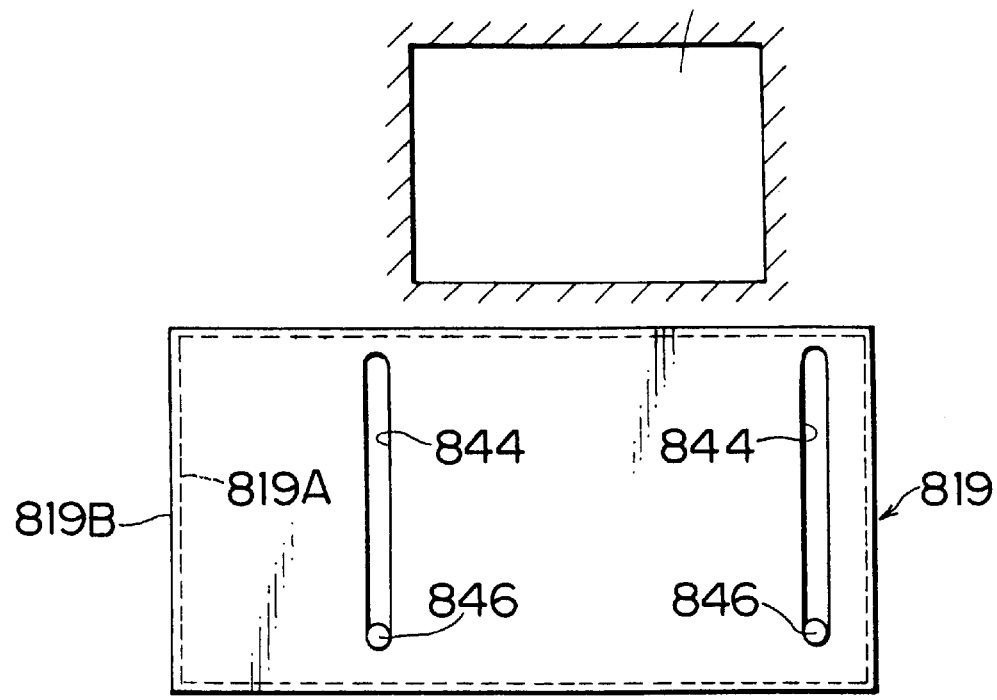
FIG. 36(B) is a view describing the shutter mechanism shown in FIG. 34(A)

FIG. 36(A) is a view illustrating that the shutter 819 is closed; and FIG. 36(B) is a view illustrating that the shutter 819 is opened. A shutter plate 819A, comprising the shutter 819, is arranged to be freely slidable with respect to a fixing member 819B which is fixed to the camera body 810.

As shown in FIG. 36(A), a pair of slide grooves 844, 844, are formed in the fixing member 819B. A pair of pins 46, 46, are engaged with the slide grooves of the fixing member 819B from the bottom. Thereby when the shutter 819 opens, the shutter plate 819A slides along the bottom face of the fixing member 819B.

Figure 37:
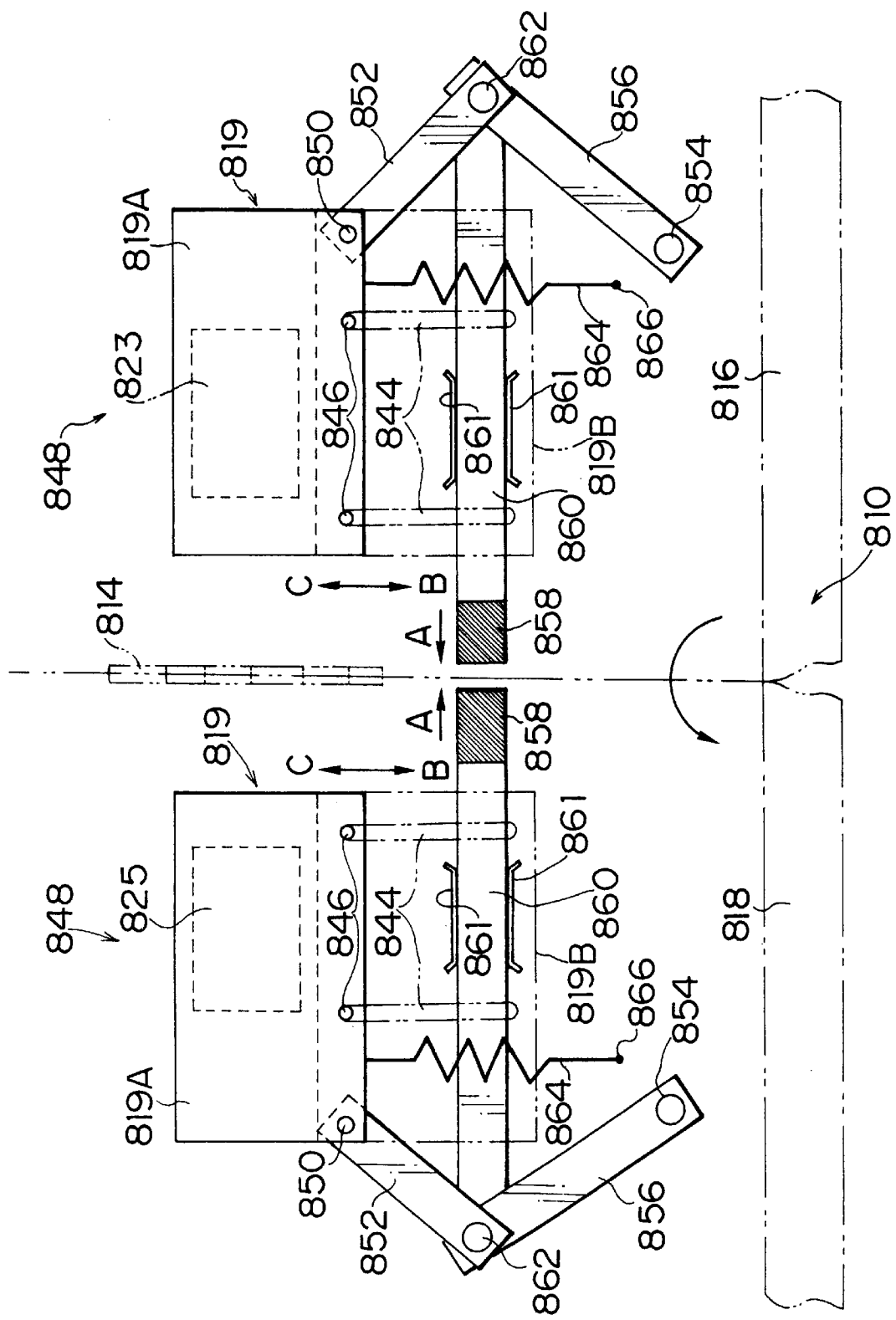
FIG. 37 is a view describing an opening and closing mechanism of the shutter.

FIG. 37 is a view illustrating an opening and closing apparatus 848 of the first and the second plate portions 816, 818; in FIG. 37, the fixing member 819B is shown by long and two short alternate lines so as to easily find the opening and closing mechanism.

The opening and closing apparatus 848 is provided to both of the first and the second plate portions 816, 818, to be symmetric with respect to the hinge 814 which connects the first and the second plate portions 816, 818. The opening closing apparatus 848 is constructed as described below.

One end of a first arm 852 is pivotally supported via a pin 850 to one corner portion of the shutter plate 819A. One end of a second arm 856 and one end of a third arm 860 are pivotally supported to the other end of the first arm 852 via a pin 862. The other end of the arm 856 is supported to be freely rotatable via a fixing pin 854, and a magnet 858 is provided to the other end of the third arm 860. The third arm 860 is guided left and right in FIG. 37 by a pair of guide portions 861, 861. Thereby a link mechanism in which the fixing pin 854 is the fixing end is formed. The link mechanism is provided to the first and the second plate portions 816, 818, via the hinge 814 so that a pair of opening and closing apparatus are formed. Moreover, the magnets 858, provided to the tip of the third arm 860 in the pair of the opening and closing apparatus 848, 848, are arranged to be adjacent to each other as shown in FIG. 37, and the polarities of the magnets are an N Pole at one side and an S Pole on the other side. Thereby the third arm 860 of the pair of opening and closing apparatus 848 are held (in the direction of arrows) by each other. One end of the spring 864 is connected to the shutter plate 819A, and at the same time the other end is supported by the pin 866 which is fixed to the camera main body 810. The shutter plate 819A is forced in a downward direction in FIG. 47, that is, a direction (direction B indicated by an arrow) to open the shutter plate 819A. Therefore, If the force of the spring 864 is weaker than the force to hold the magnets 858, the opening and closing apparatus 848 closes the shutter 819 by a link mechanism as shown in FIGS. 36(A) and 37. In contrast, if the force of the spring 864 is stronger than the force to hold the magnets 858, the shutter plate 819A is pulled by the spring 864 and opens the shutter 819. Then, the opening and closing apparatus 848 is set for the force of the magnets 858 to be stronger than the force of the spring 864 in a state where the camera body 810 is developed, that is, when the magnets 858 are adjacent to be facing each other. Thereby, the shutter plate 819A is held to be closed since the shutter plate 819A receives the force in the direction C in FIG. 37 by the link mechanism of the opening and closing apparatus 848.

Next, an explanation will be given about an operation of the electronic still camera according to the present invention as constructed above.

To carry, or to use the electronic still camera by inserting it into a card slot of an external information processing apparatus such as a personal computer, the camera 810 which is flat so as to be the same as the original shape of a PC card without being folded. Photographing can not be performed in the flat state because an optical path is not formed between a CCD and the taking lens 820.

To photograph, a photographer fits the first plate portion 816 in which the taking lens 820 is provided by folding the camera body 810, in the second plate portion 818, as shown in FIG. 34(C). The contacting faces between the first and the second plate portions 816 and 818 are away from each other and do not face each other by the folding as shown in FIG. 34(B), so that the force to hold the magnets 858 which are attached to the tip of the third arm 860 of the opening and closing apparatus 848 becomes weak. The force of the spring 864 thus becomes stronger than the force to hold the magnets 858, and the shutter plate 819A moves to the direction B in FIG. 37 and opens the shutter 819. At that time, a slide pin 846 is guided by the slide groove 844 of the fixing member 819B and slides smoothly. Thereby, the apertures 823, 825, are opened, and an optical path for photographing is formed. The taking lens 820 and the CCD is laid on one straight line, and then photographing can be performed. At that time the first and the second plate portions 816, 818, are held by the permanent magnet 827; thus the position of the optical path can be held without being shifted.

To close the shutter 819 after photographing, the photographer can extend the camera body 810 to be the original shape of the PC card. Thus the magnets 858 of the opening and closing apparatus 848 are attracted to each other against the force of the spring 864 and moves to the direction A in FIG. 37, so that the shutter plate 819A slides to the direction C in FIG. 37 by the link mechanism of the opening and closing apparatus. Therefore, the shutter 819 is closed.

As described above, according to the electronic still camera of the present invention, the camera body 810 can form an optical system which functions as a camera despite that the camera body 810 is in a shape to fit the original PC card size.

Moreover, the electronic still camera is constructed so that the first plate portion 816 in which the taking lens 820 is provided, to fit the second plate portion 818 by folding them. Thus the taking lens can be larger and a CCD with many pixels can be supplied because a long optical path can be obtained. Therefore, the quality of a photographed image is improved compared with a conventional electronic still camera.

Further, the shutter 819 is provided to the apertures 823, 825, so that a dust can be prevented from entering the optical system, and CCD can be protected.

Figure 38:
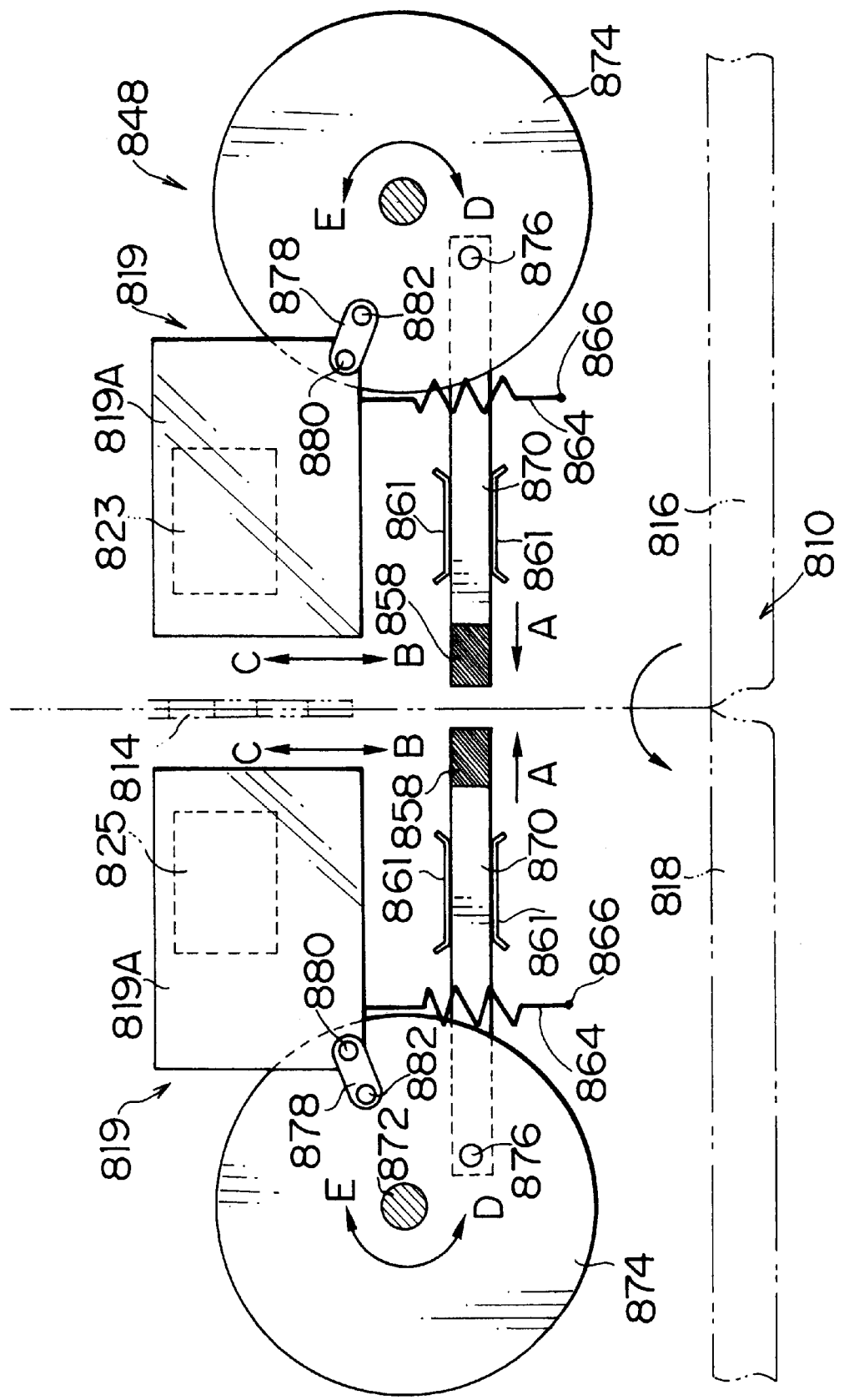
FIG. 38 is a view describing another opening and closing mechanism of the shutter.

FIG. 38 is a view illustrating another opening and closing mechanism of the shutter.

As shown in FIG. 38, the opening and closing apparatus 848 is symmetry with respect to the hinge 814 which connects the first and the second plate portions 816, 818, and provided to both of the first and the second plate portions 816, 818. The opening and closing apparatus 848 is constructed as described below. The similar parts as FIG. 37 are explained with the same reference numerals, and the fixing member 819B is omitted to see the opening and closing apparatus easily.

As shown in FIG. 38, one end of a connecting arm 878 is pivotally supported to one corner portion of the shutter plate 819A via a pin 880. The other end of the connecting arm 878 is fixed and connected to a rotating disk 874 via the pin 882, and the center of the rotating disk 874 is pivotally supported by a rotating axis 872. The other end of the arm 870 to which a magnet 858 is provided to one end is pivotally supported on the rotating disk 874 via a pin 876; and at the same time the arm 870 is guided in left and right directions by a pair of guide portions 861. Then, the magnets 858 at the tip of the arm 870 of the opening and closing apparatus 848, provided to the first and the second plate portions 816, 818, are formed for one polarity to face to be an N Pole and the other one an S Pole, in the same manner as described in FIG. 37. Such a link mechanism is provided to the first and the second plate portions 816, 818, via the hinge 814; thus the pair of opening and closing apparatus 848, 848, are formed. Moreover, one end of a spring 864 is connected to the shutter plate 819A as well as the other end which is supported by a fixing pin 866 which is fixed to the camera body 810. The shutter plate 819A is forced in the direction (the direction B indicated by an arrow) to open the shutter plate 819A by the spring 864. Therefore, when the force of the spring 864 is weaker than the force to hold the magnets 858 to each other, the rotating disk 874 tends to rotate in the direction D in FIG. 38 by the holding force to attract the magnets 858 to each other. Thus, the shutter plate 819A moves in the direction C in FIG. 38, and the opening and closing apparatus closes the shutter 819. In contrast, if the force of the spring 864 is stronger than the force to hold the magnets 858 each other, the shutter plate 819A moves in the direction B in FIG. 38 by the pulling force of the spring 864, and the shutter 819 opens. At that time, the rotating disk 870 rotates in the direction E in FIG. 38.

Therefore, the shutter 819 can be opened and closed by interlocking with the folding action and the developing action of the camera body 810 in case that the opening and closing apparatus 848 is constructed as illustrated in FIG. 38.

Figure 39:
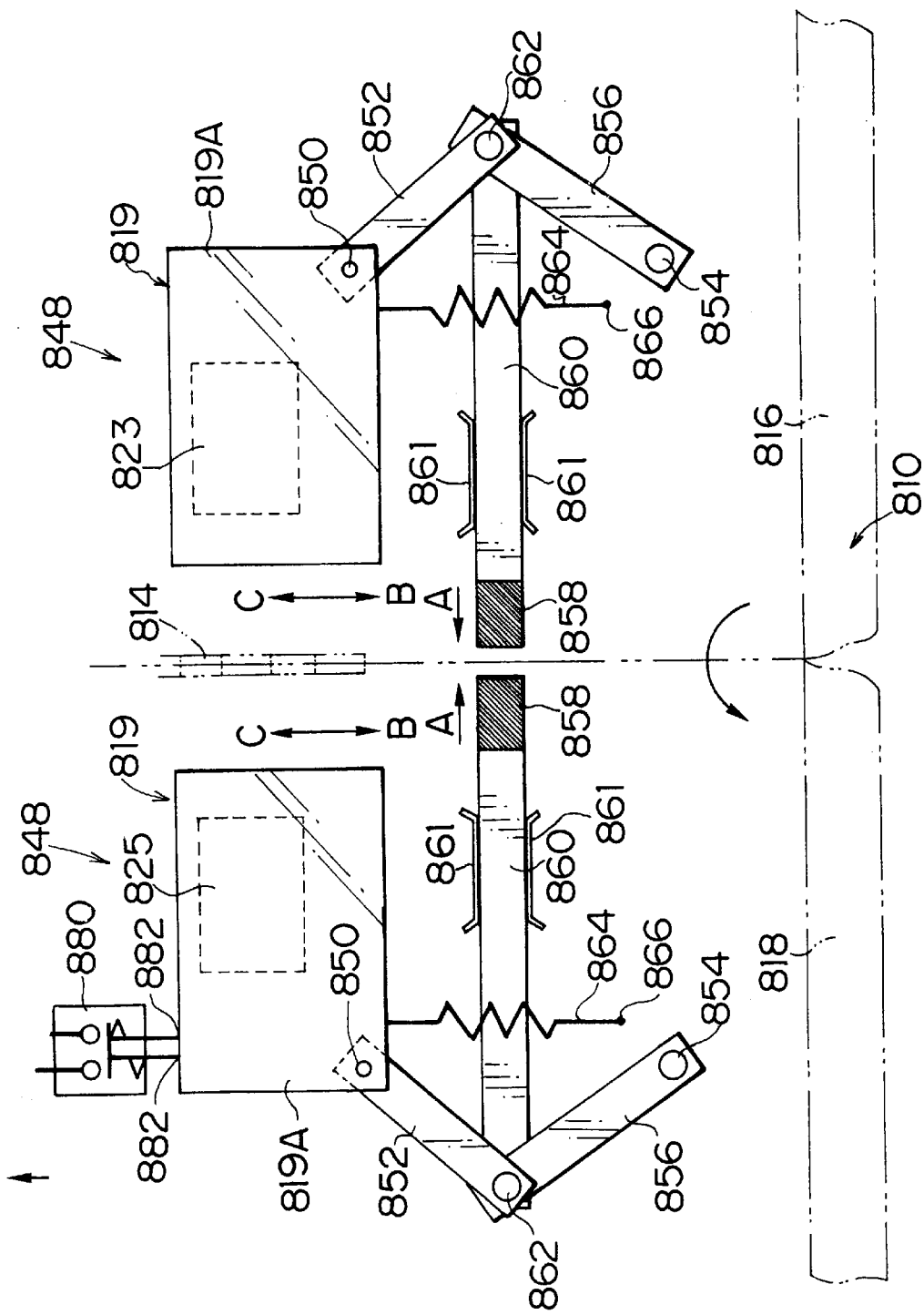
FIG. 39 is a view describing the opening and closing mechanism for the shutter provided with a switch circuit.

In FIG. 39, the opening and closing apparatus 848 is provided with a switch circuit 880. In the opening and closing apparatus, if a contacting point of the switch circuit 880 contacts the shutter plate 819A, the switch circuit 880 is OFF; if the contacting point 882 does not contact the shutter plate 819A, the switch circuit 880 is ON. The opening and closing apparatus of the shutter is the same as the one described with FIG. 37, so an explanation for it is omitted.

Therefore, the shutter 819 opens, and the power source of the camera is activated only when photographing can be performed.

Figure 40A:
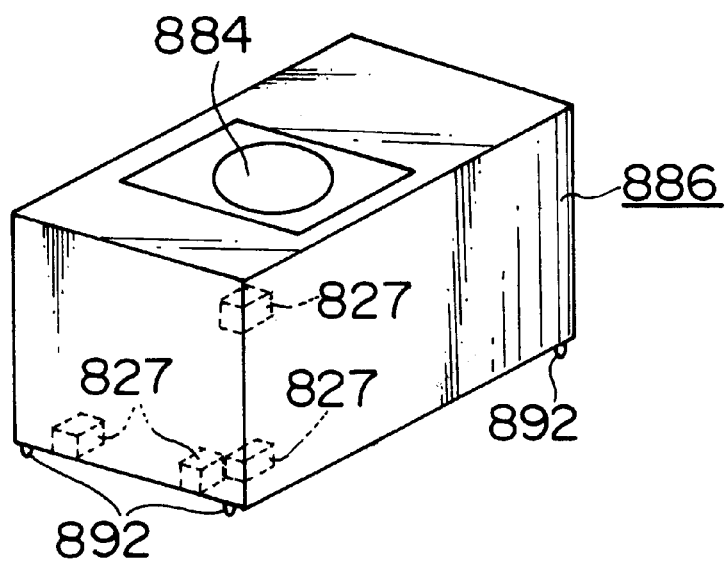
FIG. 40(A) is a view illustrating the seventeenth embodiment of the electronic still camera according to the present invention.
Figure 40B:
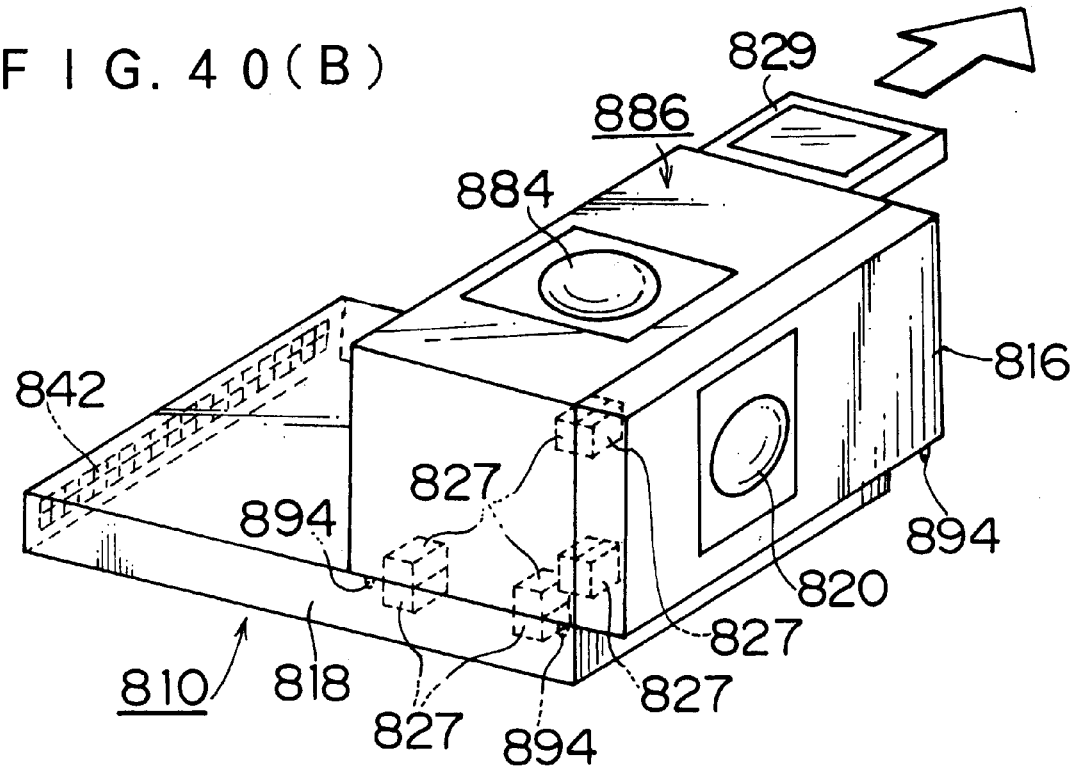
FIG. 40(B) is a view illustrating the seventeenth embodiment of the electronic still camera according to the present invention.

FIGS. 40(A) and 40(B) are views illustrating the seventeenth embodiment of the electronic still camera according to the present invention.

In the seventeenth embodiment a lens, provided at another place, is attached to the camera body 810 to be freely detachable.

FIG. 40(A) is a view illustrating a lens unit 886 provided with a lens 884 of a focal length which is different from the taking lens 820 which is provided to the first plate portion 816; FIG. 40(B) is a view illustrating a state where the lens unit 886 is attached to the camera body 810.

As shown in FIGS. 40(A) and 40(B), a protruding portion 892 is provided to each of a bottom corner portion of the lens unit 886, and at the same time a hole 894, corresponding to the protruding portion 892, is formed at the camera body 810 side. Thus, a positioning is achieved by engaging the protruding portion 892 of the lens unit 886 with the hole 894 of the camera body 810, and the lens units 886, 890, are prevented from detaching from the camera body 810. Moreover, the permanent magnets 827 are provided to the lens unit 886. The permanent magnets 827 are arranged for the permanent magnet 827 of the first plate portion 816, the permanent magnet 827 of the second plate portion 818, and the permanent magnet 827 of the lens unit 886 to attract and hold each other when the first plate portion 816 is folded by 90° with respect to the second plate portion 818. Thereby the holding force of the magnet 827 is complemented in addition to the engagement of the protruding portion 892 and the hole 894, so that the lens unit 886 can be prevented from detaching from the camera body 810.

Figure 41A:
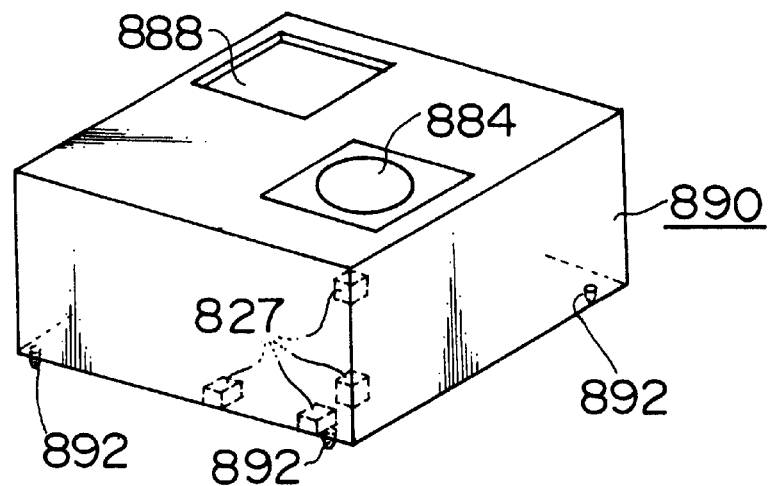
FIG. 41(A) is a view illustrating the eighteenth embodiment of the electronic still camera according to the present invention.
Figure 41B:
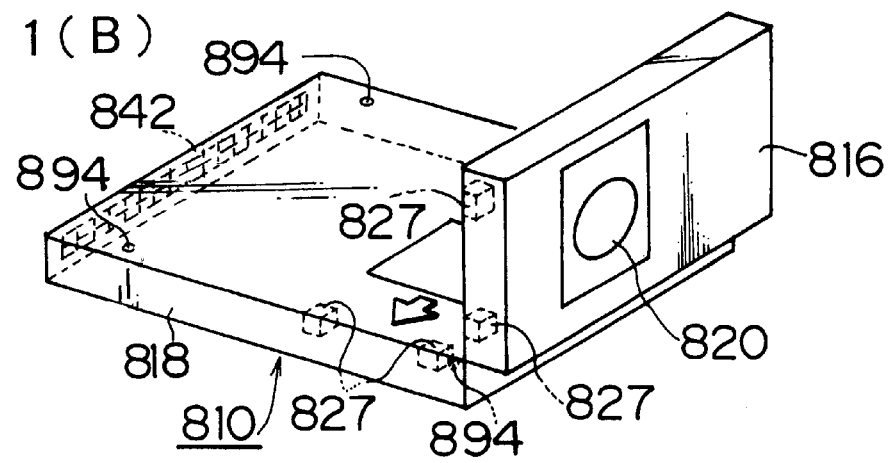
FIG. 41(B) is a view illustrating the eighteenth embodiment of the electronic still camera according to the present invention.
Figure 41C:
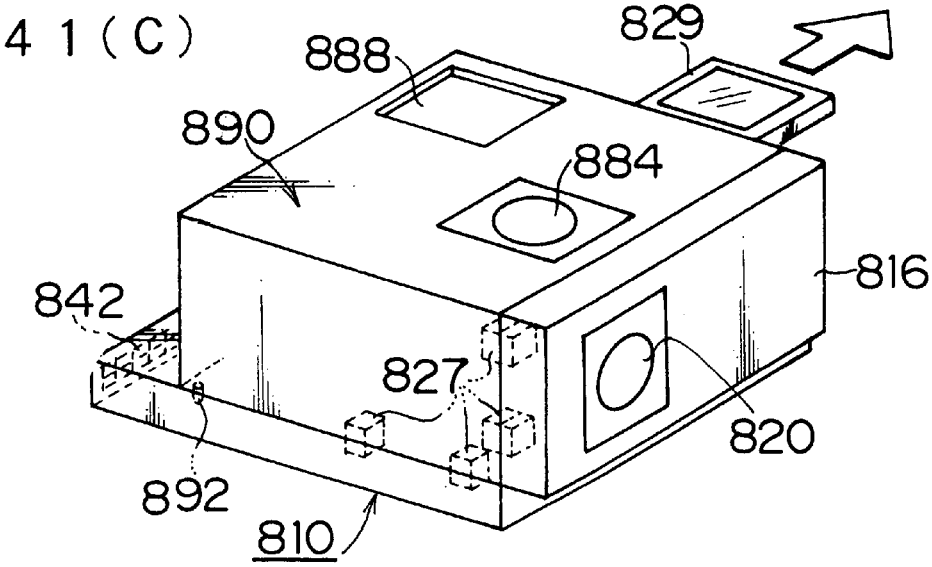
FIG. 41(C) is a view illustrating the eighteenth embodiment of the electronic still camera according to the present invention.

FIGS. 41(A), 41(B), and 41(C) are views illustrating the eighteenth embodiment of the electronic still camera according to the present invention.

FIG. 41(A) is a view illustrating the lens unit 890 which is provided with the lens 884 of a focal distance that is different from the taking lens 820 which is provided to the first plate portion 816 of the camera body 810, and is built-in a strobe 888. FIG. 41(C) is a view illustrating a state where the lens unit 890 is attached to the camera body 810.

For the lens unit 890, too, the protruding portion 892 is formed at a bottom corner portion of the lens unit 890. The lens unit 890 is positioned and is prevented from detaching by engaging with the hole 894 which is formed in the camera body 810.

If the electronic still camera is a type to attach the lens units 886, 890, to the camera body 810 as shown in FIGS. 40(B) and 41(C), the shutter 819, provided to the apertures 823, 825, of the camera body 810, must open before folding the first plate portion 816 with respect to the second plate portion 818.

According to the seventeenth and eighteenth embodiments of the electronic still camera of the present invention, normal photographing is performed by using the taking lens 820 which is provided in the camera body 810. To photograph a distanced object and to photograph at night, for example, the lens units 886, 890, shown in FIG. 40(A) or 41(A) is attached to the camera body 810.

Therefore, in the seventeenth and eighteenth embodiments, the same result as the sixteenth embodiment shown in FIG. 34(C) is obtained; and further, a more practical electronic still camera can be constructed.

In addition, a shutter (not shown) may be provided at the solid state image pick-up element side of the lens units 886, 890, so as to be dust-resistant.

Figure 42:
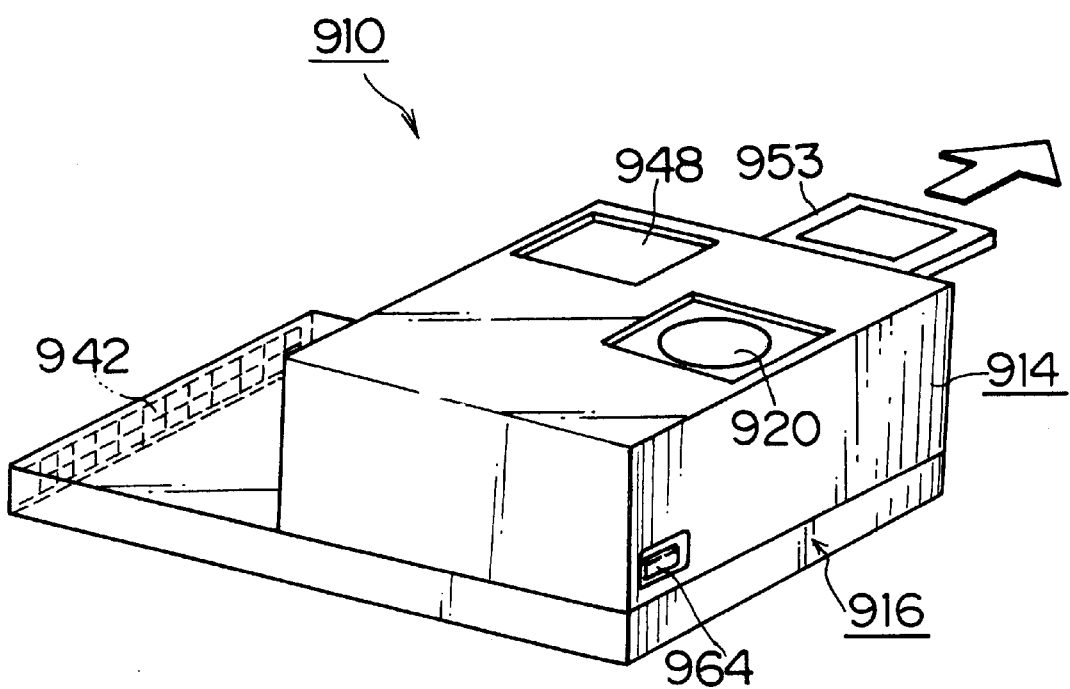
FIG. 42 is a view illustrating the nineteenth embodiment of the electronic still camera according to the present invention.
Figure 43:
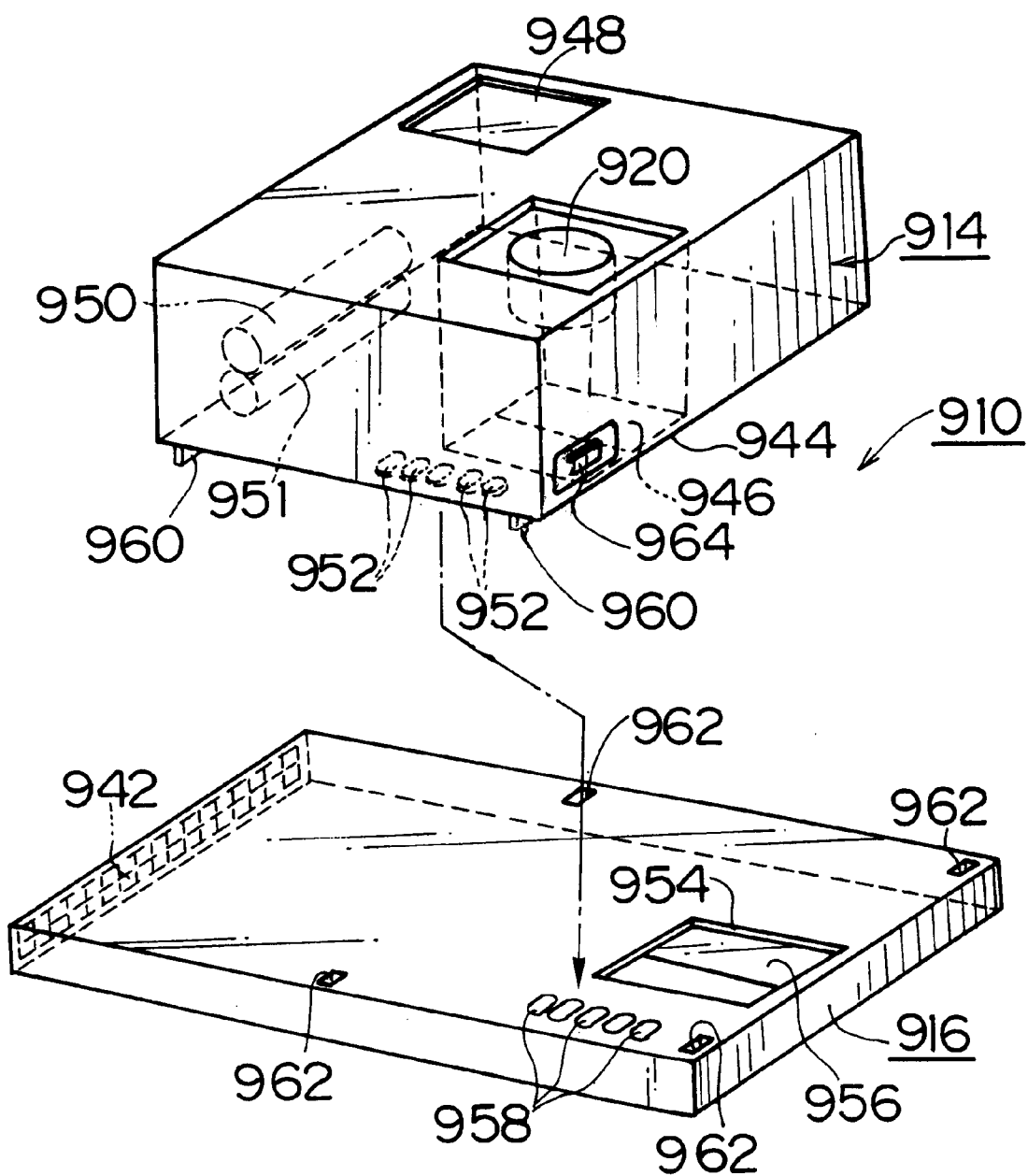
FIG. 43 is a perspective view illustrating a state where the lens unit and the camera unit shown in FIG. 42 are separated.

FIG. 42 is a view illustrating the nineteenth embodiment of the electronic still camera according to the present invention; FIG. 43 is a perspective view illustrating a state where the lens unit and the camera body shown in FIG. 42 are separated.

As shown in FIGS. 42 and 43, an electronic still camera 910 consists of a lens unit 914 in which a taking lens 920 is provided, a CCD, an image processing circuit, a camera body unit 916 in which a built-in memory is built, and so on. The lens unit 914 is attached to the camera body unit 916 to be detachable.

The taking lens 920 is provided to the lens unit 914, and at the same time a first aperture 944 is formed (refer to FIG. 43) at the bottom face of the lens unit 914 to correspond to the taking lens 920. The taking lens 920 is arranged for its optical axis to correspond to the direction of the depth. A shutter 946, freely opened and closed, is provided to the first aperture 944. A strobe emitting window 948 is formed on the top face of the lens unit 914. A strobe (not shown) a battery 950, a strobe condenser 951, and so on, are provided in the lens unit 914. Moreover, an operation button (refer to FIG. 44), including a shutter release button, is provided to the lens unit 914. A finder frame 953, shown in FIG. 42, is provided to be able to be pulled by the lens unit 914. The finder frame 953 is pulled out of a slot (not shown) of the lens unit 914 by a photographer at the time of photographing and is contained when not in use.

The form of the camera main body 916 is in a form of a PC card which is known. The thickness of the camera main body 916 is correspondingly selected from the PC card standards Type1 (3.3 mm), Type2 (5.0 mm), Type3 (10.5 mm), and Type4 (16.0 mm).

As shown in FIG. 43, a second aperture 954 is provided on the top face of the camera body unit 916 to correspond to the first aperture 944 of the lens unit 914. A shutter 956, freely opening and closing, is provided to the second aperture 954. Then, a CCD 422 is provided in the position corresponding to the second aperture 954. In short, the CCD, too, is arranged, in the same manner as the taking lens 920, for its optical axis to correspond to the direction of the depth of the electronic still camera 910.

A connector 942, connectable to a card slot of the external information processing apparatus such as a personal computer, is provided at one side of a side periphery portion of the camera body unit 916.

As shown in FIG. 43, a plurality of projected portions 952, 952, . . . for a contact point are provided to the bottom face of the lens unit 914; on the other hand, a plurality of recessed portions 958, 958, . . . for contact points, to correspond to the projected portions 952, are provided on the top face of the camera body unit 916. Then, the power is supplied from a battery 950 (refer to FIG. 44) to the CCD, the driving circuit, an image processing circuit, and so on, which are provided in the camera body unit 916, by contacting the projected portions 952 and the recessed portions 958 for the contact point.

A bottom corner portion of the lens unit 914 is provided with protruding portions 960, 960, . . . to attach the lens unit 914 to the camera body unit 916. In contrast, engaging holes 962, 962, . . . to correspond to the protruding portions 960 are formed on the top face of the camera body unit 916. Then, to attach the lens unit 914 to the camera body unit 916, the attach apparatus 922, described later, is operated by the attach operation part 964 which is provided at the side face of the lens unit 914, and the protruding portions 960 are engaged with the engaging holes 962.

Figure 44:
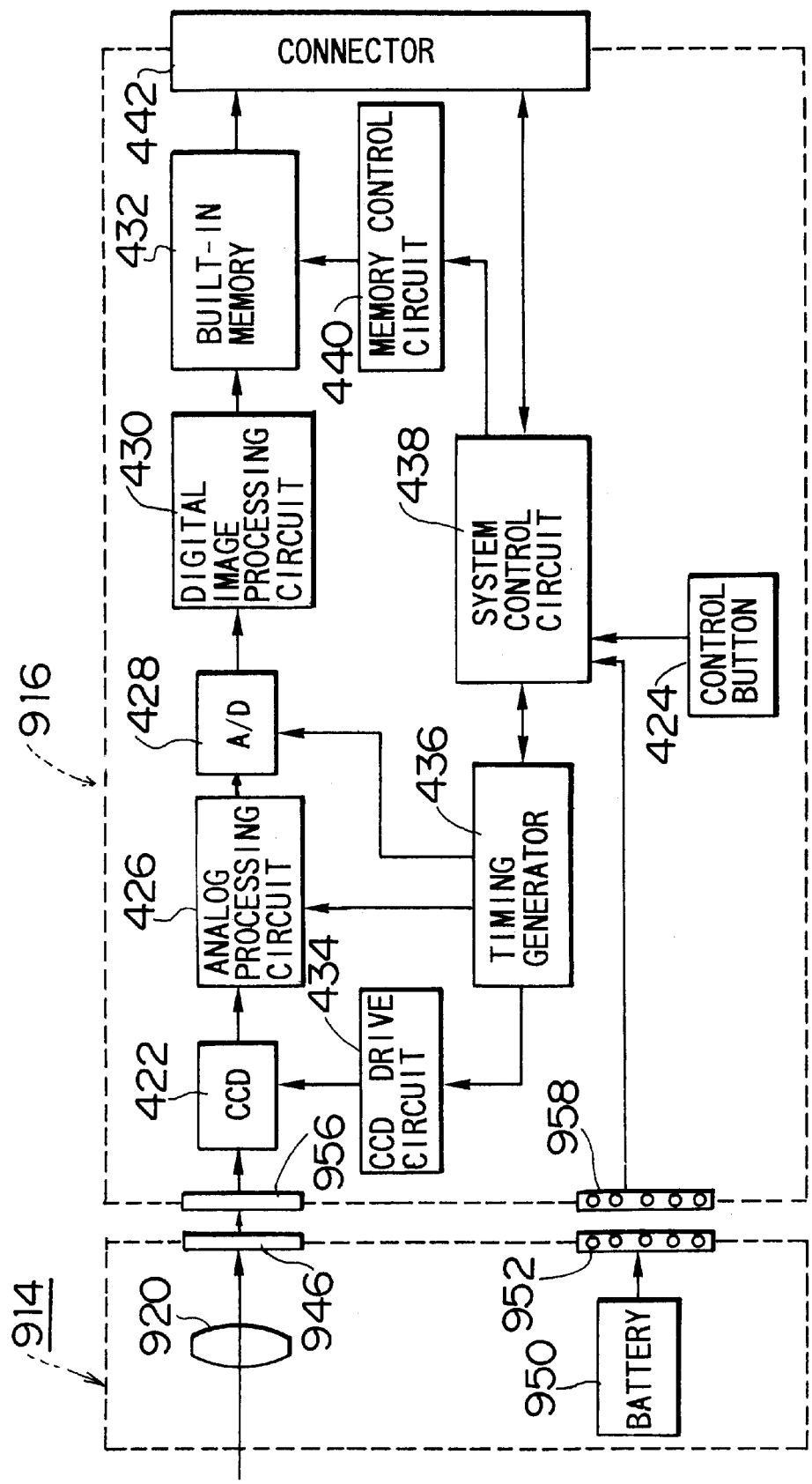
FIG. 44 is a block diagram showing the inner construction of the electronic still camera shown in FIG. 42.

FIG. 44 is a block diagram illustrating the inner construction of the electronic still camera 910 shown in FIG. 42. The similar parts as FIG. 18 have the same reference numerals; so a detailed explanation for them is omitted.

As shown in FIG. 44, the lens unit 914 consists of the taking lens 920, the shutter 946, the battery 950, and the projected portions 952 for a contact point. The inner construction of the camera body 916 is the same as the one shown in FIG. 18, except a shutter 956 and recessed portions 958.

To photograph, the lens unit 914 is attached to the camera body unit 916, and the projected portions 952, for a contact point, of the lens unit 914 are contacted to the recessed portions 958 for a contact point. Thereby each circuit of the camera body unit 916 is conducted, and moreover, an opening and closing apparatus 966 of the shutters 946, 956, is conducted, so that the shutter 946 of the first aperture 944 which is formed in the lens unit 914 and the shutter 956 of the second aperture 954 which is formed to the camera body unit 916 open, and an optical path, from the taking lens 920 to the CCD 422, for photographing, is formed.

Figure 45:
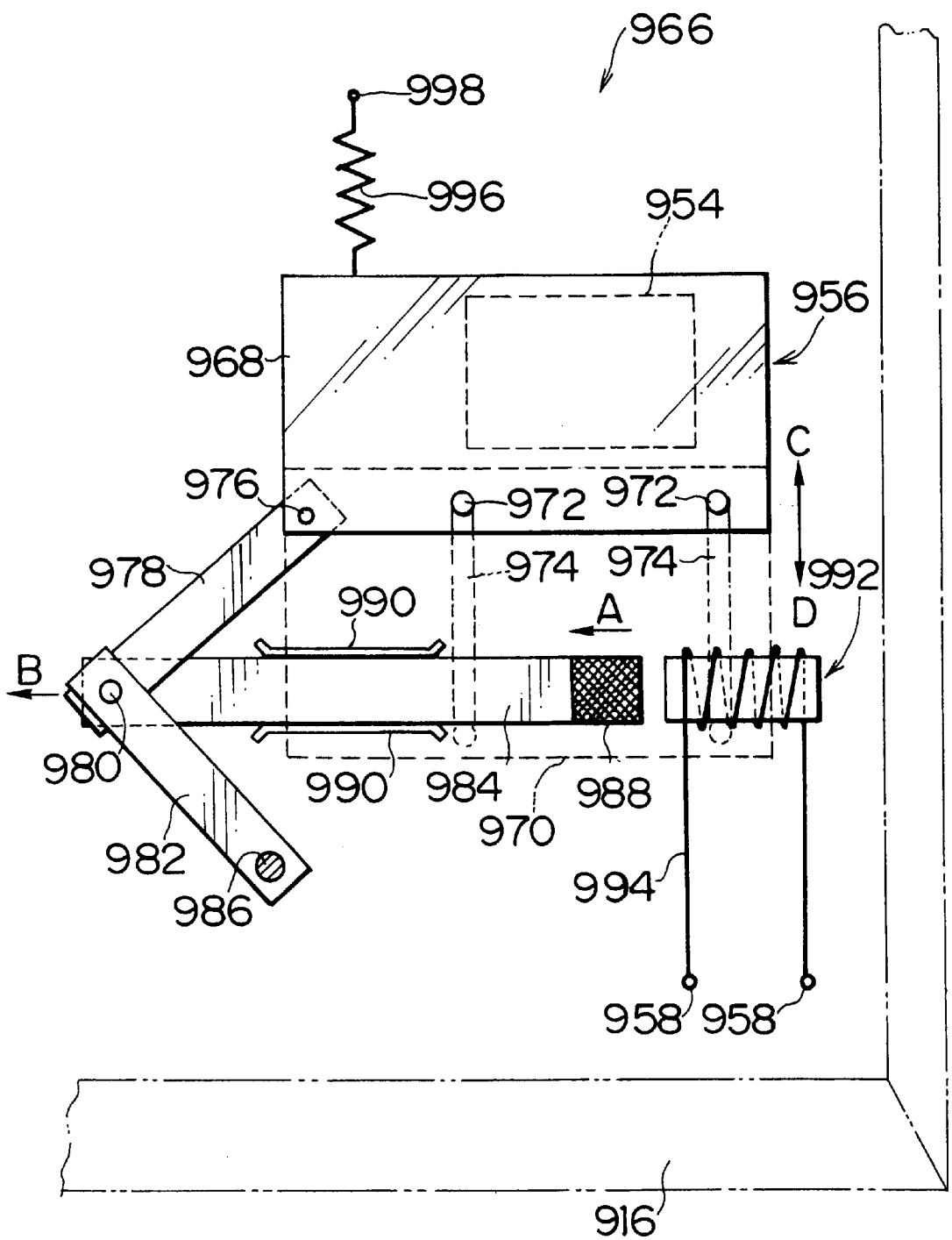
FIG. 45 is a view describing the opening and closing mechanism of the shutter shown in FIG. 42.

FIG. 45 shows the opening and closing mechanism 966 of the shutter; a fixing member 970 is indicated by an imaginary line to easily see the opening and closing mechanism 966. The opening and closing mechanism 966 is provided at both of the lens unit 914 and the camera body 916. The opening and closing mechanism 966 is constructed as described below; and will be described with the opening and closing mechanism 966 of the camera body unit 916.

One end of a first arm 978 is pivotally supported to a corner portion of a shutter plate 968 via a pin 976. Each end of a second arm 982 and a third arm 984 are pivotally supported to the other end of the first arm 978 via a pin 980. The other end of the second arm 982 is supported to be freely rotatable via a fixing pin 986, and the other end of the third arm 984 is provided a permanent magnet 988. Then the third arm 984 is guided left and right in FIG. 45 by a pair of a guide member 990. Thereby the link mechanism in which the fixing pin 986 is a fixing end is formed.

Moreover, an electromagnet 992 is arranged on the straight line of the third arm 984 to face a permanent magnet 988 of the third arm 984. Then the poles to face the permanent magnet 988 and the electromagnet 992 are provided to be the same polarities (N and N, or S and S). Thus when the electromagnet 992 is conducted, a repelling force (in the direction A by an arrow) of the permanent magnet 988 and the electromagnet 992 affects to the third arm 984.

A shutter plate 968 is connected to one end of a spring 996, and at the same time the other end of the spring 996 is supported by a pin 998 which is fixed to the camera body unit 916. The shutter plate 968 is forced to the upper side of FIG. 45, that is, in the direction (the direction A by an arrow) to close the shutter plate 968, by the spring 996. Then, the repelling force between the magnets 988, 992, is set to be stronger than the force of the spring 996 when the electromagnet 992 is conducted.

Therefore, at the time of photographing, the shutter 956 is opened via the link mechanism, when the lens unit 914 is attached to the camera body unit 916 and the electromagnet 992 of the opening and closing mechanism 966 is conducted. In short, the third arm 984 moves in the direction B in FIG. 45 against the force of the spring 996 by the repelling force of the magnets 988, 992. Therefore the shutter plate 968 slides in the direction D in FIG. 45, and the shutter 956 opens. On the other hand, when the electromagnet 992 is not conducted by separating the lens unit 914 from the camera body 916 after photographing, the shutter plate 968 is pulled and slides in the direction C as shown in FIG. 45; so the shutter 956 closes.

In the embodiment, the link mechanism of the opening and closing mechanism 966 of the shutter is activated by utilizing the magnetism of the electromagnet 992 as described above; however, the present invention is not restricted to that. For example, a repelling force may be generated at the magnets 988, 988, by shifting the symmetrical position of the permanent magnet 988 which is attached to the tip of the third arm 984 of the link mechanism that is provided to the camera body unit 916 and the lens unit 914, when the camera body 916 is attached to the lens unit 914. Moreover, a permanent magnet (not shown) may be attached to the tip of the protruding portion 960 so that the permanent magnet is brought to the position of the electromagnet 992 in FIG. 45 when the protruding portion 960 is attached to an engaging groove 962; and therefore the permanent magnet of the protruding portion 960 and the permanent magnet 988 of the third arm 984 repel against each other.

Figure 46:
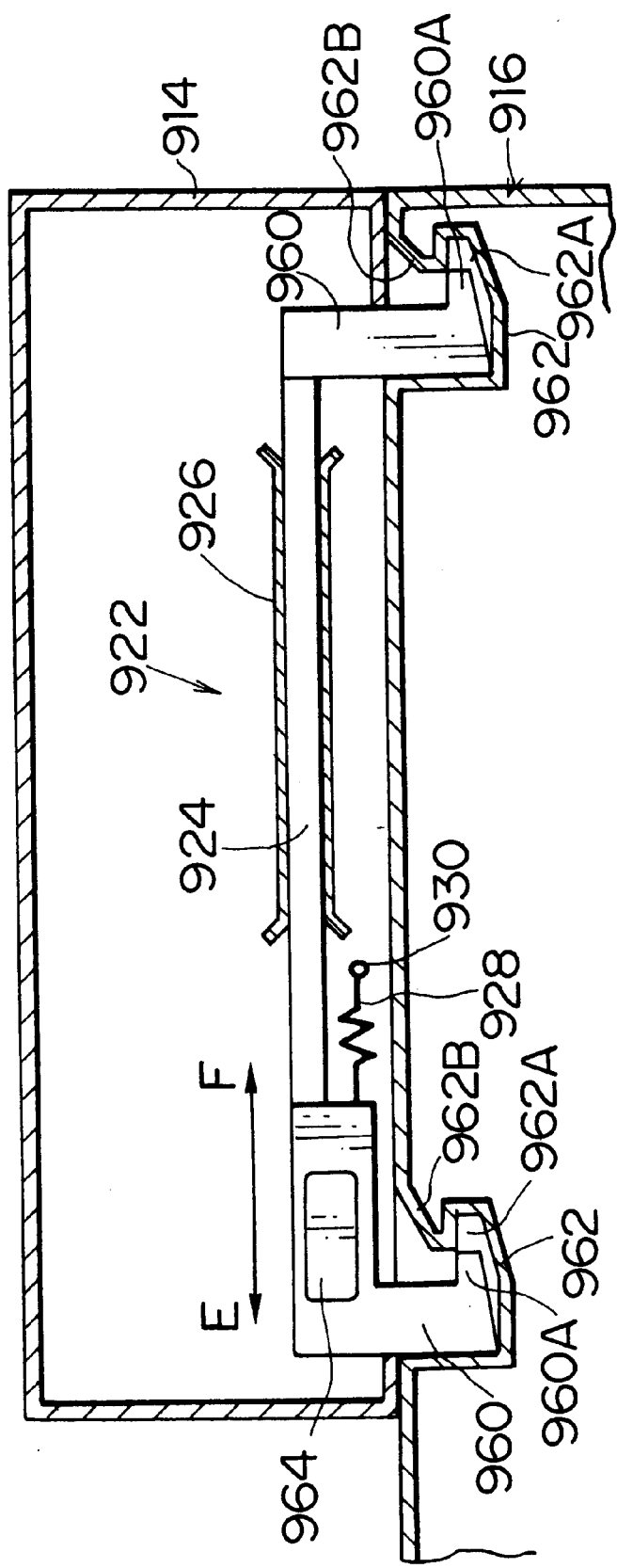
FIG. 46 is a side sectional view illustrating an attach mechanism of the electronic still camera shown in FIG. 42.

FIG. 46 is a side-sectional view describing the attach mechanism 922 to attach or detach the lens unit 914 to or from the camera body unit 916.

As shown in FIG. 46, the protruding portions 960 are formed at the four corner portions at the bottom face of the lens unit 914, and at the same time, one of the protruding portions 960 is provided with the attach operation part 964. The attach operation part 964 can be operated from the outside of the body of the lens unit 914. On the other hand, the engaging holes 962 are formed in the camera body unit 916 at the position to correspond to the protruding portions 960. As shown in FIG. 46, a hook 960A is formed at a tip of each protruding portion, and at the same time a side groove 962A, corresponding to the hook 960A, is formed at the rear of the engaging holes 962. Moreover, a taper portions 962B are formed at the entrances of the engaging holes 962 for the protruding portions 960 to be inserted smoothly.

Each of the protruding portions 960 is connected by four interlocking arms 924. A guide member 926, provided in the lens unit 914, is arranged at the connecting arm 924 in the direction E–F in FIG. 46. Thereby all the protruding portions 960 interlock and slide when the attach operation part 964 slides along the direction E–F in FIG. 46 from outside of the lens unit 914. Moreover, one end of the spring 928 is connected to the protruding portions 960 to which the attach operation part 964 is provided; and at the same time the other end of the spring 928 is supported by the pin 930 which is fixed to the camera body unit 916. Thereby, each protruding portion 960 is forced in the direction F in FIG. 46, that is, the direction of the side groove 962A of the engaging holes 962.

Therefore, to attach the lens unit 914 to the camera body unit 916, a photographer inserts the protruding portions 960 of the lens unit 914 into the engaging holes 962 of the camera body unit 916 in a state where the attach operation part 964 is slid in the direction E in FIG. 46. Then, after separating the attach operation part 964, each protruding portion 960 slides in the direction F in FIG. 46 by the force of the spring 928. Thereby the hook 960A, formed at each protruding portion 960, is engaged with the side groove 962A which is formed at each of the engaging hole 962, so that the lens unit 914 is attached to the camera body unit 916. At that state, the taper portion 962B is formed at entrances of the engaging holes 962. Thus, the protruding portions are smoothly inserted into the engaging holes 962, and at the same time the hook 960A of the protruding portions engages with the side groove 962A of the engaging holes 962, so that the lens unit 914 can be attached to the camera body unit 916 firmly.

Next, an explanation will be given about an operation of the electronic still camera according to the present invention.

To carry the electronic still camera, and to use it by inserting a card slot of an external information processing apparatus such as a laptop computer, the camera body unit 916, separated from the lens unit 914, is inserted into the card slot.

In a state where the lens unit 914 and the camera body 916 are separated, photographing can not be performed, because an optical path for photographing is not formed between the CCD and the taking lens 920.

To photograph, a photographer operates the attach operation part 964 of the attach apparatus 922 to engage the protruding portions 960 of the lens unit 914 with the engaging holes 962 of the camera body unit 916, and then attach the lens unit 914 to the camera body unit 916. By such an attachment, the projected portion 952, for a contact point, of the lens unit 914 and the recessed portion 958, for a contact point, of the camera body unit 916 are electrically contacted, and the electromagnet 992 of the opening and closing mechanism 966 is conducted. Thus the shutter 946 of the first aperture 944 which is formed in the lens unit 914 and the shutter 956 of the second aperture 954 which is formed in the camera body unit 916 open, and an optical path for photographing is formed. Also, the taking lens 920 and the CCD lay on the same straight line to allow photographing.

To close the shutters 946, 956, after photographing, the photographer just operates the attach operation part 964 and separate the lens unit 914 from the camera body unit 916. Thus, the electromagnet 992 of the opening and closing mechanism 966 stops functioning, so the shutter 946 of the first aperture 944 and the shutter 956 of the second aperture 954 are closed.

As described above, the electronic still camera of the present invention can be a form of a PC card to insert it into a card slot of the external information processing apparatus such as a personal computer, and also can form an optical system to function as a camera.

Moreover, since the lens unit 914 and the camera body unit 916 can be easily separated, the electronic still camera is handy to carry. For example, when the personal computer is carried, the camera body unit 916 of the electronic still camera can remain in a card slot of a personal computer.

Further, the lens unit 914 is attached to the camera body unit 916 at the time of photographing, so that a length of an optical path for photographing can be secured. Thus a taking lens 920 can be larger and a CCD with many pixels can be applied because a long optical path can be obtained. Therefore, the quality of a photographed image improves compared with a conventional electronic still camera.

Furthermore, the shutters 946, 956, are provided at the apertures 944, 954, to the lens unit 914 and the camera body unit 916; thus dusts can be prevented from entering the optical system of the camera, and the CCD can be protected.

Figure 47:
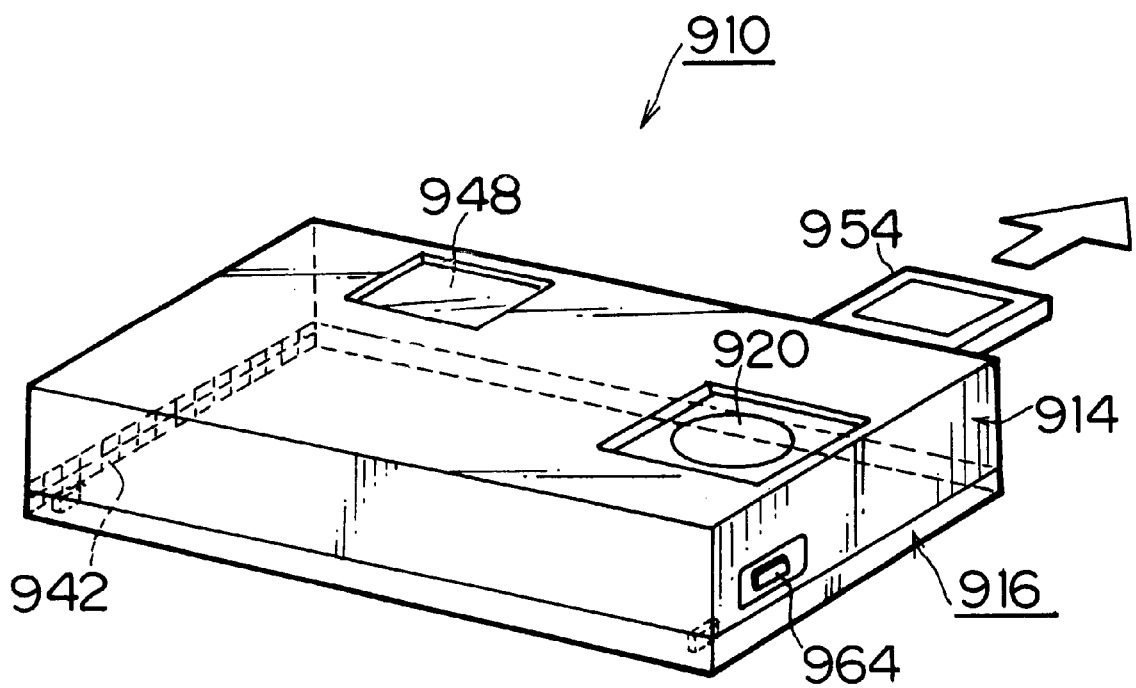
FIG. 47 is a view illustrating the twentieth embodiment of the electronic still camera according to the present invention.
Figure 49:
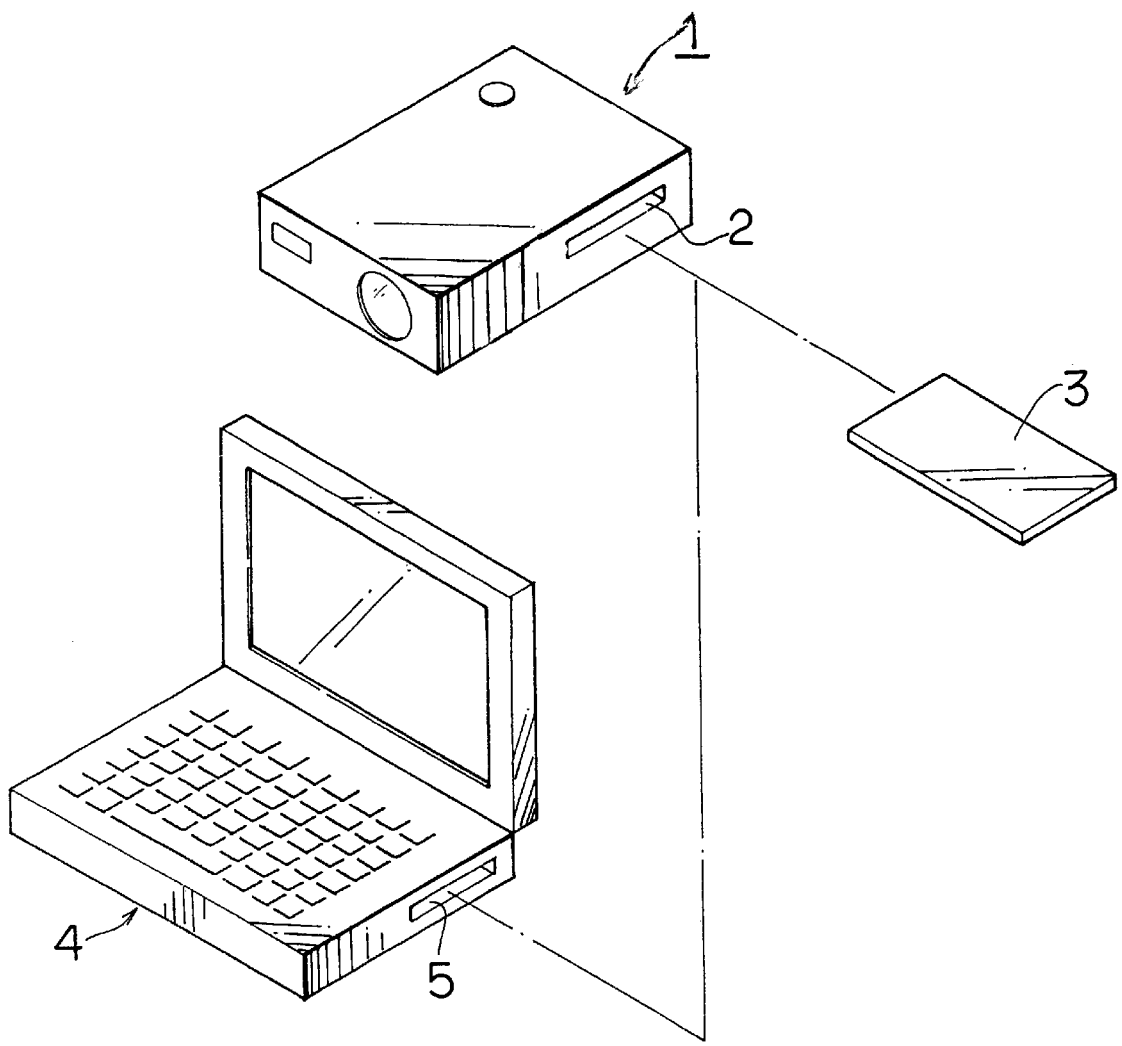
FIG. 49 is a view illustrating a conventional electronic still camera and a laptop computer which use a memory card.

FIG. 47 is a view illustrating the twentieth embodiment of the electronic still camera according to the present invention; FIG. 48 is a perspective view illustrating a state where the lens unit and the camera body unit are separated as shown in FIG. 47. The similar members and apparatus as the nineteenth embodiment have the same reference numerals; so an explanation for them is omitted.

In the twentieth embodiment, the electronic still camera 910 consists of the lens unit 914 which is provided with the taking lens 920, and the camera body unit 916 which is provided with a CCD, in the same manner as the nineteenth embodiment. Also like the nineteenth embodiment, the lens unit 914 is attached to the camera body 916 in the twentieth embodiment.

In the twentieth embodiment shown in FIG. 47, the form of the lens unit 914 is the same as that of a PC card, so that the sizes of the lens unit 914 and the camera unit 916 by length and width fit together when the lens unit 914 is attached to the camera unit 916.

According to the twentieth embodiment of the electronic still camera of the present invention, the same effect as that of the nineteenth embodiment can be obtained. Moreover, the form of the camera itself is the same as that of the card, so unlike the lens unit of a conventional electronic still camera, the lens unit of an electronic still camera of the present invention is not bulky. Thus the electronic still camera of the present invention has a good balance for the purpose of photographing, and is handy to carry.

In the twentieth embodiment, the total thickness of the lens unit 914 and the camera body 916 can be within the thickness of either of the four types of the PC card: Type3 (10.5 mm) or Type4 (16.0 mm). For example, the thickness of the camera body is formed to be the thinnest Type1 (3.3 mm) of the four types and the thickness of the lens unit is made to be within 7 mm so that the thickness of the camera body can be within the Type3 thickness. As described, the battery 950 and the battery condenser 951 are lined in a horizontal direction to make the lens unit 914 to be thin as shown in FIG. 48.

As described hereinabove, the image signal processing apparatus of the present invention allows the memory card to be connected to the host computers such as the camera body and a laptop computer at the same time. Thus, inserting and pulling-out of the memory card can be omitted at the time of photographing and when image data is to be transferred to the host computers such as a laptop computer. Moreover, electricity can be supplied from the host computer side to the camera body, and the camera body can be controlled, so that the number of photographing can be increased. In case of connecting the memory card to the camera body only or to the host computer only, the electronic still camera and the host computer can be used as normal.

Moreover, according to the electronic still camera of the present invention, a connector for a small-typed memory card is provided on the side to which a connector for an IC card is not provided or a face of an IC card, so attaching and detaching of the small-sized memory card is easy. Further, a casing according to a preference can be attached with respect to a camera body. Thus, an appearance of the camera can be changed according to ages, preferences, or feelings of an user, and an operation system such as a shutter release button and a grip can be made for children and women to use it easily. In addition, the casing can be changed variously from a low-priced camera to a high-priced, luxurious one.

Further, according to the electronic still camera of the present invention, a part of the card unit is exposed when a card unit is loaded in the image pick-up unit, and the switch which is necessary at the time of photographing is provided at a part to be exposed from the image pick-up unit of the card unit. Thus, a switch is not necessary to be provided, and the image pick-up unit can be small-sized, so that the camera can be small-sized. A casing is formed to make the form of the camera flat and thin, and a board and a sheet-like battery which have the same form as the casing are arranged in the casing. Thus the thin-typed electronic still camera which is flat in its entire form and thin without bulge of the battery despite that the camera body contains the power source battery. Furthermore, a length of an optical path can be secured by projecting the taking lens which is retracted in the camera main body in the form of a PC card from the camera main body at the time of photographing, so that the camera can be card-shaped. Thus, the electronic still camera of the present invention is not bulky to be contained in a pocket, so it is easy to carry. The electronic still camera can be inserted into a card slot of an external information processing apparatus such as a laptop computer, thus it is handy to be carried with a laptop computer. In addition, a long optical path can be obtained between the taking lens and the image pick-up element by projecting the taking lens. Thus a larger taking lens and an image pick-up element with many pixels can be used. Thereby, the quality of a photographed image can be improved compared with a conventional electronic still camera.

According to the electronic still camera of the present invention, a front plate, provided with a taking lens, projects from the camera body in card-shape to photograph. However, when the electronic still camera is inserted into a card slot of a personal computer, it is folded and contained so that it is handy even though it remained to be inserted into a card slot of a personal computer. The electronic still camera of the present invention also has a good balance as a camera because of no projected portions. The camera can photograph without a problem; and the finder portion or the taking lens portion is folded and stands out from the camera body at the time of photographing. The finder portion or the taking lens portion is folded and is card-shaped so that the camera is handy to carry. Moreover, the camera body in the form of a PC card consists of two plate portions which are connected with the hinge member, so that the taking lens and an image pick-up element are folded to form an optical path for photographing when the camera body is folded; and at the same time, a length of an optical path between the taking lens and an image pick-up element is secured. Thus, the camera is cardshaped when not folded, and functions as a camera when folded so that the camera can be card-shaped. Thereby the electronic still camera of the present invention is not bulky, and can be carried with ease. The electronic still camera can be inserted into a card slot of an external information processing invention is not bulky, and can be carried with ease. The electronic still camera can be inserted into a card slot of an external information processing apparatus such as a laptop computer, thus it is handy to be carried with a laptop computer. In addition, a long optical path can be obtained between the taking lens and the image pick-up element by projecting the taking lens. Thus a larger taking lens and an image pick-up element with many pixels can be used. Therefore, the quality of a photographed image can be improved compared with a conventional electronic still camera. Further, the lens unit and the camera body are easily separated to carry, and the lens unit in which the taking lens is provided fits the camera body unit in which an image pick-up element is provided, and used. Therefore, a length of an optical path for photographing can be secured even though the optical axis of the taking lens is arranged to correspond to the direction of the depth of the camera body unit.

It should be understood that, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. Image signal processing apparatus which comprises a camera body, a memory card which is inserted into and drawn out from said camera body, and a host computer which transmits and receives image data to and from said memory card, said image signal processing apparatus wherein:

said memory card has two connectors which are connected to said camera body and said host computer, said memory card being constructed in such a way that said two connectors are simultaneously mounted in said camera body and said host computer;

said camera body has means for detecting the state of the first connection where only said memory card is connected, and the state of the second connection where only said host computer is connected via said memory card; if detecting said first connection, said camera body supplies a power to said memory card and enters a normal mode for executing a normal photographing sequence of recording image data captured during photographing in said memory card, and if detecting said second connection, said camera body receives a power from said host computer via said memory card and a photographing command including a shutter release instruction and enters a host computer remote mode for photographing; and said host computer has a function of executing an image transfer/regenerate sequence between said host computer and an image memory in said memory card, and a function of supplying the power from said host computer to said camera body via said memory card and transmitting a photographing command including said shutter release instruction.

2. The image signal processing apparatus as defined in claim 1, wherein a power source of said camera body is chargeable, and said camera body enters a charge mode to charge said power source with a power source which is received from said host computer side via said memory card during said host computer remote mode.

3. The image signal processing apparatus as defined in claim 1, wherein said host computer displays an image on a monitor screen real time according to image data received via said memory card from said camera body.

4. An electronic still camera comprising:

an image pickup unit and an IC card capable of being attached to and detached from said image pickup unit; wherein:
- said image pickup unit has a battery as a power source and includes a taking lens, an image pickup element, and a first connector to which said IC card is capable of being attached to and detached from, said image pickup unit effective to transmit a signal representing an object image obtained through said taking lens and said image pickup element to said IC card;
- said IC card includes a second connector provided at one short side of said IC card and operatively connectable to said first connector, signal processing means for processing a signal representing said object image,
- a third connector provided at another short side of said IC card for transferring image data stored in a small memory card to external apparatus to which said IC card is attachable,
- a fourth connector to which said small memory card is capable of being attached to and detached from, and a card slot at a diagonal side of said IC card where the second and third connectors are not provided, said small memory card being insertable into said card slot, wherein said image pick up unit is thicker than said IC card.

5. A card-sized electronic still camera which comprises:

an image pickup unit and an IC card whose one end is integrated with said image pickup unit of said card-sized electronic still camera said image pick up unit is thicker than said IC card wherein:
- said image pickup unit has a battery as a power source, a taking lens and an image pickup element, said image pickup unit effective to transmit a signal representing an object image captured through said taking lens and said image pickup element to said IC card; and
- said IC card includes signal processing means for processing said signal representing the object image; a connector provided at an end of said IC card for transferring image data stored in a small memory card to external apparatus to which said IC card is attachable to or detachable from;
  - another connector to which said memory card is attachable to and detachable from; and
  - a card slot at a side of said IC card where the connector is not provided, said small memory card being insertable into said card slot.

6. An image signal processing apparatus which comprises:

a camera body, a memory card which is insertable into and out of said camera body, and a host computer which is effective to transmit and receive image data to and from said memory card wherein:
- said memory card has first and second connectors which are connectable to said camera body and said host computer, said memory card being constructed so that said two connectors are simultaneously mounted in said camera body and said host computer;
- said camera body has means for detecting the state of the first connection when only said memory card is connected, and the state of the second connection when only said host computer is connected via said memory card; when said first connection is detected, said camera body supplies power to said memory card and enters a normal mode for executing a normal photographing sequence of recording image data captured during photographing in said memory card, and when said second connection is detected, said camera body receives power from said host computer via said memory card and a photographing command including shutter release instructions and enters the host computer remote mode for photographing; and
- said host computer is effective to execute an image transfer/regenerate sequence between said host computer and an image memory in said memory card, and for supplying the power from said host computer to said camera body via said memory card and transmitting a photographing command including said shutter release instruction.

7. The image signal processing apparatus as defined in claim 6, wherein a power source of said camera body is chargeable, and said camera body enters a charge mode to charge said power source with a power source which is received from said host computer side via said memory card during a host computer remote mode.

8. The image signal processing apparatus as defined in claim 6, wherein said host computer displays an image on a monitor screen in real time according to image data received via said memory card from said camera body.

9. The image signal apparatus according to claim 4, wherein the IC card includes an armature and the memory card includes an armature effective to be operatively connectable to the armature of the IC card.

* * * * *